US011210827B2

(12) United States Patent
Lee et al.

(10) Patent No.: US 11,210,827 B2
(45) Date of Patent: Dec. 28, 2021

(54) ELECTRONIC DEVICE PROVIDING TEXT-RELATED IMAGE AND METHOD FOR OPERATING THE SAME

(71) Applicant: SAMSUNG ELECTRONICS CO., LTD., Suwon-si (KR)

(72) Inventors: Hoyoung Lee, Suwon-si (KR); Gyuchual Kim, Suwon-si (KR); Changdae Jung, Suwon-si (KR); Kwangseong Choi, Suwon-si (KR); Hosup Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/253,624

(22) Filed: Jan. 22, 2019

(65) Prior Publication Data

US 2019/0228552 A1 Jul. 25, 2019

(30) Foreign Application Priority Data

Jan. 22, 2018 (KR) .................. 10-2018-0007955

(51) Int. Cl.
*G06T 11/60* (2006.01)
*G06F 40/30* (2020.01)
*G06F 40/279* (2020.01)

(52) U.S. Cl.
CPC ............ *G06T 11/60* (2013.01); *G06F 40/279* (2020.01); *G06F 40/30* (2020.01)

(58) Field of Classification Search
CPC ......... G06T 11/60; G06T 19/00; G06F 3/023; G06F 3/004812; G06F 3/04817;
(Continued)

(56) References Cited

U.S. PATENT DOCUMENTS 9,215,095 B2 * 12/2015 Weaver ............... H04L 12/1822
10,182,209 B2 * 1/2019 Fujii ..................... H04L 51/10
(Continued)

FOREIGN PATENT DOCUMENTS

CN     103533248 A     1/2014
CN     104063369 A     9/2014
(Continued)

OTHER PUBLICATIONS

International Search Report dated Apr. 26, 2019 in counterpart International Patent Application No. PCT/KR2019/000915.
(Continued)

*Primary Examiner* — Chante E Harrison
(74) *Attorney, Agent, or Firm* — Nixon & Vanderhye P.C.

(57) ABSTRACT

An electronic device comprises an input device comprising input circuitry, a display device, a communication circuit, and at least one processor configured to control the electronic device to: receive a text through the input device, transmit first information about the text to a server, control the communication circuit to receive second information associated with an image identified based on an emotional state of a first user, the emotional state of the first user being identified as a result of analysis of the text by a learning model trained using a database for a plurality of texts and a plurality of types of emotion and degrees of emotion and an emotional state of a second user conversing with the first user, and display the image based on the second information associated with the image.

16 Claims, 54 Drawing Sheets

(58) Field of Classification Search
CPC ...... G06F 40/30; G06F 40/279; G06F 40/274;
H04L 51/04; H04L 51/10; H04L 51/16;
H04L 51/32; H04L 12/1827; H04M
1/72403; H04M 2201/34; H04M 2250/06;
G06Q 50/10
See application file for complete search history.

(56) References Cited

U.S. PATENT DOCUMENTS

| | | | |
|---|---|---|---|
| 10,242,477 B1 * | 3/2019 | Charlton | ............... H04L 67/306 |
| 2006/0281064 A1 | 12/2006 | Sato et al. | |
| 2009/0248399 A1 | 10/2009 | Au | |
| 2010/0302254 A1 | 12/2010 | Min et al. | |
| 2011/0265018 A1 | 10/2011 | Borst et al. | |
| 2011/0296324 A1 | 12/2011 | Goossens et al. | |
| 2012/0327183 A1 * | 12/2012 | Fujii | ...................... H04N 7/157 |
| | | | 348/14.12 |
| 2013/0325954 A1 * | 12/2013 | Cupala | .................... G06F 3/041 |
| | | | 709/204 |
| 2014/0181229 A1 | 6/2014 | Tucker et al. | |
| 2015/0127453 A1 * | 5/2015 | Tew | ........................ G06F 40/30 |
| | | | 705/14.49 |
| 2016/0210116 A1 | 7/2016 | Kim et al. | |
| 2016/0210279 A1 | 7/2016 | Kim et al. | |
| 2016/0210962 A1 | 7/2016 | Kim et al. | |
| 2016/0359777 A1 * | 12/2016 | Tucker | ................... H04L 51/10 |
| 2017/0109013 A1 * | 4/2017 | Hong | .................. G06F 3/04817 |
| 2017/0308267 A1 * | 10/2017 | Kozloski | ............. G06F 3/04812 |
| 2018/0183921 A1 * | 6/2018 | Choi | ................... G06F 3/04883 |
| 2019/0188459 A1 * | 6/2019 | Ahn | ..................... G06F 16/287 |
| 2019/0190865 A1 * | 6/2019 | Jeon | ........................ H04L 51/04 |

FOREIGN PATENT DOCUMENTS

| | | | |
|---|---|---|---|
| CN | 105989165 A | | 10/2016 |
| CN | 106874239 A | | 6/2017 |
| CN | 107317927 A | | 11/2017 |
| CN | 107340947 A | | 11/2017 |
| KR | 20070008417 A | * | 1/2007 |
| KR | 10-2016-0029895 | | 3/2016 |
| KR | 10-2016-0089152 | | 7/2016 |
| WO | WO 2007/134402 | | 11/2007 |

OTHER PUBLICATIONS

Written Opinion dated Apr. 26, 2019 in counterpart International Patent Application No. PCT/KR2019/000915.
European Search Report dated Jul. 20, 2020 for European Application No. 19740696.0.
Chinese Office Action dated Dec. 21, 2020 for CN Application No. 201980006038.0.
Chinese Office Action dated Sep. 3, 2021 for CN Application No. 201980006038.0.

* cited by examiner

ELECTRONIC DEVICE PROVIDING TEXT-RELATED IMAGE AND METHOD FOR OPERATING THE SAME

CROSS-REFERENCE TO RELATED APPLICATION

This application is based on and claims priority under 35 U.S.C. § 119 to Korean Patent Application No. 10-2018-0007955, filed on Jan. 22, 2018, in the Korean Intellectual Property Office, the disclosure of which is incorporated by reference herein in its entirety.

BACKGROUND

Field

The disclosure relates to electronic devices to provide an image related to a received text and methods for operating the electronic devices and, for example, to select or edit an image corresponding to content of the text and provide the selected or edited image and methods for operating the electronic devices.

The disclosure also relates to artificial intelligence (AI) systems using machine learning algorithms and their applications.

Description of Related Art

With smartphones or tablet PCs recently in wide use, users may communicate messages with others while on the move. Various applications are now available for the purpose of message communication. Such applications not only communicate text messages but also provide various user-friendly functions. For example, an application may send out an image, e.g., emoticon, along with a text, and the user may control the electronic device to choose and send out her desired image to another electronic device.

Human intelligence-class artificial intelligence (AI) systems are being utilized in various industry sectors. AI systems learn on their own and get smarter unlike existing rule-based smart systems. The more used, the more precisely AI systems may perceive and understand users' preference. Thus, legacy rule-based smart systems are being gradually replaced with deep learning-based AI systems.

AI technology may include machine learning (e.g., deep learning) and machine learning-based component technology.

Machine learning may refer, for example, to an algorithm technique that itself may classify and learn the features of input data. The component technology may refer, for example, to a technique for simulating the human brain's perception and decision capabilities using a machine learning algorithm (e.g., deep learning), and this may be divided into several technical fields, such as linguistic understanding, visual understanding, inference/prediction, knowledge expression, and operation control.

The following are examples of AI applications. Linguistic understanding may refer, for example, to technology for recognizing and applying/processing a human being's language or text, and this encompasses natural language processing, machine translation, dialog system, answering inquiries, and speech recognition/synthesis. Visual understanding may refer, for example, to a technique of perceiving and processing things as do human eyes, and this encompasses object recognition, object tracing, image search, human recognition, scene recognition, space understanding, and image enhancement. Inference prediction may refer, for example, to a technique of determining and logically inferring and predicting information, encompassing knowledge/probability-based inference, optimization prediction, preference-based planning, and recommendation. Knowledge expression may refer, for example, to a technique of automatically processing human experience information, covering knowledge buildup (data production/classification) and knowledge management (data utilization). Operation control may refer, for example, to a technique of controlling the motion of robots and driverless car driving, and this encompasses movement control (navigation, collision, driving) and maneuvering control (behavior control).

To express the user's various emotional states, the electronic device provides multiple candidate images. To find the user's desired one among the candidate images, a search needs to be done on each candidate image. Thus, it may take a long time to provide the desired image. There is no technology related to choosing or editing images corresponding to emotions among a plurality of users. Nor is there technology to merge images corresponding to a plurality of users into a single image and provide the same.

The above information is presented as background information only to assist with an understanding of the disclosure. No determination has been made, and no assertion is made, as to whether any of the above might be applicable as prior art with regard to the disclosure.

SUMMARY

According to various embodiments, an electronic device and method for operating the electronic device may provide an image selected and/or edited depending on the type and/or degree of the user's emotion. According to various embodiments, an electronic device and method for operating the electronic device may select and/or edit an image corresponding to the emotion among a plurality of users and provide the selected and/or edited image. According to various embodiments, an electronic device and method for operating the electronic device may merge images corresponding to a plurality of users into a single image and provided the merged image.

According to an embodiment, an electronic device comprises an input device comprising input circuitry, a display device, a communication circuit, and a processor configured to control the electronic device to: receive a text through the input device, transmit information about the text through the communication circuit to a server, receive information associated with an image identified based on a first user's emotional state identified as a result of analysis of the text and an emotional state of a second user conversing with the first user, and display the image through the display device based on the information associated with the image.

According to an embodiment, a method for operating an electronic device comprises receiving a text, transmitting information about the text to a server, receiving information associated with an image identified based on a first user's emotional state identified as a result of analysis of the text and an emotional state of a second user conversing with the first user, and displaying the image based on the information associated with the image.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS to the above and/or other aspects, features and attendant advantages of various example embodiments of the present disclosure will be more apparent and readily appreciated from the following detailed description, taken in conjunction with the accompanying drawings, in which like reference numerals refer to like elements, and wherein.

Throughout the drawings, like reference numerals will be understood to refer to like parts, components, and structures.

DETAILED DESCRIPTION

Figure 1A:
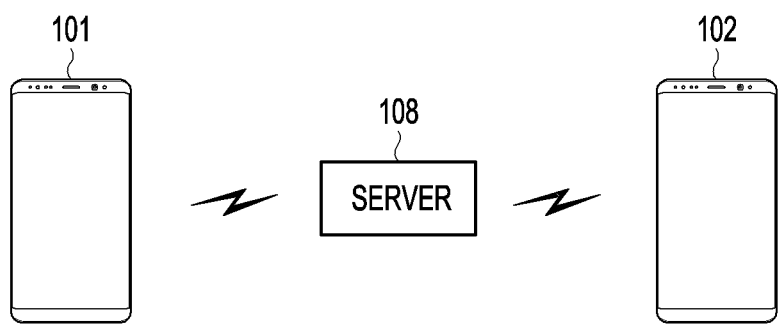
FIG. 1A is a diagram illustrating an example electronic device, an example external electronic device, and a server according to an embodiment.
Figure 1B:
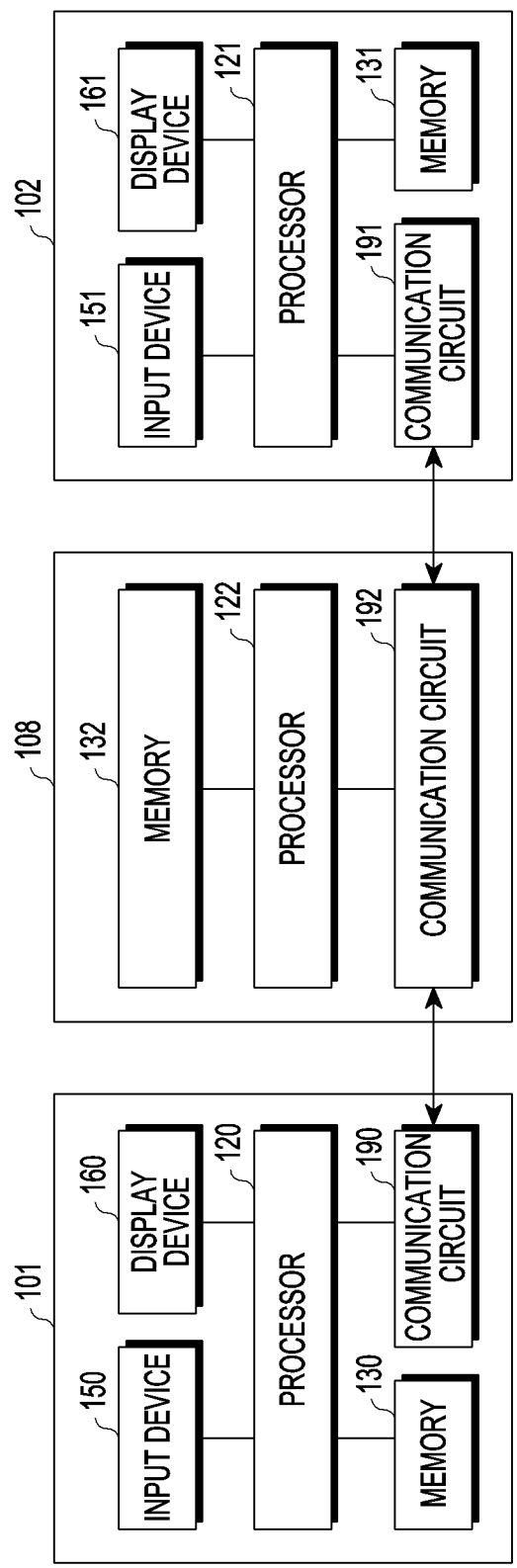
FIG. 1B is a block diagram illustrating an example electronic device, an example external electronic device, and a server according to an embodiment.

FIG. 1A is a diagram illustrating an example electronic device, an example external electronic device, and a server according to an embodiment. FIG. 1B is a block diagram illustrating an example electronic device, an example external electronic device, and a server according to an embodiment.

According to an embodiment, an electronic device 101 may communicate with a server 108, and an external electronic device 102 may communicate with the server 108. The electronic device 101 may communicate with the external electronic device 102 and/or the server 108 through, for example, and without limitation, a long-range wireless communication network, or the like. Although not shown, the electronic device 101 may directly communicate with the external electronic device 102 through, for example, and without limitation, a short-range wireless communication network, or the like.

According to an embodiment, the electronic device 101 may transmit data to the external electronic device 102 through the server 108 and/or receive data from the external electronic device 102 through the server 108. For example, the electronic device 101 may transmit at least one of information about a text or information about an image to the external electronic device 102 through the server 108. The electronic device 101 may receive at least one of information about a text or information about an image from the external electronic device 102 through the server 108. In the disclosure, the "electronic device 101, the external electronic device 102, and/or the server 108 each may perform a particular operation" may be appreciated as a processor (e.g., including processing circuitry) 120, a processor (e.g., including processing circuitry) 121, and/or a processor (e.g., including processing circuitry) 122 each of which may perform a particular operation. The "electronic device 101, the external electronic device 102, or the server 108 each may perform a particular operation" may, for example, be appreciated as the processor 120, the processor 121, and/or the processor 122 each controlling various elements, such as, for example, and without limitation, hardware, or the like, inside or outside the electronic device 101, the external electronic device 102, and/or the server 108 to perform the particular operation. The "electronic device 101, the external electronic device 102, or the server 108 each may perform a particular operation" may be appreciated as a memory 130, a memory 131, and/or a memory 132 each storing instructions which, when executed by at least one of the processor 120, the processor 121, and/or the processor 122 and/or the hardware, may control an element (e.g., electronic device, server, or the like) to perform the particular operation.

According to an embodiment, the electronic device 101 may include a processor (e.g., including processing circuitry) 120, a memory 130, an input device (e.g., including input circuitry) 150, a display device 160, and a communication circuit 190. The external electronic device 102 may include a processor (e.g., including processing circuitry) 121, a memory 131, an input device (e.g., including input circuitry) 151, a display device 161, and a communication circuit 191. The server 108 may include a processor (e.g., including processing circuitry) 122, a memory 132, and a communication circuit 192.

According to an embodiment, the processor 120 may include various processing circuitry and execute, e.g., software (e.g., a program) to control at least one other component (e.g., a hardware and/or software component) of the electronic device 101 connected with the processor 120 and may process and/or compute various data. According to one embodiment, as at least part of the data processing and/or computation, the processor 120 may load a command and/or data received from another component (e.g., the communication circuit_190 and/or a sensor module (not shown)) onto a volatile memory, process the command and/or the data stored in the volatile memory, and store resulting data in, for example, a non-volatile memory. According to an embodiment, the processor 120 may include various processing circuitry, such as, for example, and without limitation, a main processor (e.g., a central processing unit (CPU), an application processor (AP), or the like), or the like, and an auxiliary processor (e.g., a graphics processing unit (GPU), an image signal processor (ISP), a sensor hub processor, a communication processor (CP), or the like), or the like that is operable independently from, and/or in conjunction with, the main processor. The auxiliary processor may be adapted to consume less power than the main processor, or to be specific to a specified function. The auxiliary processor may be implemented as separate from, or as part of the main processor. The auxiliary processor may control at least some of functions or states related to at least one (e.g., the display device 160 and/or the communication circuit 190) of the components of the electronic device 101, instead of the main processor while the main processor is in an inactive (e.g., sleep) state or along with the main processor while the main processor is an active state (e.g., executing an application). According to an embodiment, the auxiliary processor (e.g., an image signal processor or a communication processor)

may be implemented as part of another component (e.g., the communication circuit 190) functionally related to the auxiliary processor.

The memory 130 may store various data used by at least one component (e.g., the processor 120) of the electronic device 101. The various data may include, for example, and without limitation, software (e.g., the program), or the like, and input data, output data, or the like for a command related thereto. The memory 130 may include a volatile memory and/or a non-volatile memory.

The input device 150 may include various input circuitry and receive a command and/or data to be used by other component (e.g., the processor 120) of the electronic device 101, from the outside (e.g., a user) of the electronic device 101. The input device 150 may include various input circuitry, such as, for example, and without limitation, a microphone, a mouse, a keyboard, or the like.

The display device 160 may visually provide information to the outside (e.g., a user) of the electronic device 101. The display device 160 may include, for example, and without limitation, a display, a hologram device, a projector, or the like and control circuitry to control a corresponding one of the display, hologram device, and/or projector. According to an embodiment, the display device 160 may include touch circuitry adapted to detect a touch, and/or sensor circuitry (e.g., a pressure sensor) adapted to measure the intensity of force incurred by the touch. The input device 150 and the display device 160 may be implemented, for example, and without limitation, as a touchscreen device.

The communication circuit 190 may support establishing a direct (e.g., wired) communication channel or wireless communication channel between the electronic device 101 and an external electronic device (e.g., the external electronic device 102 or the server 108) and performing communication through the established communication channel. The communication circuit 190 may include one or more communication processors that are operable independently from the processor 120 (e.g., the application processor (AP)) and supports a direct (e.g., wired) communication or a wireless communication. According to an embodiment, the communication circuit 190 may include a wireless communication module (e.g., a cellular communication module, a short-range wireless communication module, and/or a global navigation satellite system (GNSS) communication module) and/or a wired communication module (e.g., a local area network (LAN) communication module and/or a power line communication (PLC) module). A corresponding one of these communication modules may communicate with the external electronic device via a first network (e.g., a short-range communication network, such as Bluetooth™, wireless-fidelity (Wi-Fi) direct, or infrared data association (IrDA)) or a second network (e.g., a long-range communication network, such as a cellular network, the Internet, or a computer network (e.g., LAN or wide area network (WAN)). These various types of communication modules may be implemented using various communication circuitry implemented, for example, and without limitation, as a single component (e.g., a single chip), as multi components (e.g., multi chips) separate from each other, or the like. The wireless communication module may identify and authenticate the electronic device 101 in a communication network, such as the first network or the second network, using subscriber information (e.g., international mobile subscriber identity (IMSI)) stored in the subscriber identification module.

The processor 121 and the processor 122 may include substantially the same components as the processor 120 and/or provide substantially the same functions as the processor 120. The memory 131 and the memory 132 may include substantially the same components as the memory 130 and/or provide substantially the same functions as the memory 130. The communication circuit 191 and the communication circuit 192 may include substantially the same components as the communication circuit 190 and/or provide substantially the same functions as the communication circuit 190. The input device 151 may include substantially the same components as the input device 150 and/or provide substantially the same functions as the input device 150. The display device 161 may include substantially the same components as the display device 160 and/or provide substantially the same functions as the display device 160.

Some of the above-described components may be connected together through an inter-peripheral communication scheme (e.g., a bus, general purpose input/output (GPIO), serial peripheral interface (SPI), mobile industry processor interface (MIPI), or the like), communicating signals (e.g., instructions and/or data) therebetween.

According to an embodiment, commands and/or data may be transmitted or received between the electronic device 101 and the external electronic device 102 via the server 108. The external electronic device 102 may be the same or different in type from the electronic device 101. According to an embodiment, all or some of operations executed on the electronic device 101 may be run on one or more other external electronic devices. According to an embodiment, when the electronic device 101 should perform a certain function or service automatically or at a request, the electronic device 101, instead of, or in addition to, executing the function or service on its own, may request an external electronic device to perform at least some functions associated therewith. The external electronic device receiving the request may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2A:
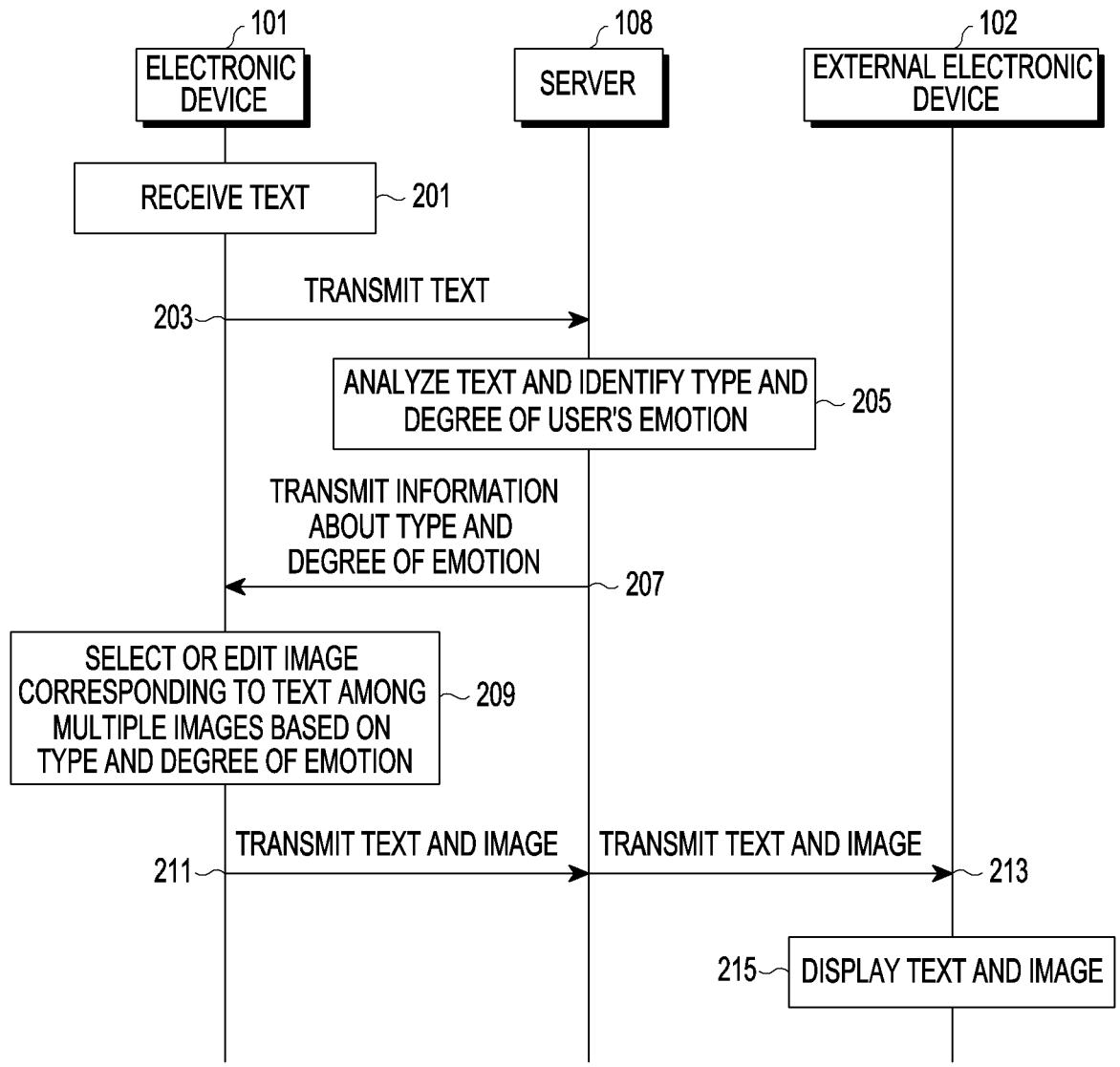
FIG. 2A is a flowchart illustrating an example method of operating an electronic device according to an embodiment.
Figure 2B:
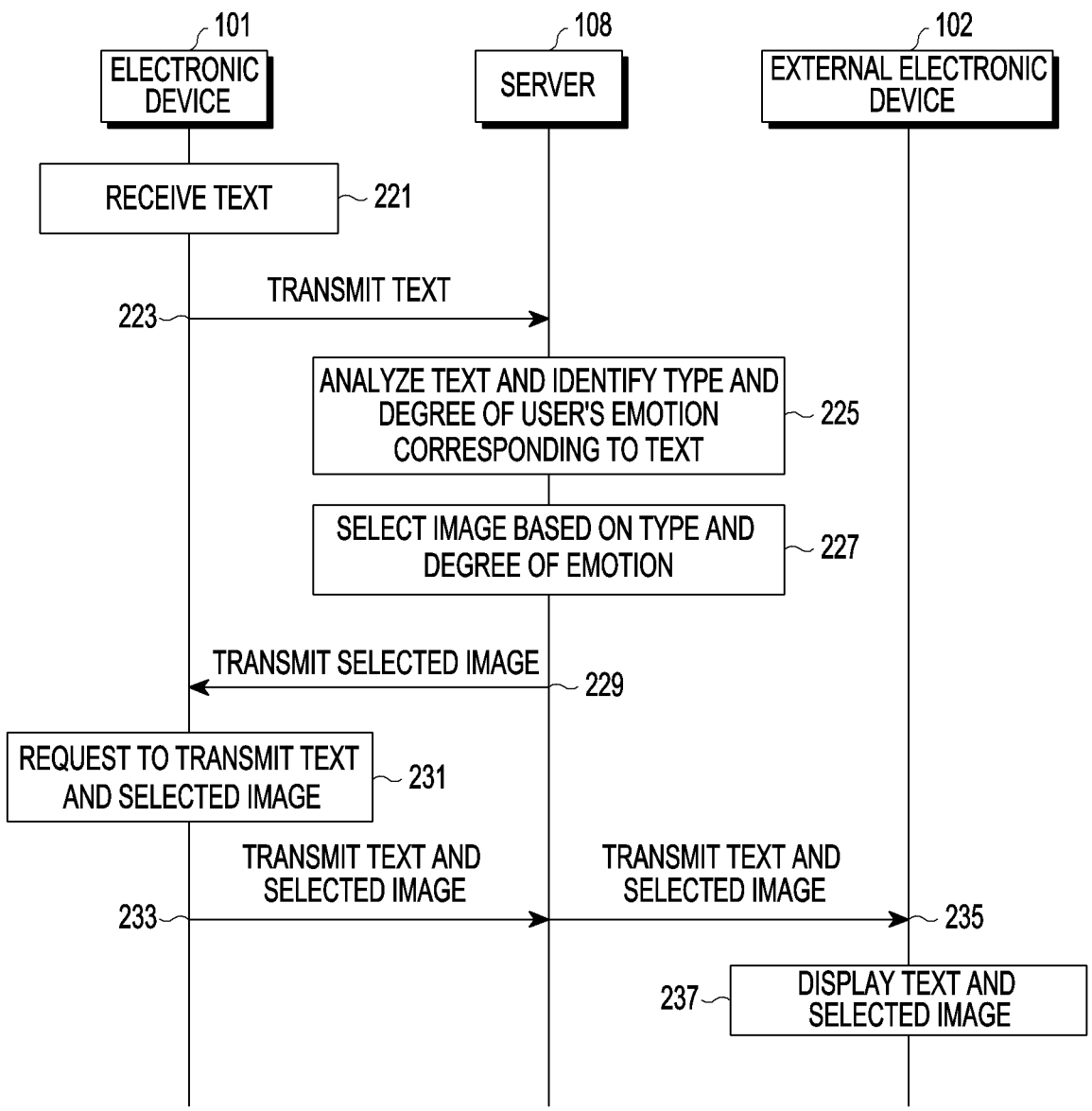
FIG. 2B is a flowchart illustrating an example method of operating an electronic device according to an embodiment.
Figure 2C:
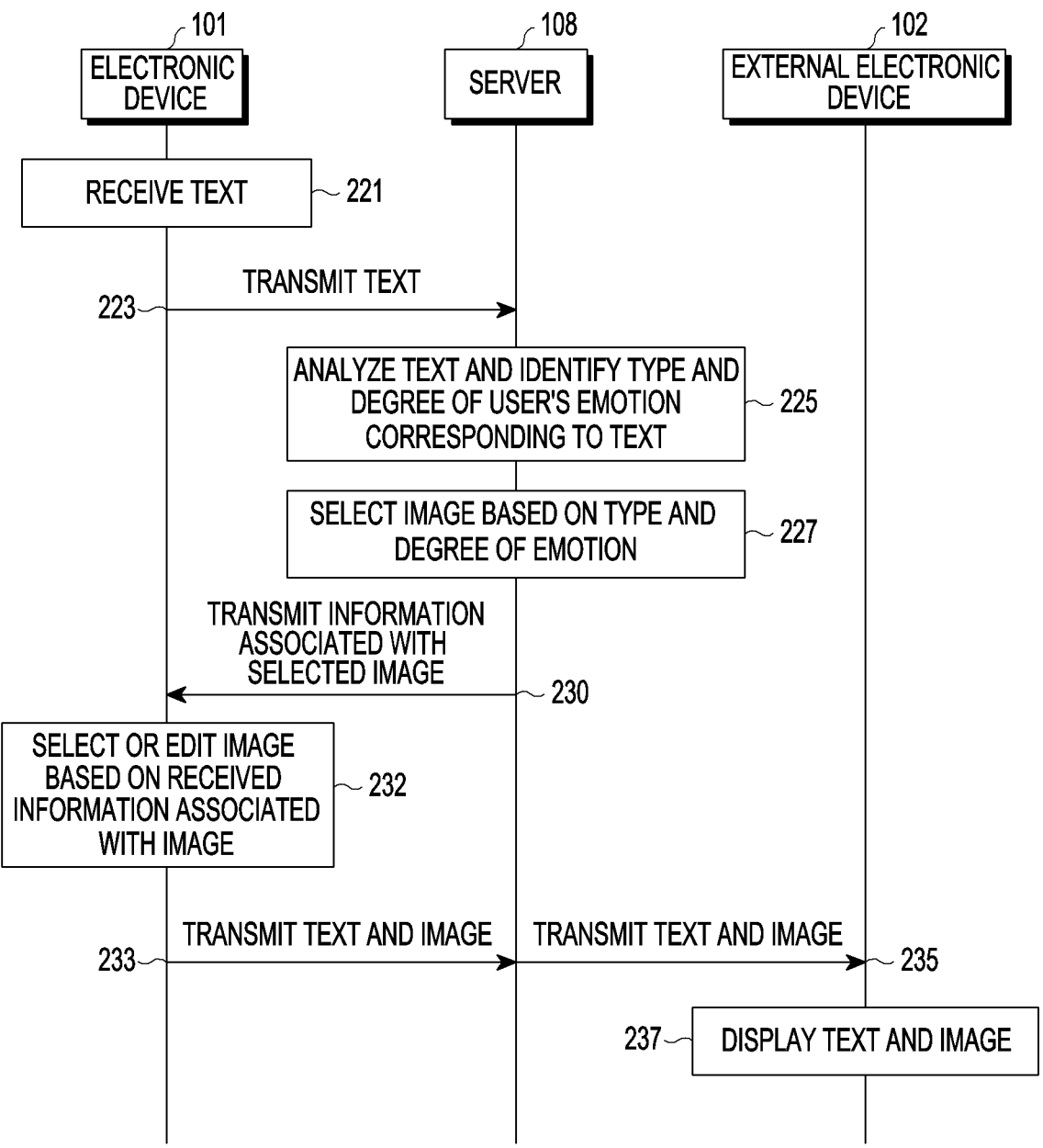
FIG. 2C is a flowchart illustrating an example method of operating an electronic device according to an embodiment.
Figure 2D:
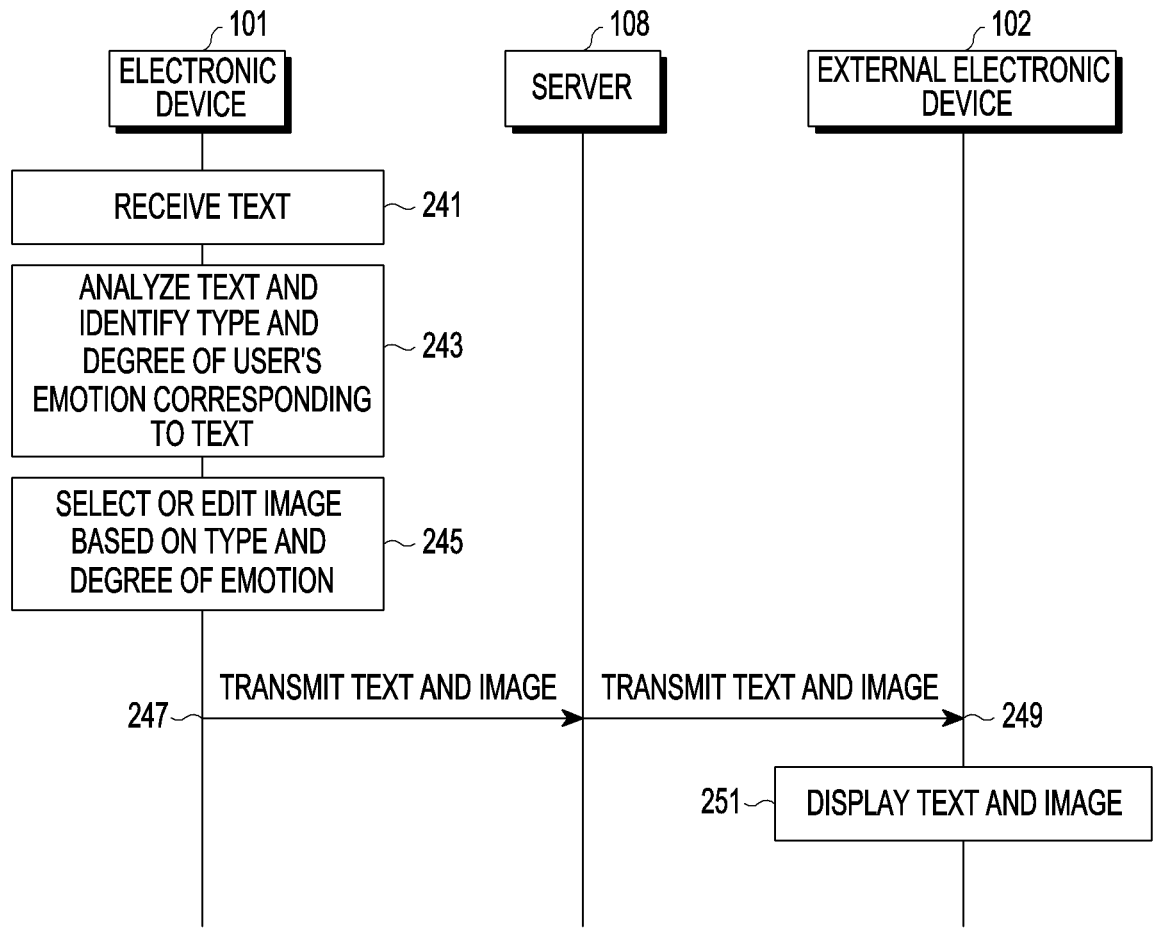
FIG. 2D is a flowchart illustrating an example method of operating an electronic device according to an embodiment.

FIG. 2A is a flowchart illustrating an example method of operating an electronic device according to an embodiment. FIG. 2B is a flowchart illustrating an example method of operating an electronic device according to an embodiment. FIG. 2C is a flowchart illustrating an example method of operating an electronic device according to an embodiment. FIG. 2D is a flowchart illustrating an example method of operating an electronic device according to an embodiment.

According to an embodiment, an electronic device 101 may receive a text in operation 201. For example, the electronic device 101 may store and execute an application for message communication and provide an execution screen through the display device 160. The electronic device 101 may display a user interface that includes, for example, a soft input panel (SIP) to receive text and an input window to display the received text. Based on a touch on at least one object of the SIP, the electronic device 101 may display a text, or a text combination, corresponding to the touched object, based on the input window.

The electronic device 101 may transmit the text to a server 108 in operation 203. The electronic device 101 may transmit the text, e.g., at the user's request. Even without the user's request, the electronic device 101 may transmit the text to the server 108 when a new text is entered. The electronic device 101 may transmit the new text alone or the whole text including the new text to the server 108.

According to an embodiment, the server 108 may analyze the received text and identify the type and degree of the user's emotion corresponding to the text in operation 205. The server 108 may store an algorithm capable of identifying the type and degree of the user's emotion from the text. For example, the server 108 may store a learning model learned using a database for a plurality of texts and a plurality of emotion types and degrees. According to an embodiment, the server 108 may separate the text into morphemes and perform keyword analysis on the morphemes. For example, the server 108 may separate one sentence per word class and identify the type and degree of the user's emotion based on the text corresponding to the noun, adverb, or verb. For example, the server 108 may identify that the type of the user's emotion corresponding to a first text is "sad". The server 108 may identify the degree of the user's emotion corresponding to the first text as one of a plurality of levels. The server 108 may store an algorithm capable of identifying the level indicating the user's emotion based on the result of text analysis and identify the degree of emotion using the algorithm. The server 108 may identify the type of an action based on a text corresponding to a verb. It would be apparent to a skilled artisan that no limitations are posed to schemes for identifying the type and degree of the user's emotion from the text. A configuration for the server 108 to identify the type and degree of emotion through learning is described in greater detail below.

In operation 207, the server 108 may transmit information about the identified type and degree of emotion to the electronic device 101. In operation 209, the electronic device 101 may select an image corresponding to the text among a plurality of images or edit and display a raw image based on the type and degree of emotion. For example, the image may be an emoticon, and may also be referred to as a graphic object. For example, the electronic device 101 may store a plurality of candidate images. The electronic device 101 may classify and store the plurality of candidate images per, e.g., type of emotion. Table 1 illustrates an example in which the electronic device 101 classifies and stores images according to an embodiment.

TABLE 1

| Character | Type of emotion | Degree of emotion | Image |
| --- | --- | --- | --- |
| first character | sad | first level | first image |
|  |  | second level | second image |
|  |  | third level | third image |
|  | happy | first level | fourth image |
|  |  | second level | fifth image |
|  |  | third level | sixth image |
| second character | sad | first level | seventh image |
|  |  | second level | eighth image |
|  |  | third level | ninth image |
|  | happy | first level | tenth image |
|  |  | second level | eleventh image |
|  |  | third level | twelfth image |

As set forth above, the electronic device 101 may store, per character, at least one image (e.g., the first image to the sixth image) corresponding to the same character. Despite the same type of emotion, the electronic device 101 may store different images based on the degree of emotion. For example, the electronic device 101 may receive information indicating that the type of emotion corresponding to the first text is "happy" and the degree of emotion is the second level from the server 108. The electronic device 101 may identify (determine) that a designated character is the first character and provide the fifth image based thereupon. Where no character is designated, the electronic device 101 may identify an image corresponding to a default character. For example, the characters may be images looking like specific animals or humans or may be implemented in various forms, such as things or geometric shapes, but it would be apparent to one of ordinary skill in the art that embodiments of the disclosure are not limited thereto.

Meanwhile, the type of emotion identified by the server 108 may differ from the type of emotion defined by the electronic device 101. The electronic device 101 may select a type of emotion similar to the type of emotion identified by the server 108. For example, where the type of emotion identified by the server 108 is "delightful", the electronic device 101 may select a similar type of emotion, "happy", to the type of emotion identified by the server 108. The electronic device 101 may determine the similarity based on semantics and determine the type of emotion. Meanwhile, the degree of emotion identified by the server 108 may differ from the degree of emotion defined by the electronic device 101. For example, the electronic device 101 may select a degree of emotion similar to the degree of emotion identified by the server 108. For example, where the degree of emotion identified by the server 108 is "high", the electronic device 101 may select a similar emotion level, "3", to the degree of emotion identified by the server 108. The electronic device 101 may determine the degree based on semantics and determine the type of emotion.

The electronic device 101 may select an image corresponding to the character based on the information received from the server 108 among the plurality of candidate images and provide the selected image.

According to an embodiment, rather than storing the plurality of images, the electronic device 101 may edit and provide a raw image corresponding to the character based on the information received from the server 108. In this case, the electronic device 101 may store raw images as shown in Table 2.

TABLE 2

| Character | Raw image |
| --- | --- |
| first character | first raw image |
| second character | second raw image |

The electronic device 101 may edit and provide the raw image based on the type and degree of emotion received from the server 108. For example, the electronic device 101 may store edit information as shown in Table 3 and edit the raw image based on the edit information.

TABLE 3

| Type of emotion | Degree of emotion | Edit information |
| --- | --- | --- |
| sad | first level | first edit information |
|  | second level | second edit information |
|  | third level | third edit information |
| happy | first level | fourth edit information |
|  | second level | fifth edit information |
|  | third level | sixth edit information |

For example, the edit information may be information for adjusting, for example, and without limitation, one or more of the position, shape, color, changing speed of at least one object, or the like, which is described in greater detail below. For example, where the designated character is identified (determined) to be the first character, the electronic device 101 may load the first raw image. Corresponding to the type of emotion being "happy" and the degree of emotion being the "third level" based on the information received from the server 108, the electronic device 101 may select the sixth edit information. The sixth edit information may, for example, be edit information for moving up the position of both ends of the object corresponding to, e.g., "mouth". Based thereupon, the electronic device 101 may perform an edit for moving up the position of both ends of the object corresponding to the "mouth" of the first raw image and provide an edited image.

According to an embodiment, the electronic device 101 may display the selected or edited image alone or together with the text. The electronic device 101 may dynamically vary the image corresponding to the text displayed on the input window. For example, where the input window displays "Ah~", the electronic device 101 may provide an image corresponding to the type of emotion, "disappointed", and the degree of emotion, "third level", based on the information from the server 108. Thereafter, where an additional text is entered so that the input window displays "Ah~ great~!!", the electronic device 101 may replace with and display an image corresponding to the type of emotion, "happy", and the degree of emotion, "third level", based on the information from the server 108.

In operation 211, the electronic device 101 may transmit the text and the image to the server 108. For example, corresponding to obtaining a text and image transmit command, the electronic device 101 may transmit the text and the provided image to the server 108. In operation 213, the server 108 may transmit the text and image to the external electronic device 102. In operation 215, the external electronic device 102 may display the received text and image. Thus, the external electronic device 102 may display the image automatically provided based on the type and degree of the user's emotion from the electronic device 101.

FIG. 2B is a flowchart illustrating an example method of operating an electronic device according to an embodiment. Where at least some operations of FIGS. 2B, 2C and 2D are substantially the same or similar to at least some operations of FIG. 2A, the operations are described briefly.

According to an embodiment, the electronic device 101 may receive a text in operation 221. In operation 223, the electronic device 101 may transmit the text to the server 108. In operation 225, the server 108 may analyze the text and identify the type and degree of the user's emotion corresponding to the text. In operation 227, the server 108 may select an image based on the type of emotion and the degree of emotion. Unlike in FIG. 2A, the server 108 may store a plurality of candidate images and/or a raw image for editing, and the server 108 may select an image corresponding to the type and degree of the user's emotion identified. In this case, the server 108 may identify a character corresponding to the user's account or use a default character. In operation 229, the server 108 may transmit the selected image to the electronic device 101. The server 108 may also transmit an edited image. In operation 231, the electronic device 101 may receive a request for transmitting the text and the selected image to the external electronic device 102. For example, the electronic device 101 may detect a designation of a "transmit" button on the user interface. In operation 233, the electronic device 101 may transmit the text and the selected image to the server 108. In operation 235, the server 108 may transmit the text and the selected image to the external electronic device 102. In operation 237, the external electronic device 102 may display the text and the selected image.

Referring to FIG. 2C, the electronic device 101 may receive a text in operation 221. In operation 223, the electronic device 101 may transmit the text to the server 108. In operation 225, the server 108 may analyze the text and identify the type and degree of the user's emotion corresponding to the text. In operation 227, the server 108 may select an image based on the type of emotion and the degree of emotion. In operation 230, the server 108 may transmit information associated with the selected image. In other words, rather than transmitting the image itself to the electronic device 101, the server 108 may transmit information for identifying the image or edit information about the image to the electronic device 101. In operation 232, the electronic device 101 may select or edit the image based on the received information associated with the image. The electronic device 101 may select an image among a plurality of candidate images using the information for identifying an image. The electronic device 101 may apply the edit information to the raw image, producing an edited image. In operation 233, the electronic device 101 may transmit the text and the selected image to the server 108. In operation 235, the server 108 may transmit the text and the selected image to the external electronic device 102. In operation 237, the external electronic device 102 may display the text and the selected image.

FIG. 2D is a flowchart illustrating an example method of operating an electronic device according to an embodiment.

In operation 241, according to an embodiment, the electronic device 101 may receive a text. In operation 243, the electronic device 101 may analyze the text and identify the type and degree of the user's emotion corresponding to the text. In other words, the type and degree of the user's emotion may be identified not by the server 108 but by the electronic device 101. The electronic device 101 may identify the type and degree of the user's emotion in substantially the same manner as does the server 108 as described above in FIG. 2A. In operation 245, the electronic device 101 may select or edit the image based on the type and degree of emotion. In operation 247, the electronic device 101 may transmit the text and the selected image to the server 108. In operation 249, the server 108 may transmit the text and the selected image to the external electronic device 102. In operation 251, the external electronic device 102 may display the text and the selected image. According to an embodiment, the electronic device 101 may transmit the image alone through the server 108 to the external electronic device 102.

As set forth above, the identifying of the type and degree of the user's emotion may be carried out by the server 108 or the electronic device 101, and the selecting or editing of the image may also be performed by the server 108 or the electronic device 101. Accordingly, the configuration in which the electronic device 101 identifies the type and degree of emotion may be replaced with the configuration in which the server 108 identifies the type and degree of emotion or vice versa. The configuration in which the electronic device 101 selects or edits the image based on the type and degree of emotion may be replaced with the configuration in which the server 108 selects or edits the image based on the type and degree of emotion or vice versa.

Figure 3:
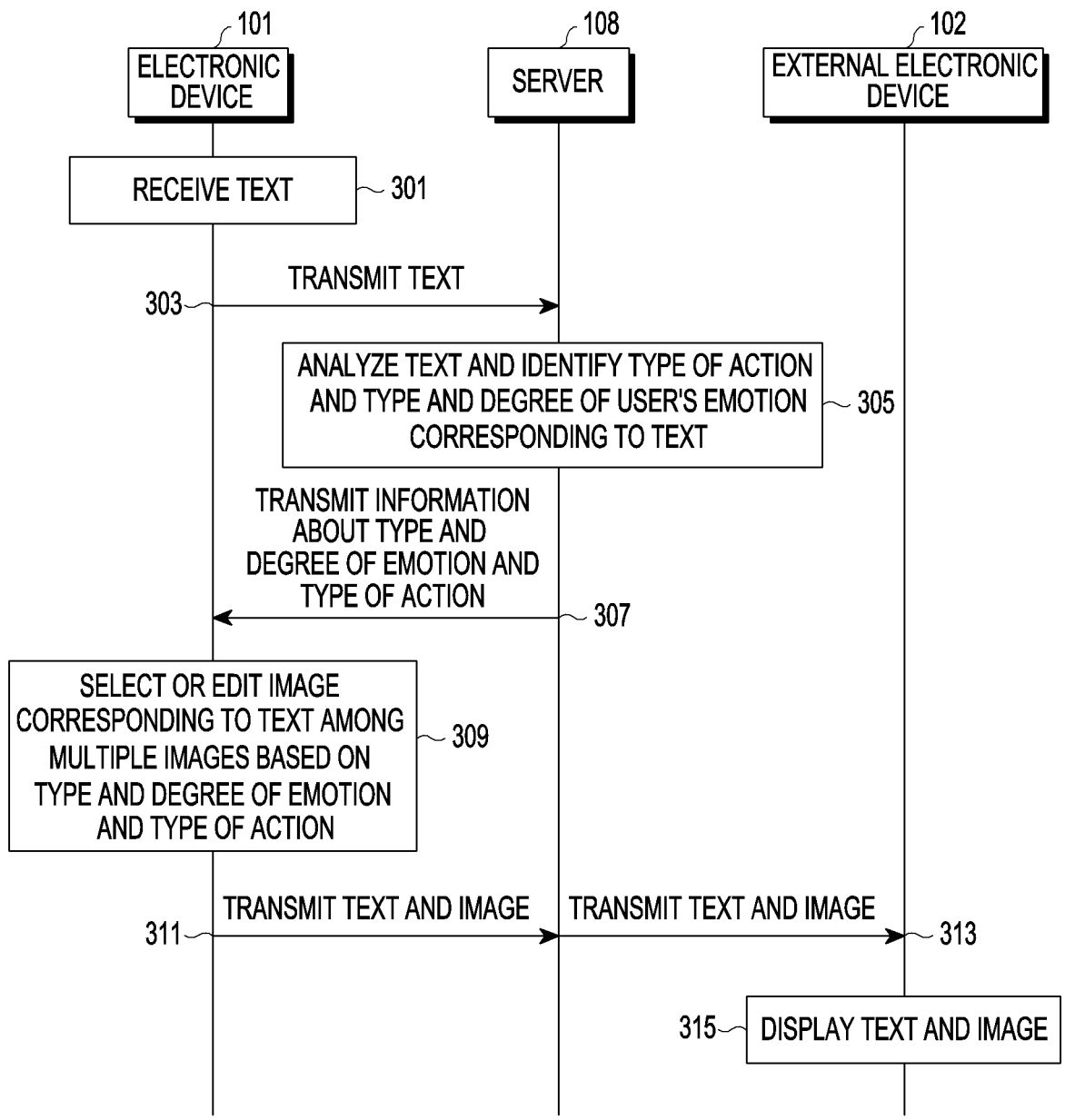
FIG. 3 is a flowchart illustrating an example method of operating an electronic device according to an embodiment.

FIG. 3 is a flowchart illustrating an example method of operating an electronic device according to an embodiment.

According to an embodiment, an electronic device 101 may receive a text in operation 301. In operation 303, the electronic device 101 may transmit the text to the server 108. In operation 305, the server 108 may analyze the text and identify the type and degree of the user's emotion and the type of action corresponding to the text. As described above in connection with FIG. 2A, the server 108 may identify the type and degree of the user's emotion and may further identify the type of action. For example, the server 108 may identify the type of action based on a keyword corresponding to the verb in the text. In operation 307, the server 108 may transmit information about the type and degree of emotion and the type of action to the electronic device 101. In operation 309, the electronic device 101 may select or edit an image corresponding to the text among a plurality of images based on the type and degree of emotion and the type of action. For example, the electronic device 101 may include candidate images per type of emotion, degree of emotion, and type of action and select an image from among the candidate images based on information received from the server 108. The electronic device 101 may store edit information per type of action. The electronic device 101 may identify the edit information based on the information received from the server 108 and may apply the edit information to a raw image, producing an edited image. In operation 311, the electronic device 101 may transmit the text and the selected image to the server 108. In operation 313, the server 108 may transmit the text and the selected image to the external electronic device 102. In operation 315, the external electronic device 102 may display the text and the selected image. According to an embodiment, as described above in connection with FIGS. 2B, 2C and 2D, the electronic device 101 may analyze the text and identify the type of action. The server 108 may also select or edit the image.

Figure 4A:
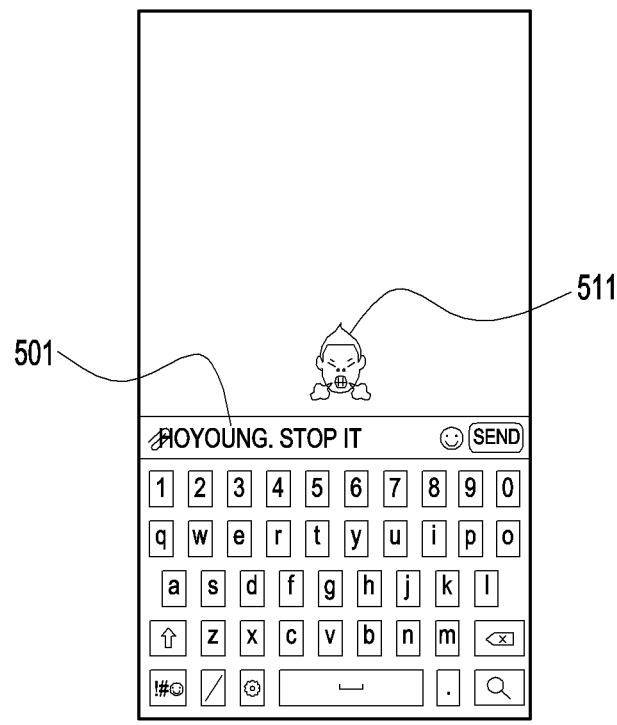
FIG. 4A is a diagram illustrating an example screen displayed on an electronic device according to an embodiment.
Figure 4B:
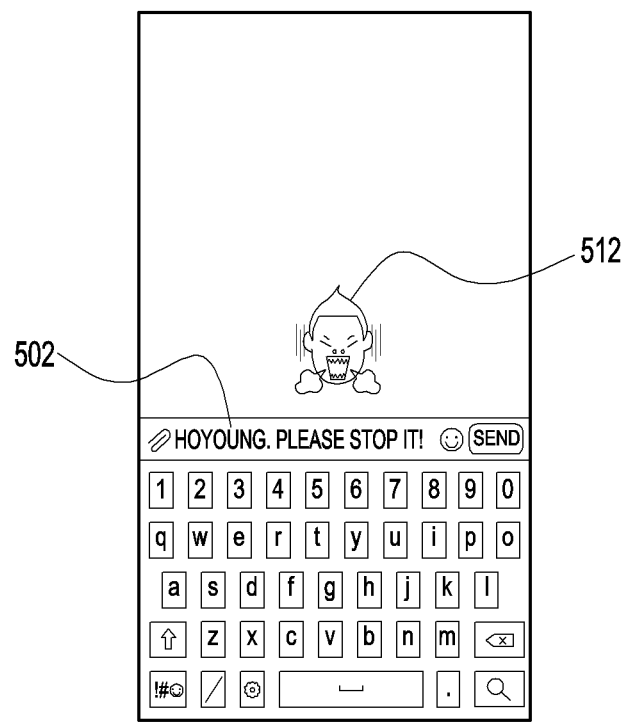
FIG. 4B is a diagram illustrating an example screen displayed on an electronic device according to an embodiment.
Figure 4C:
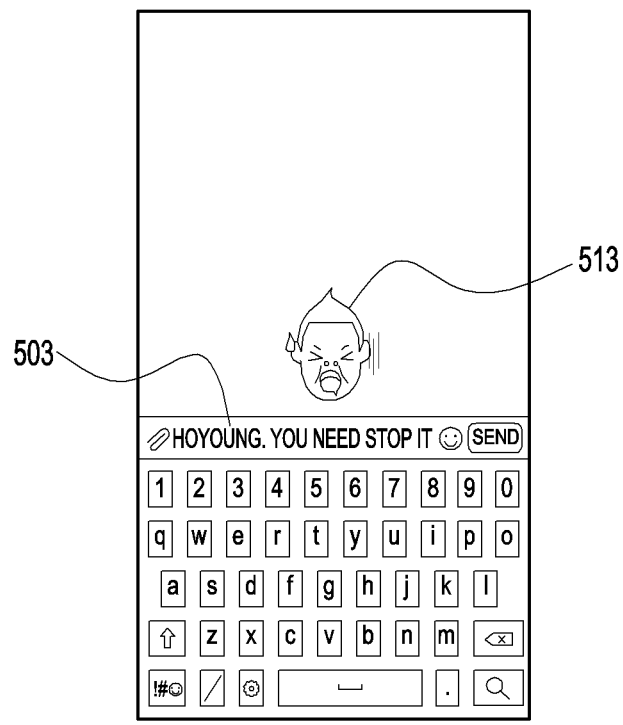
FIG. 4C is a diagram illustrating an example screen displayed on an electronic device according to an embodiment.

FIG. 4A is a diagram illustrating an example screen displayed on an electronic device according to an embodiment. FIG. 4B is a diagram illustrating an example displayed on an electronic device according to an embodiment. FIG. 4C is a diagram illustrating an example displayed on an electronic device according to an embodiment.

According to an embodiment, the electronic device 101 may transmit the text 501 "Hoyoung. Stop it" displayed on the input window as shown in FIG. 4A to the server 108. As a result of analyzing the text "Hoyoung. Stop it", the server 108 may identify (determine) that the type of the user's emotion is "unpleasant", and the degree of emotion is the first level. The server 108 may transmit the identified information, e.g., the type of emotion, "unpleasant", and the degree of emotion, the first level, to the electronic device 101. The electronic device 101 may display the first image 511 based on the type of emotion, "unpleasant", and the degree of emotion, the first level. The electronic device 101 may transmit the text 502 "Hoyoung. Please stop it" displayed on the input window as shown in FIG. 4B to the server 108. For example, upon detecting the user's additional entry of "please" between a portion of the text, "Hoyoung", and another portion of the text, "stop it", the electronic device 101 may transmit the added portion, "Please", or the whole text, "Hoyoung. Please stop it", to the server 108. Based on a result of analyzing the text, the server 108 may identify that the type of emotion is "unpleasant", and the degree of emotion is the second level and may transmit the information to the electronic device 101. The electronic device 101 may display the second image 512 based on the type of emotion, "unpleasant", and the degree of emotion, the second level.

The electronic device 101 may transmit the text 503 "Hoyoung. You need stop it" displayed on the input window as shown in FIG. 4C to the server 108. Based on a result of analyzing the text, the server 108 may identify that the type of emotion is "embarrassed", and the degree of emotion is the first level and may transmit the information to the electronic device 101. The electronic device 101 may display the third image 513 based on the type of emotion, "embarrassed", and the degree of emotion, the first level.

Figure 5:
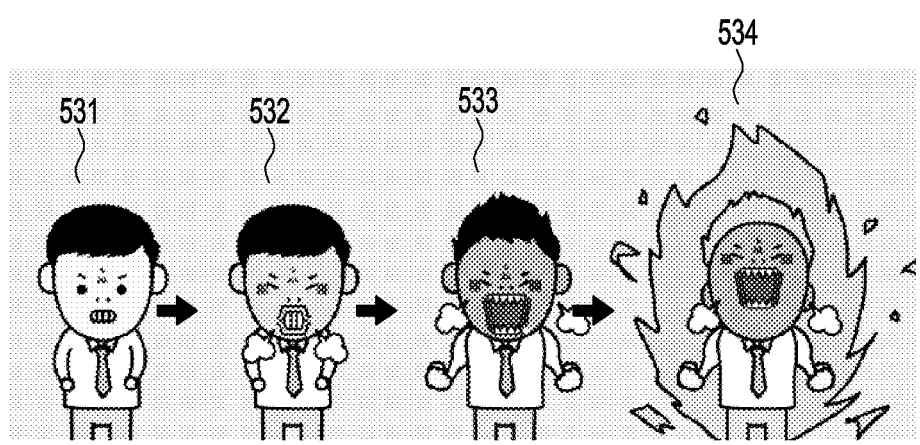
FIG. 5 is a diagram illustrating an example of changing images depending on a variation in the degree of emotion according to an embodiment.

FIG. 5 is a diagram illustrating an example of changing images depending on a variation in the degree of emotion according to an embodiment.

Referring to FIG. 5, the electronic device 101 may store a first image 531 corresponding to a first degree of emotion, a second image 532 corresponding to a second degree of emotion, a third image 533 corresponding to a third degree of emotion, and a fourth image 534 corresponding to a fourth degree of emotion. The electronic device 101 may store the first image 531 to the fourth image 534 corresponding to the type of emotion, "outraged", of a first character. Thus, where, as a result of analysis by the server 108 or the electronic device 101, the type of emotion is identified as "outrageous", and the character the electronic device 101 is currently using is the first character or a default character is the first character, the electronic device 101 may select any one among the first image 531 to the fourth image 534 depending upon the degree of emotion.

Figure 6:
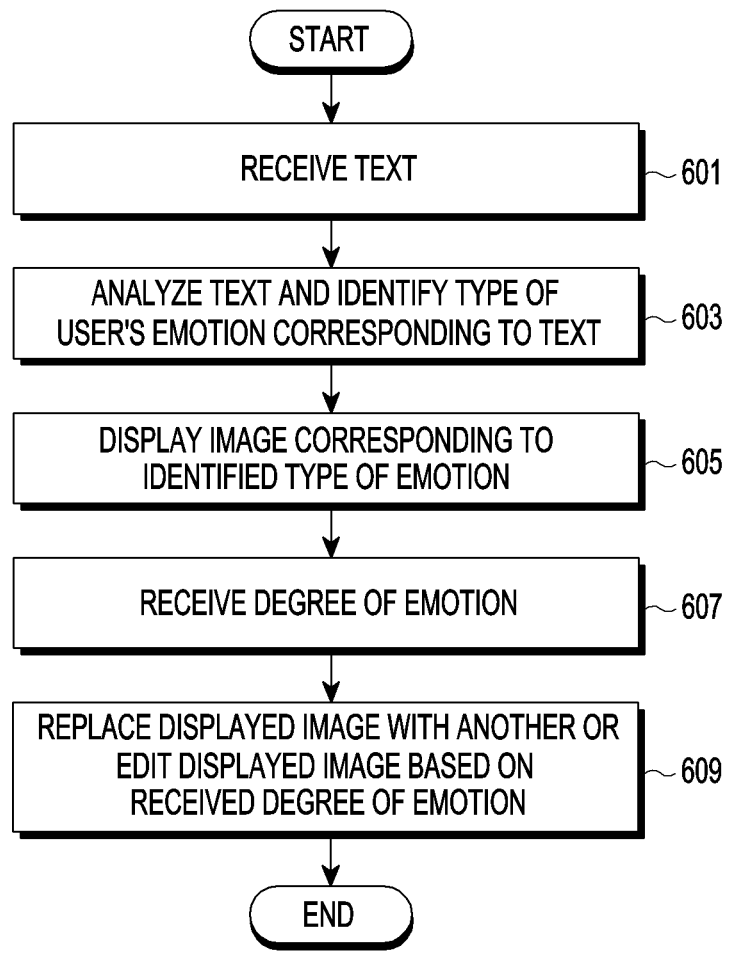
FIG. 6 is a flowchart illustrating an example method of operating an electronic device according to an embodiment.
Figure 7A:
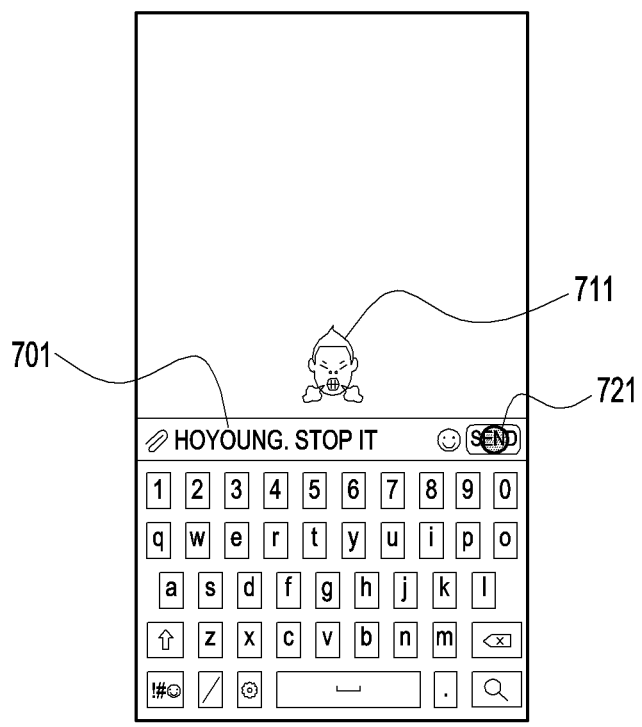
FIG. 7A is a diagram illustrating an example screen displayed on an electronic device according to an embodiment.
Figure 7B:
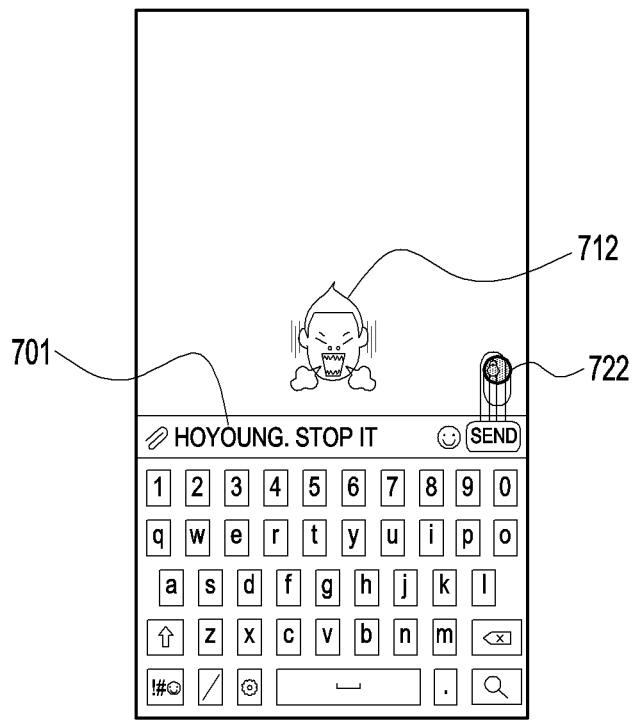
FIG. 7B is a diagram illustrating an example screen displayed on an electronic device according to an embodiment.
Figure 7C:
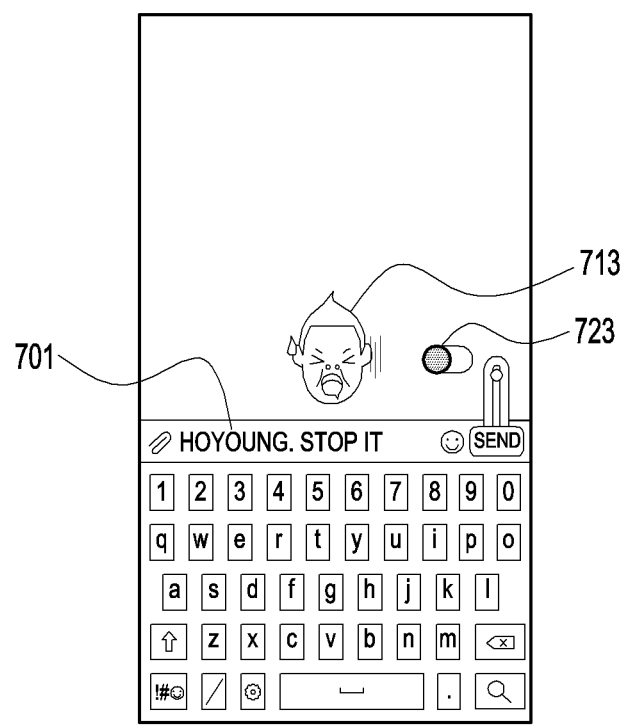
FIG. 7C is a diagram illustrating an example screen displayed on an electronic device according to an embodiment.

FIG. 6 is a flowchart illustrating an example method of operating an electronic device according to an embodiment of the disclosure. The embodiment related to FIG. 6 is described in greater detail with reference to FIGS. 7A, 7B and 7C. FIG. 7A is a diagram illustrating an example screen displayed on an electronic device according to an embodiment. FIG. 7B is a diagram illustrating an example screen displayed on an electronic device according to an embodiment. FIG. 7C is a diagram illustrating an example screen displayed on an electronic device according to an embodiment.

According to an embodiment, an electronic device 101 may receive a text in operation 601. In operation 603, the electronic device 101 may analyze the text and identify the type of the user's emotion corresponding to the text. For example, the electronic device 101 may directly identify the type of the user's emotion or may receive information about the type of emotion identified by the server 108. In operation 605, the electronic device 101 may display an image corresponding to the identified type of emotion. For example, the electronic device 101 may display a first image 711 corresponding to the type of emotion, "unpleasant", identified corresponding to the text 701 "Hoyoung. Stop it!!" as shown in FIG. 7A. The first image 711 may be an image corresponding to a default degree of emotion, e.g., the first level.

In operation 607, the electronic device 101 may receive a degree of emotion. For example, the electronic device 101 may detect a touch 721 on the touchscreen (e.g., a message send button) as shown in FIG. 7A and may detect a touch's continuous movement 722 (e.g., a drag input, flick input, or the like) in a first direction as shown in FIG. 7B. In operation 609, the electronic device 101 may replace the displayed image with a different (e.g., another) image or edit the displayed image based on the received degree of emotion. For example, as shown in FIG. 7B, the electronic device 101 may receive the touch's continuous movement 722 in the first direction as an emotion degree change command and display a second image 712 corresponding to the degree of emotion varied corresponding thereto.

According to an embodiment, the electronic device 101 may receive an emotion type change command and, accordingly, vary and display the image. For example, as shown in FIG. 7C, the electronic device 101 may detect a touch's continuous movement 723 in a second direction. The electronic device 101 may receive the touch's continuous movement 723 in the second direction as an emotion type change command and display a third image 713 corresponding to the type of emotion varied corresponding thereto. It will be apparent to one of ordinary skill in the art that differentiating between the emotion type change command and the emotion degree change command based on the direction of the touch's continuous movement is merely an example and the emotion type change command or the emotion degree change command is not limited thereby or thereto as long as it is an input that may be differentiated.

Figure 8A:
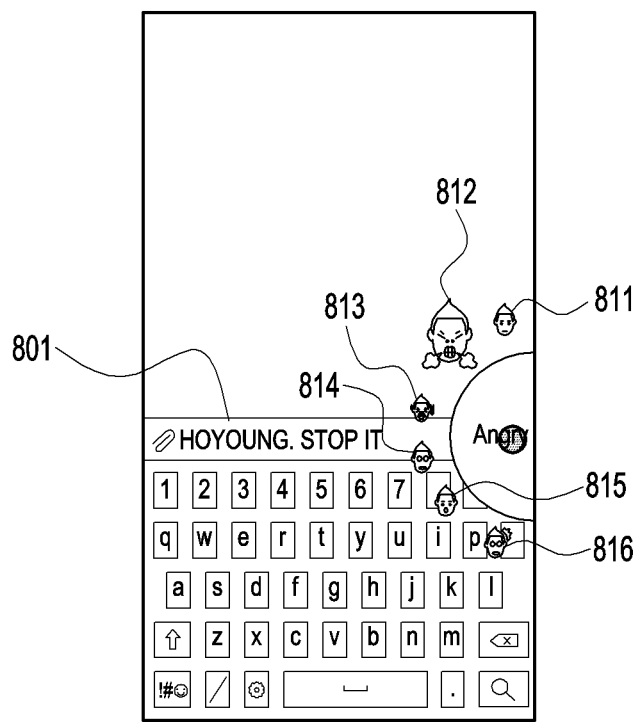
FIG. 8A is diagram illustrating an example screen displayed on an electronic device according to an embodiment.
Figure 8B:
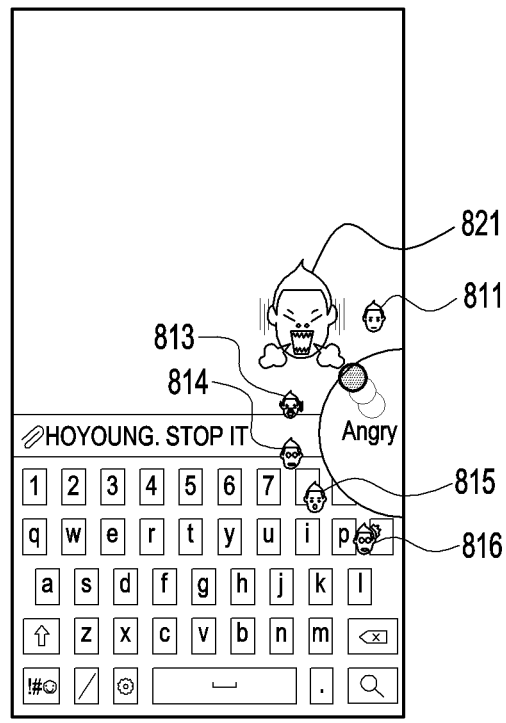
FIG. 8B is diagram illustrating an example screen displayed on an electronic device according to an embodiment.
Figure 8C:
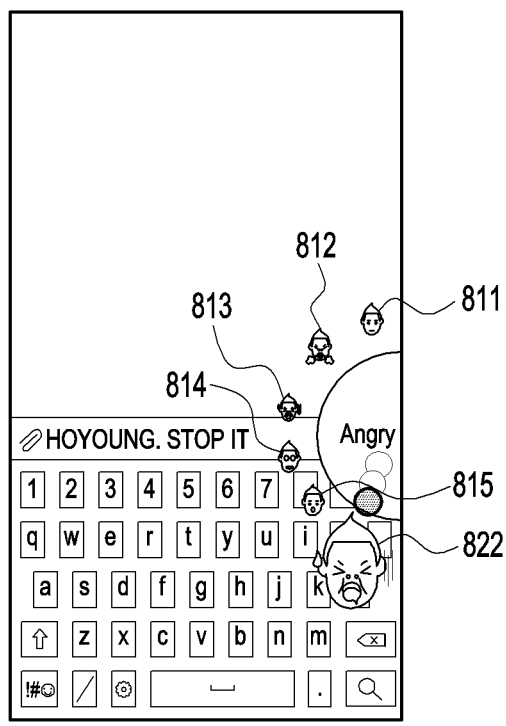
FIG. 8C is a diagram illustrating an example screen displayed on an electronic device according to an embodiment.

FIG. 8A is diagram illustrating an example screen displayed on an electronic device according to an embodiment. FIG. 8B is diagram illustrating an example screen displayed on an electronic device according to an embodiment. FIG. 8C is a diagram illustrating an example screen displayed on an electronic device according to an embodiment.

Referring to FIG. 8A, according to an embodiment, the electronic device 101 may display a plurality of candidate images 811, 812, 813, 814, 815 and 816 corresponding to a first character, along with a text 801. As shown in FIG. 8B, the electronic device 101 may detect a touch's continuous movement, detect the touch being directed toward a second image 821 and, accordingly, display the second image 821 to be relatively larger than the other images. Further, the electronic device 101 may identify the degree of emotion based on the distance of the touch's continuous movement. As shown in FIG. 8C, the electronic device 101 may detect the touch being directed toward a sixth image 822 and, accordingly, display the sixth image 822 to be relatively larger than the other images. Upon detecting a confirm command on the image, the electronic device 101 may select the image as an image to be transmitted.

Figure 9:
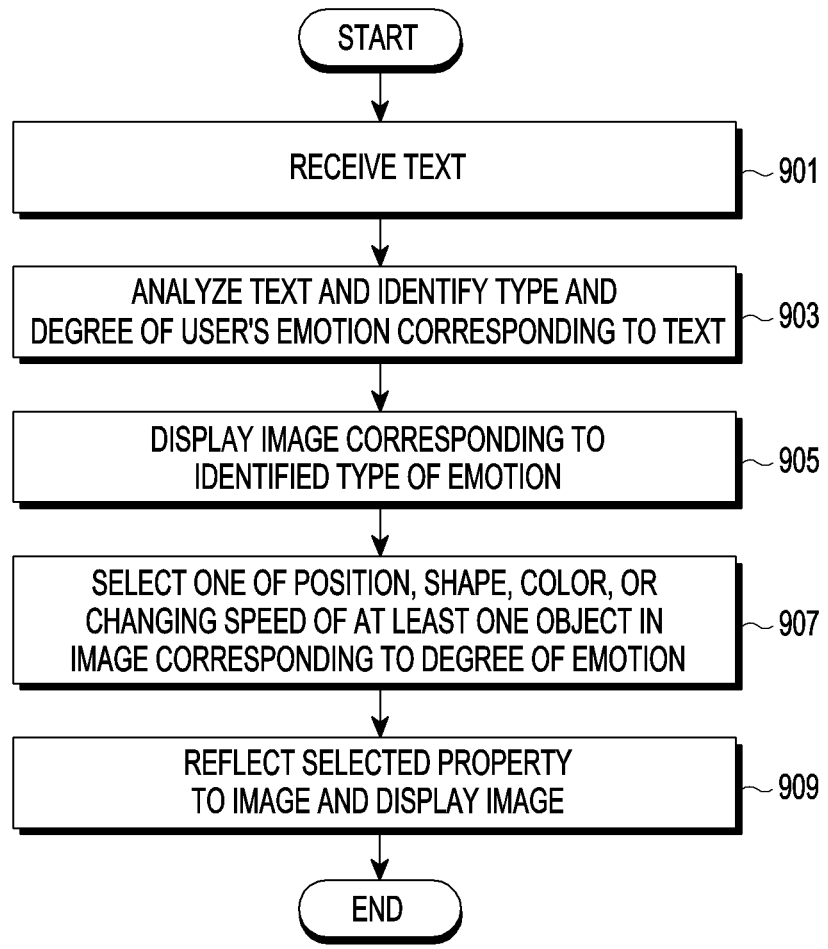
FIG. 9 is a flowchart illustrating an example method of operating an electronic device according to an embodiment.
Figure 10A:
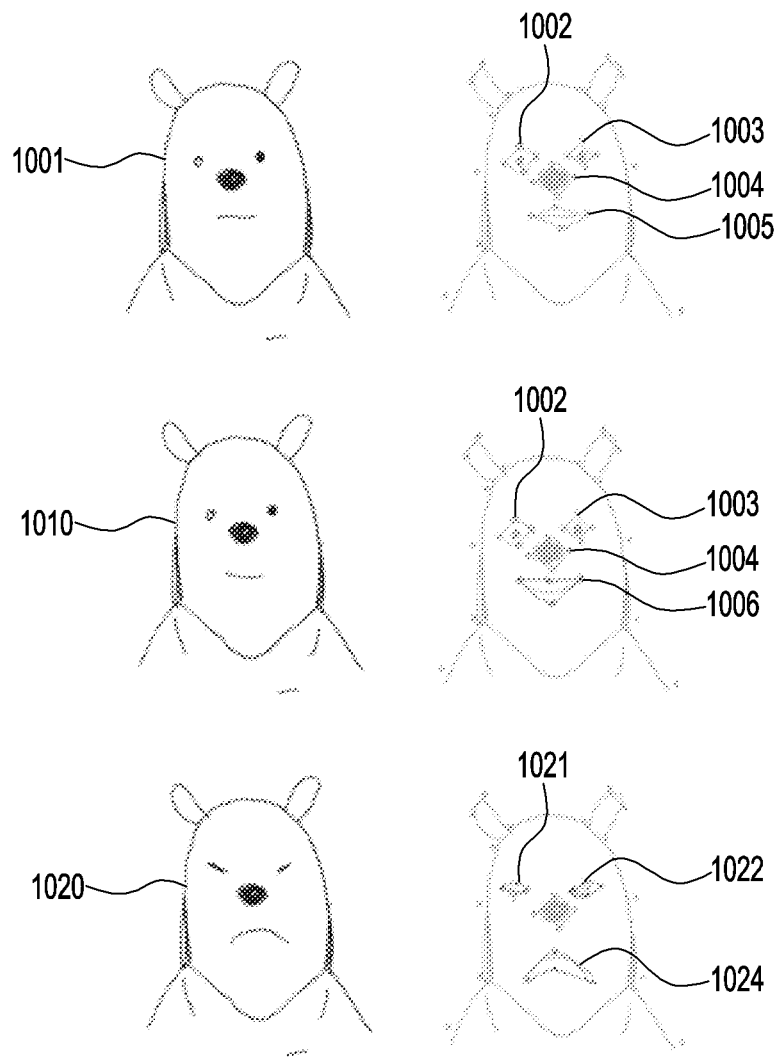
FIG. 10A is a diagram illustrating an example of editing an image according to an embodiment.
Figure 10B:
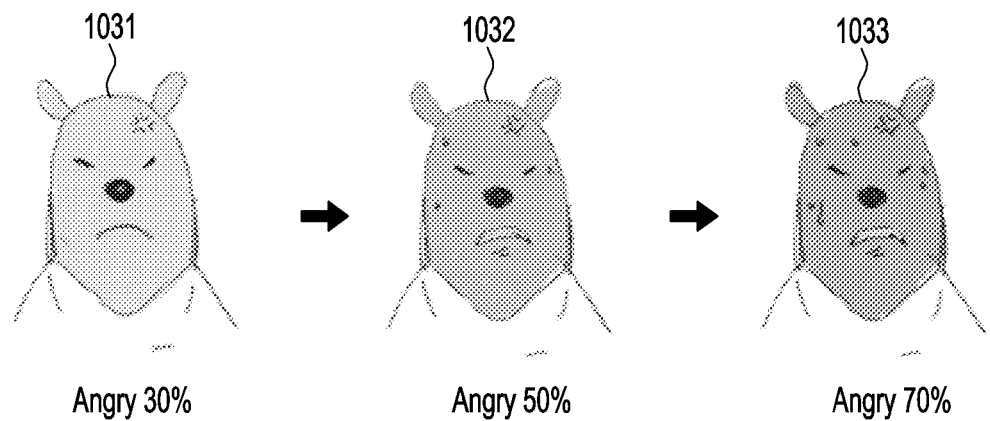
FIG. 10B is a diagram illustrating an example of editing an image according to an embodiment.
Figure 10C:
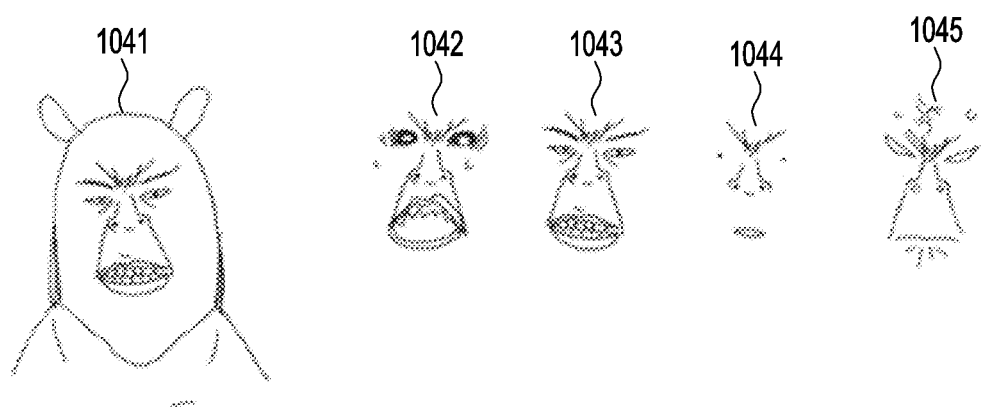
FIG. 10C is a diagram illustrating an example of editing an image according to an embodiment.
Figure 10D:
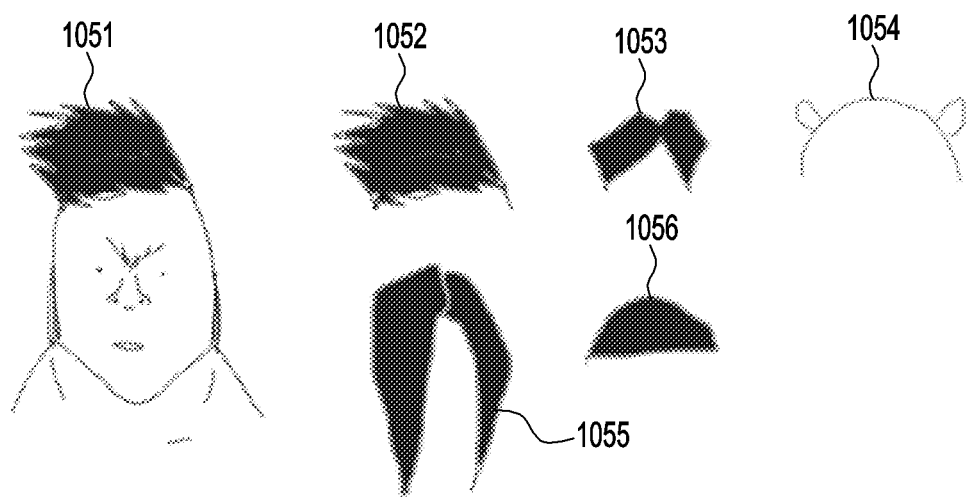
FIG. 10D is a diagram illustrating an example of editing an image according to an embodiment.
Figure 10E:
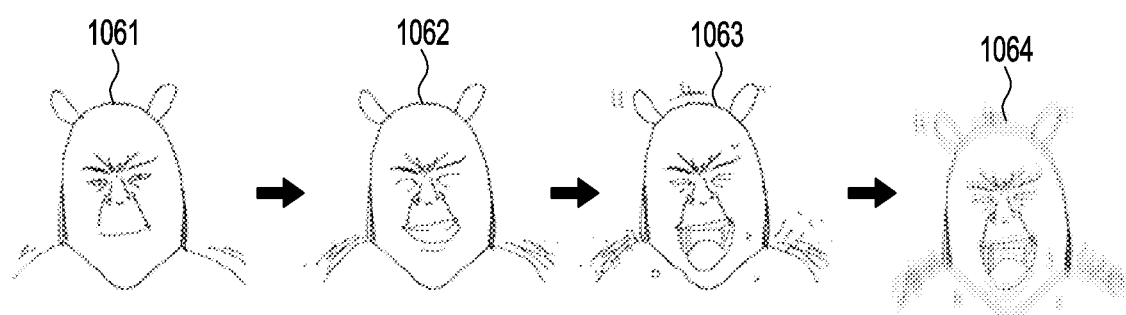
FIG. 10E is a diagram illustrating an example of editing an image according to an embodiment.

FIG. 9 is a flowchart illustrating an example method of operating an electronic device according to an embodiment of the disclosure. The embodiment of FIG. 9 is described in greater detail with reference to FIGS. 10A, 10B, 10C, 10D and 10E. FIG. 10A is a diagram illustrating an example of editing an image according to an embodiment. FIG. 10B is a diagram illustrating an example of editing an image according to an embodiment. FIG. 10C is a diagram illustrating an example of editing an image according to an embodiment. FIG. 10D is a diagram illustrating an example of editing an image according to an embodiment. FIG. 10E is a diagram illustrating an example of editing an image according to an embodiment.

According to an embodiment, an electronic device 101 may receive a text in operation 901. In operation 903, the electronic device 101 may analyze the text and identify the type and degree of the user's emotion corresponding to the text. The electronic device 101 may receive the type and degree of the user's emotion corresponding to the text from the server 108. In operation 905, the electronic device 101 may display an image corresponding to the identified type of emotion. In operation 907, the electronic device 101 may select, for example, and without limitation, one of the position, shape, color, changing speed, or the like of at least one object in the image corresponding to the degree of emotion. In other words, the electronic device 101 may edit the image. In operation 909, the electronic device 101 may reflect a selected property to (e.g., in/on) the image and display the image.

For example, as shown in FIG. 10A, the electronic device 101 may identify at least one object 1002, 1003, 1004, and 1005 of a raw image 1001 of a first character. The electronic device 101 may vary at least some of the at least one object 1002, 1003, 1004, and 1005 based on at least one of the degree of emotion or the type of emotion. For example, the electronic device 101 may perform an edit for moving up both ends of the object 1005 corresponding to the "mouth" based on the type of emotion, "happy", and, accordingly, provide an edited image 1010 reflecting the selected property 1006. For example, the electronic device 101 may determine the degree of moving up based on the degree of emotion, "happy". For example, based on the type of emotion, "outrageous", the electronic device 101 may perform an edit for moving down both ends of the object 1005 to provide a modified object 1024 corresponding to the "mouth" and an edit for moving up the left end of the object 1002 to provide a modified object 1021 corresponding to the "left eye" and the right end of the object 1003 to provide a modified object 1022 corresponding to the "right eye". For example, the electronic device 101 may determine the degree of moving based on the degree of emotion, "outraged". Thus, the electronic device 101 may provide an edited image 1020.

Referring to FIG. 10B, the electronic device 101 may change the color of the object while reshaping the object depending on the degree of emotion. For example, the electronic device 101 may provide images 1031, 1032, and 1033 in different colors depending on the degree of emotion for the type of emotion, "outraged".

Referring to FIGS. 10C and 10D, the electronic device 101 may perform an edit in such a manner as to recombine an image resource with the raw image. The electronic device 101 may store together various resources 1042, 1043, 1044, 1045, 1052, 1053, 1054, 1055, and 1056 which may be recombined with the raw images 1041 and 1051. The electronic device 101 may select at least some of the resources 1042, 1043, 1044, 1045, 1052, 1053, 1054, 1055, and 1056 corresponding to at least one of the type of emotion or the degree of emotion and perform an edit in such a manner as to recombine the selected resource with the raw image 1041 or 1051.

Referring to FIG. 10E, the electronic device 101 may perform an edit in such a manner as to adjust the moving speed of the image corresponding to the type of emotion and the degree of emotion. For example, the electronic device 101 may sequentially display a plurality of images to give an animation effect. The electronic device 101 may adjust the image change speed for the animation effect depending on, e.g., the degree of emotion. For example, the electronic device 101 may play a first animation image 1061 at a first speed, a second animation image 1062 at a second speed, a third animation image 1063 at a third speed, and a fourth animation image 1064 at a fourth speed.

Figure 11:
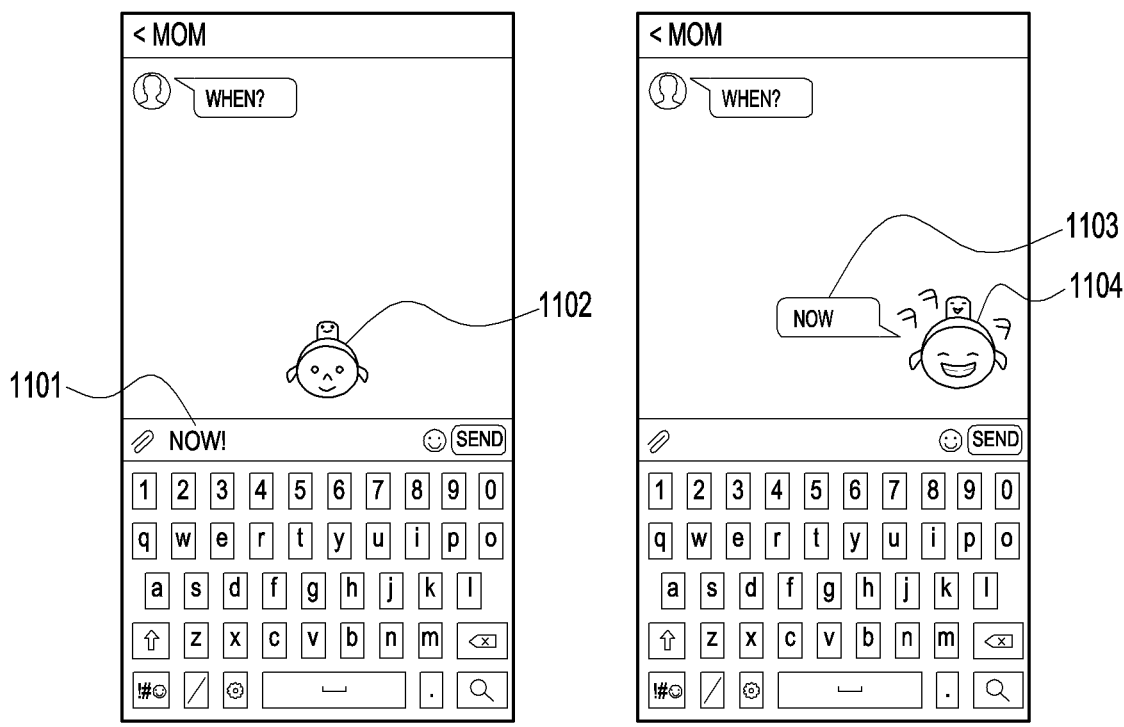
FIG. 11 is a diagram illustrating example screens displayed on an electronic device according to an embodiment.

FIG. 11 is a diagram illustrating example screens displayed on an electronic device according to an embodiment. Referring to FIG. 11, the electronic device 101 may display a text 1101 and an image 1102 corresponding to the text 1101. According to various example implementations, the electronic device 101 may display the text 1104 in a word balloon for the image 1103 as shown on the right of FIG. 11. The electronic device 101 may, for example, determine the shape of the word balloon depending on the type of emotion.

Figure 12A:
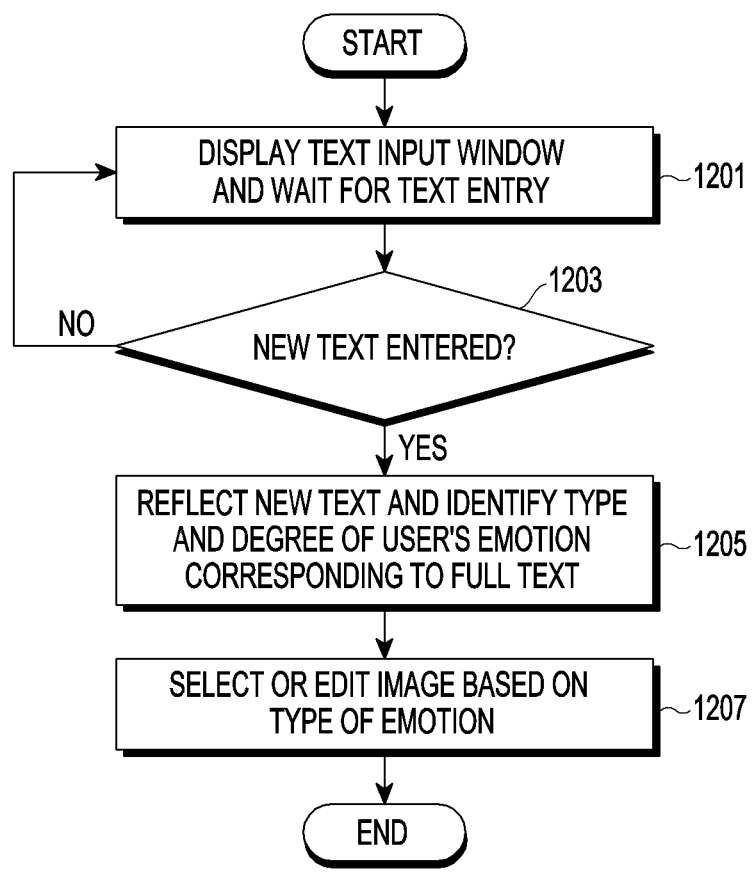
FIG. 12A is a flowchart illustrating an example method of operating an electronic device according to an embodiment.
Figure 12B:
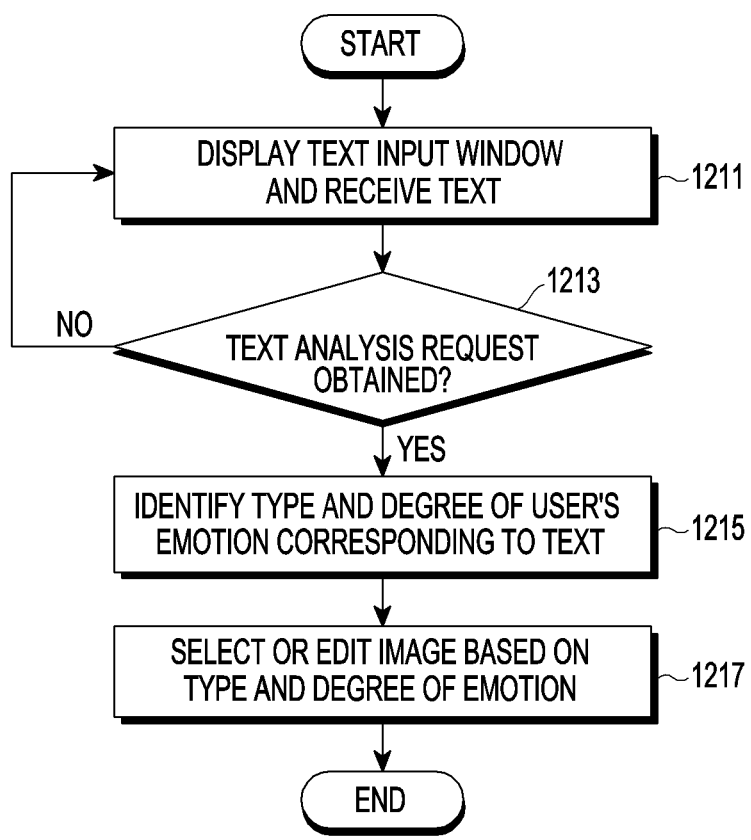
FIG. 12B is a flowchart illustrating an example method of operating an electronic device according to an embodiment.
Figure 13A:
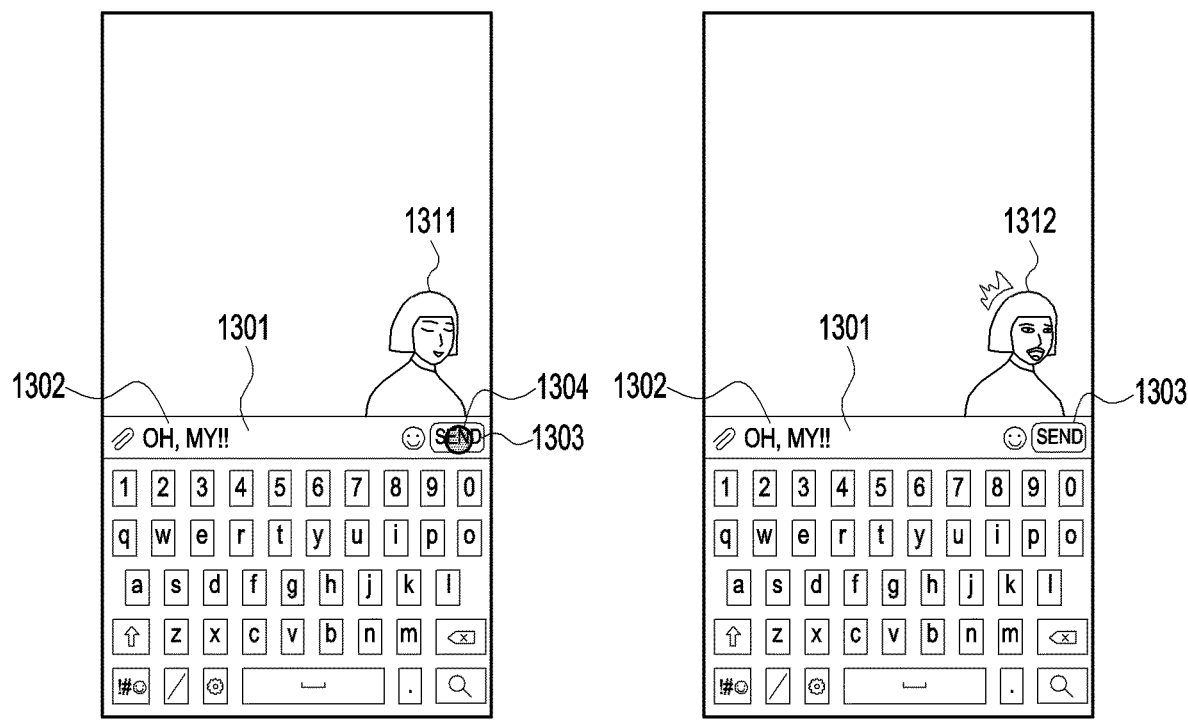
FIG. 13A is a diagram illustrating example screens displayed on an electronic device according to an embodiment.
Figure 13B:
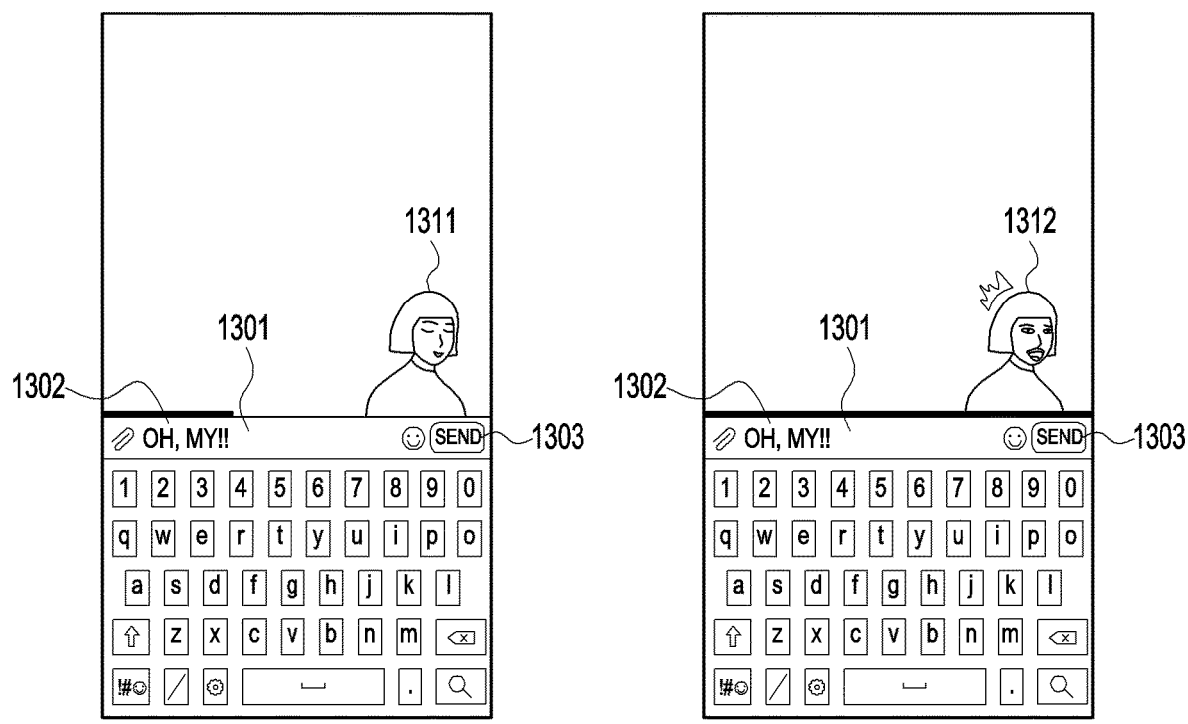
FIG. 13B is a diagram illustrating example screens displayed on an electronic device according to an embodiment.

FIG. 12A is a flowchart illustrating an example method of operating an electronic device according to an embodiment. FIG. 12B is a flowchart illustrating an example for operating an electronic device according to an embodiment. The embodiment of FIGS. 12A and 12B is described in greater detail with reference to FIGS. 13A and 13B. FIG. 13A is a diagram illustrating example screens displayed on an electronic device according to an embodiment. FIG. 13B is a diagram illustrating example screens displayed on an electronic device according to an embodiment.

Referring to FIG. 12A, according to an embodiment, the electronic device 101 may display a text input window and wait for text entry in operation 1201. For example, as shown in FIG. 13A, the electronic device 101 may display the text input window 1301. In operation 1203, the electronic device 101 may determine whether a new text is entered. The electronic device 101 may also display a text send button 1303. The electronic device 101 may display a default image 1311. The electronic device 101 may detect entry of a text 1302. In operation 1205, the electronic device 101 may identify the type and degree of the user's emotion corresponding to the whole text reflecting the new text. For example, the electronic device 101 may be triggered by entry of the new text to transmit the text to the server 108 and receive the type and degree of the user's emotion from the server 108. In operation 1207, the electronic device 101 may select or edit the image based on the type and degree of the user' emotion. Thus, the electronic device 101 may display an image 1312 corresponding to the text 1302.

Referring to FIG. 12B, according to an embodiment, the electronic device 101 may display the text input window and receive a text in operation 1211. For example, as shown in FIG. 13B, the electronic device 101 may display the text input window 1301 and receive and display the text 1302. In operation 1213, the electronic device 101 may determine whether a text analysis request is obtained. For example, the electronic device 101 may determine whether a send button 1303 is designated (1304) and, upon detecting a designation 1304 of the send button 1303, send the text 1302 to the server 108 or perform analysis. Upon obtaining a text analysis request, in operation 1215, the electronic device 101 may identify the type and degree of the user's emotion corresponding to the whole text reflecting the new text. For example, the electronic device 101 may be triggered by entry of the new text to transmit the text to the server 108 and receive the type and degree of the user's emotion from the server 108. In operation 1217, the electronic device 101 may select or edit the image based on the type and degree of the user' emotion. Thus, the electronic device 101 may display an image 1312 corresponding to the text 1302.

Figure 14A:
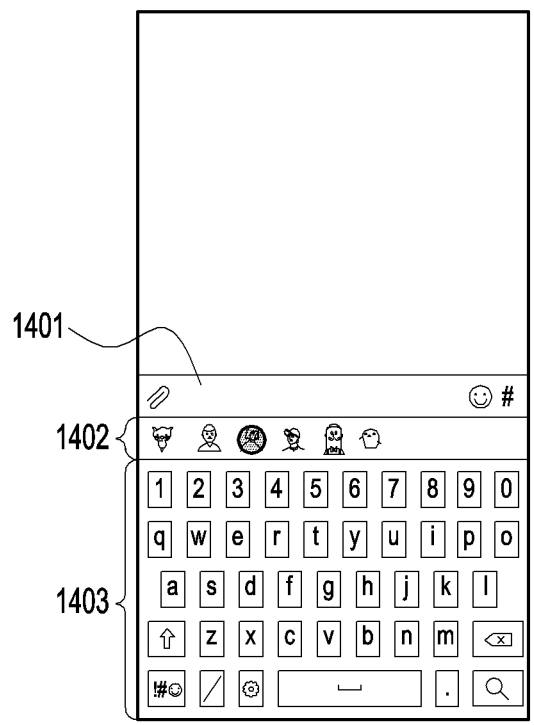
FIG. 14A is a diagram illustrating an example screen displayed on an electronic device according to an embodiment.
Figure 14B:
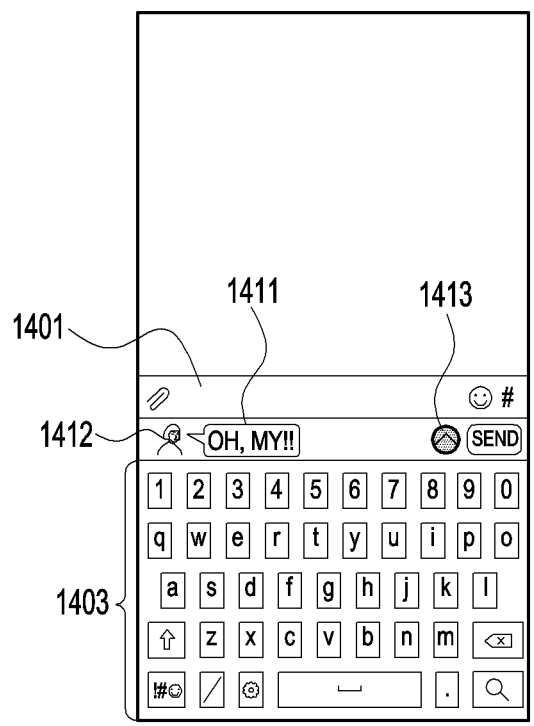
FIG. 14B is a diagram illustrating an example screen displayed on an electronic device according to an embodiment.
Figure 14C:
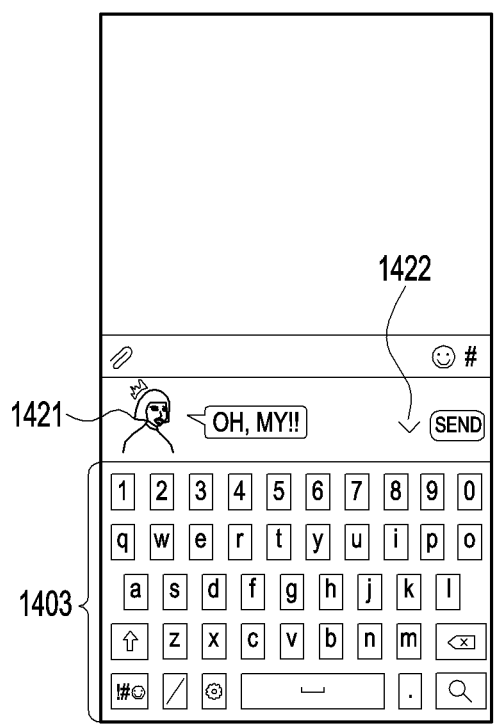
FIG. 14C is a diagram illustrating an example screen displayed on an electronic device according to an embodiment.

FIG. 14A is a diagram illustrating an example screen displayed on an electronic device according to an embodiment. FIG. 14B is a diagram illustrating an example screen displayed on an electronic device according to an embodiment. FIG. 14C is a diagram illustrating an example screen displayed on an electronic device according to an embodiment.

According to an embodiment, the electronic device 101 may display a text input window 1401, a character selection region 1402, and an SIP region 1403 as shown in FIG. 14A. Where any one character is selected from the character selection region 1402 and a text is entered, the electronic device 101 may identify the type and degree of the user's emotion corresponding to the text. As shown in FIG. 14B, the electronic device 101 may display an image 1412 based on the type and degree of the user's emotion and corresponding to the character. The electronic device 101 may display a text 1411 received in association with the image 1412 and display an enlarge button 1413. Upon detecting a designation of the enlarge button 1413, the electronic device 101 may display an enlarged image 1421 and text and a shrink button 1422 as shown in FIG. 14C. Upon detecting a designation of the shrink button 1422, the electronic device 101 may shrink the image back and display.

Figure 15:
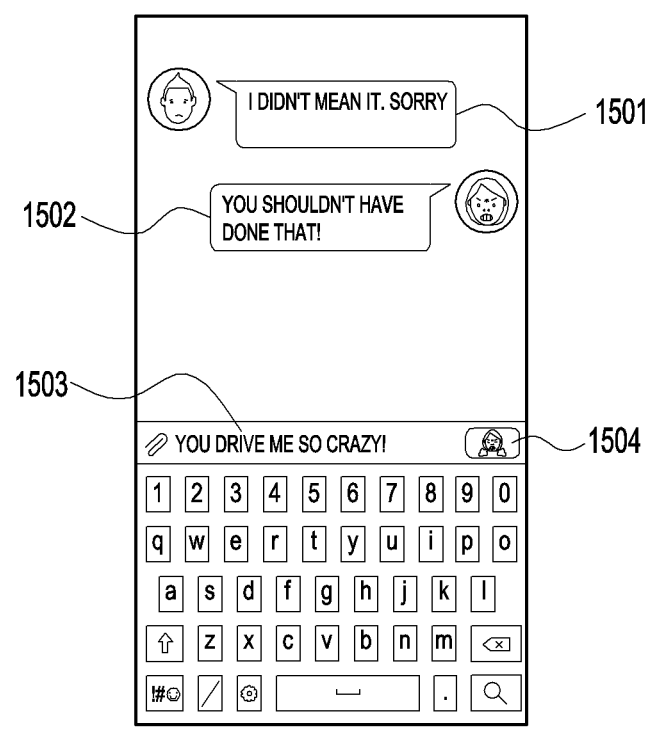
FIG. 15 is a diagram illustrating an example screen displayed on an electronic device according to an embodiment.

FIG. 15 is a diagram illustrating an example screen displayed on an electronic device according to an embodiment.

According to an embodiment, the electronic device 101 may display a text 1501 received from a second user and a text 1502 received from a first user. The electronic device 101 may display a text 1503 received through the SIP. As described above, the electronic device 101 may display an image 1504 corresponding to the text 1503 in a relatively small size. For example, the electronic device 101 may display the image 1504 in preview. The electronic device 101 may determine the color of the image 1504 based on the type and degree of the user's emotion identified based on the text 1503.

Figure 16:
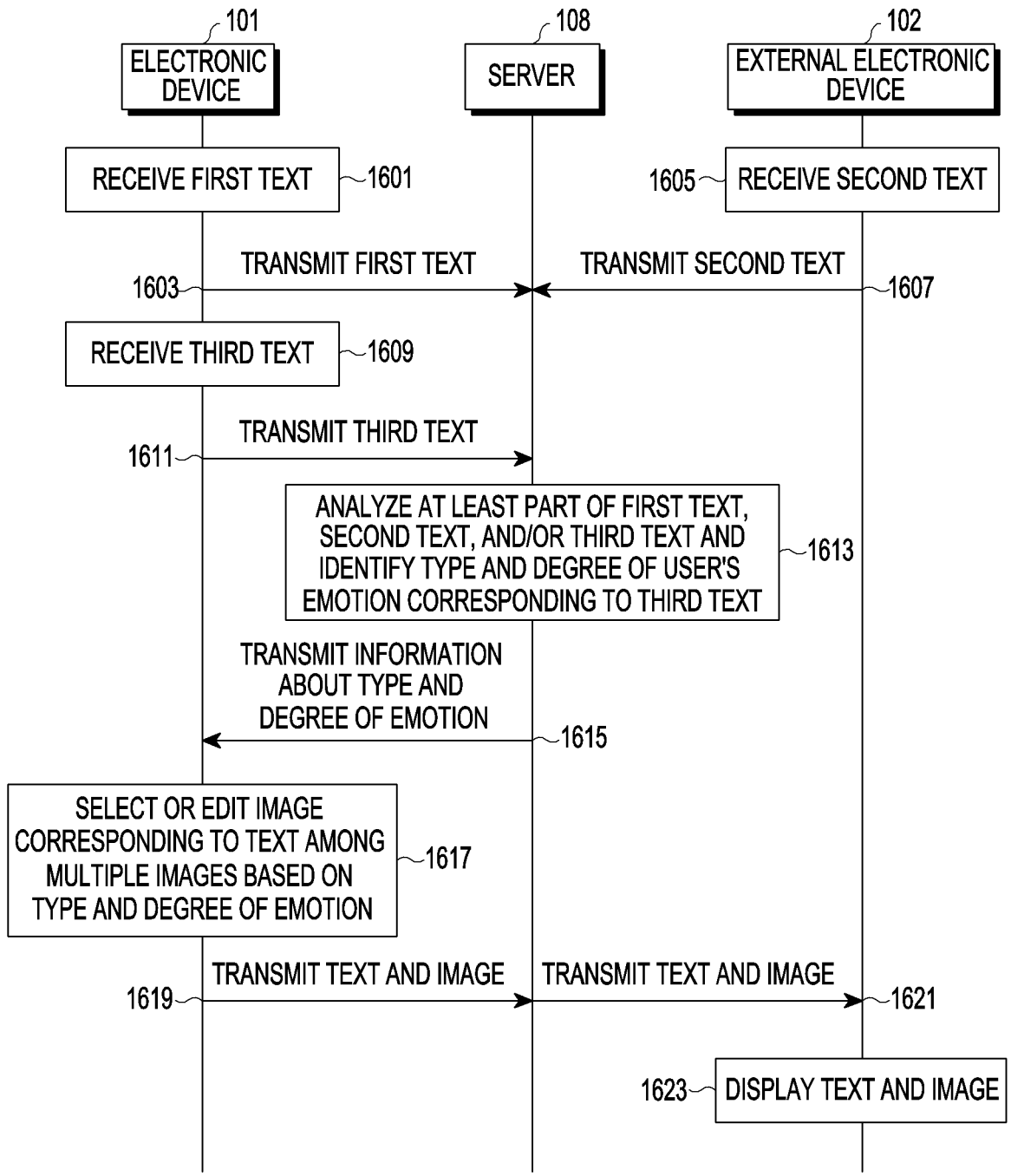
FIG. 16 is a flowchart illustrating an example method of operating an electronic device according to an embodiment.
Figure 17A:
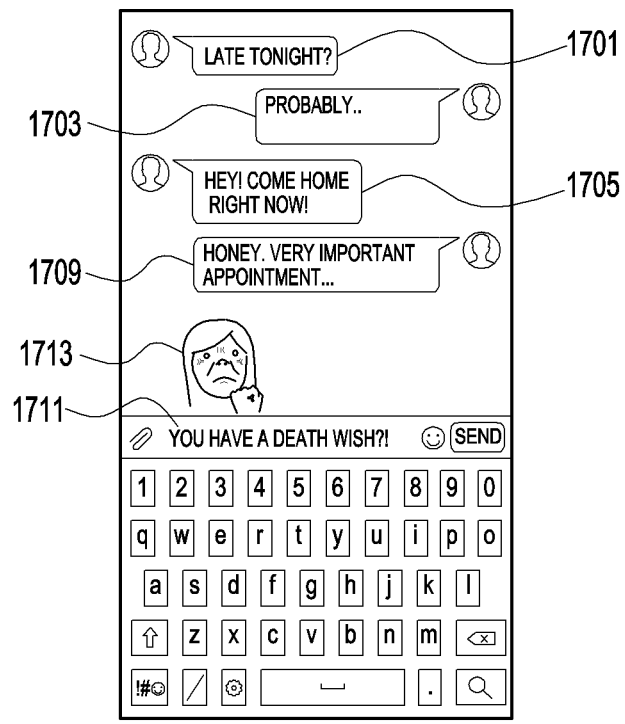
FIG. 17A is a diagram illustrating an example screen displayed on an electronic device according to an embodiment.
Figure 17B:
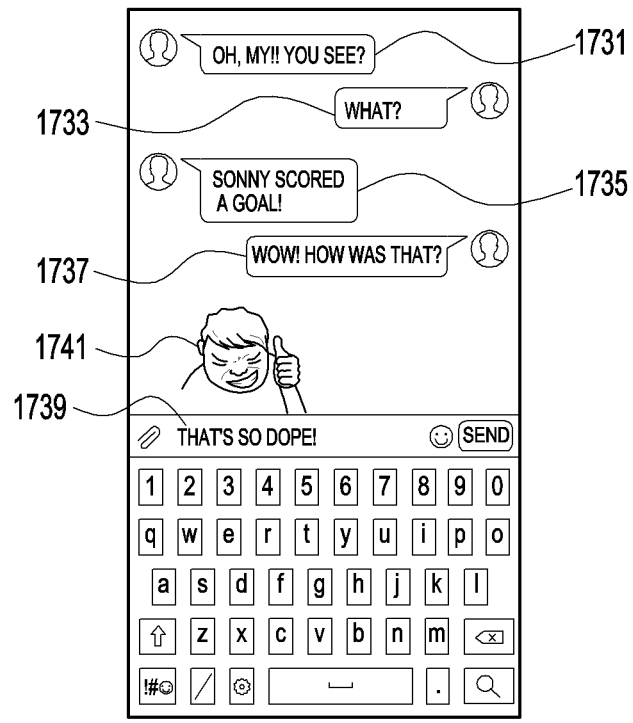
FIG. 17B is a diagram illustrating an example screen displayed on an electronic device according to an embodiment.

FIG. 16 is a flowchart illustrating an example method of operating an electronic device according to an embodiment of the disclosure. The embodiment of FIG. 16 is described in greater detail with reference to FIGS. 17A and 17B. FIG. 17A is a diagram illustrating an example screen displayed on an electronic device according to an embodiment. FIG. 17B is a diagram illustrating an example screen displayed on an electronic device according to an embodiment.

According to an embodiment, an electronic device 101 may receive a first text in operation 1601. In operation 1603, the electronic device 101 may transmit the first text to the server 108. In operation 1605, the external electronic device 102 may receive a second text. In operation 1607, the external electronic device 102 may transmit the second text to the server 108. The server 108 may transmit the first text to the external electronic device 102 and the second text to the electronic device 101. Accordingly, as shown in FIG. 17A or 17B, the electronic device 101 may transmit or receive a plurality of texts 1701, 1703, 1705, and 1709 or a plurality of texts 1731, 1733, 1735, and 1737.

In operation 1609, the electronic device 101 may receive a third text. For example, the electronic device 101 may receive the text 1711 "You have a death wish?!" as shown in FIG. 17A. In operation 1611, the electronic device 101 may transmit the third text 1711 to the server 108. In operation 1613, the server 108 may analyze at least part of the first text, the second text, and/or the third text and identify the type and degree of the user's emotion corresponding to the third text. In other words, the server 108 may identify the type and degree of the user's emotion based on the prior conversation and the text currently entered. For example, the server 108 may store an algorithm capable of analyzing the prior conversation and identify the context of the current sentence. The server 108 may store a learning model learned using a database for, e.g., a plurality of conversations and a plurality of emotion types and degrees. The server 108 may thus identify the type and degree of the user's emotion corresponding to the current text based on the prior conversation. For example, as a result of analyzing the text 1711 "You have a death wish?!" based on the prior conversation, the server 108 may identify that the type of the user's emotion is "outraged", and transmit information thereabout to the electronic device 101 as shown in FIG. 17A. The electronic device 101 may display a first image 1713 corresponding to the degree of emotion, "outraged". For example, as a result of analyzing the text 1739 "That's so dope!" based on the prior conversation, the server 108 may identify that the type of the user's emotion is "delightful", and transmit information thereabout to the electronic device 101 as shown in FIG. 17B. The electronic device 101 may display a second image 1741 corresponding to the degree of emotion, "delightful". In other words, despite the same texts, the server 108 (or the electronic device 101) may identify different types of emotion or different degrees of emotion depending on the prior conversation. In operation 1615, the server 108 may transmit information about the type and degree of emotion to the electronic device 101. In operation 1617, the electronic device 101 may select or edit an image corresponding to the text among a plurality of images based on the type and degree of emotion. In operation 1619, the electronic device 101 may transmit the text and the image to the server 108. In operation 1621, the server 108 may transmit the text and the image to the external electronic device 102. The external electronic device 102 may display the text and the image in operation 1623.

Figure 18A:
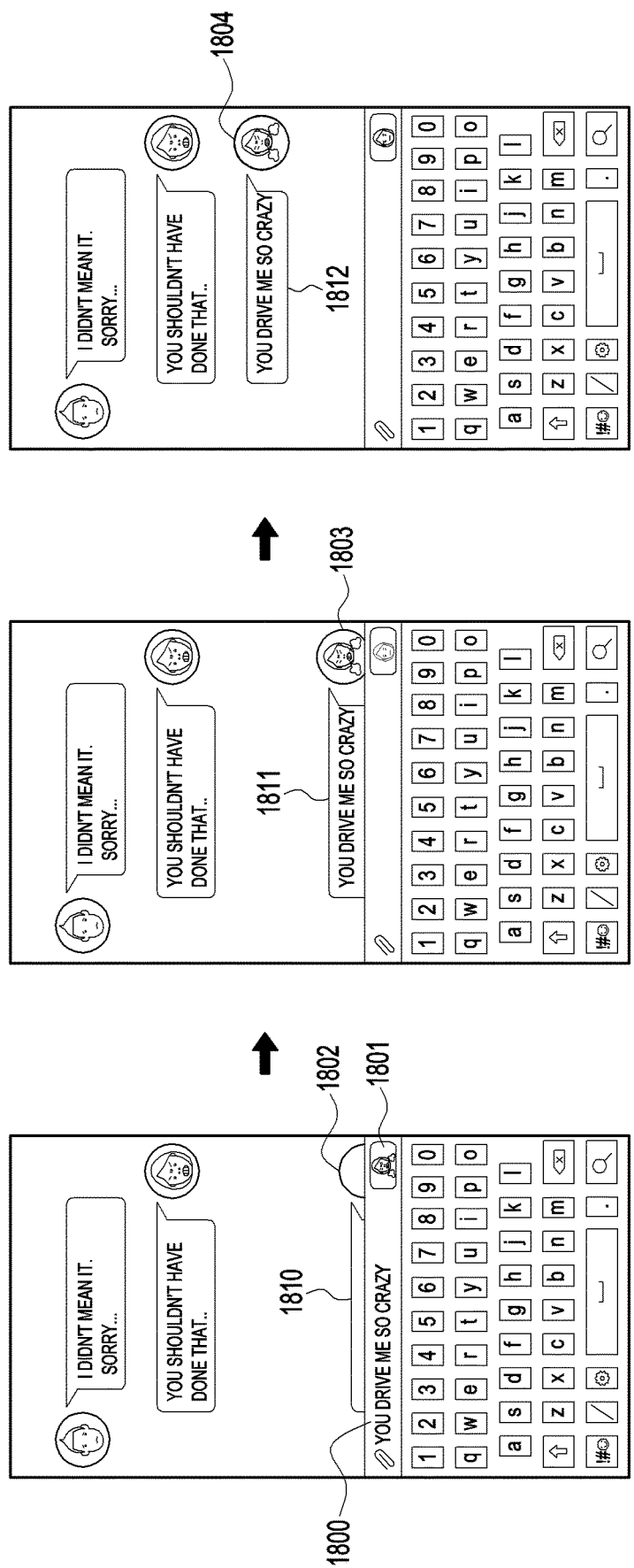
FIG. 18A is a diagram illustrating an example process for displaying an image according to an embodiment.
Figure 18B:
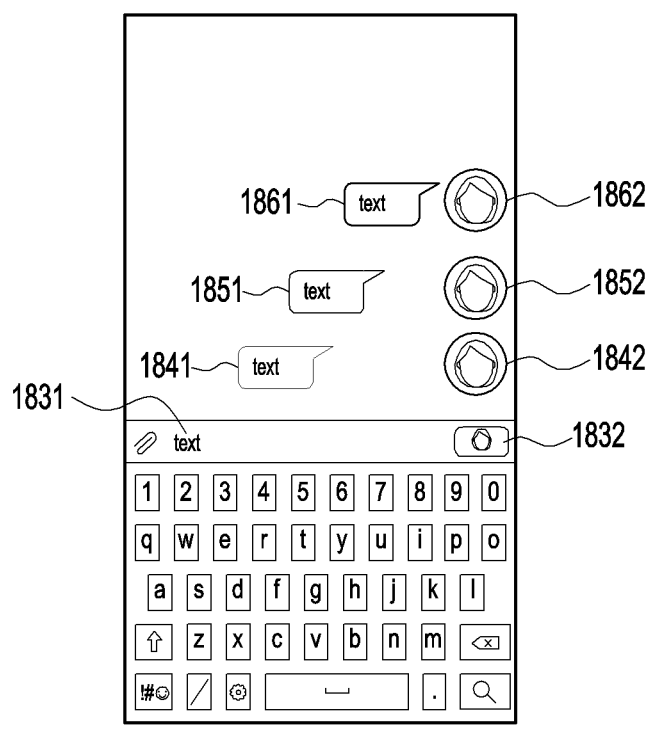
FIG. 18B is a diagram illustrating an example process for displaying an image according to an embodiment.

FIG. 18A is a diagram illustrating an example process for displaying an image according to an embodiment. FIG. 18B is a diagram illustrating an example process for displaying an image according to an embodiment. As shown in FIG. 18A, the electronic device 101 may display a received text 1800 on a text input window and an image 1801 corresponding thereto on the text input window. The electronic device 101 may display an object 1810 indicating a word balloon corresponding to the text and an object 1802 corresponding to the image. The electronic device 101 may display the object 1811 indicating the word balloon corresponding to the text and the object 1803 corresponding to the image to come further inside the conversation window over time. As time elapses, the electronic device 101 may display the object 1812 corresponding to the word balloon including the text and the image 1804. Accordingly, the electronic device 101 may provide such an effect as if the text and the image move from the text input window to the conversation window. Meanwhile, the electronic device 101 may display various images on the conversation window. For example, since the image corresponding to a first user's account may differ depending on the type of the user's emotion for the text, various images may be mixed inside the conversation window. As shown in FIG. 18B, the electronic device 101 may move and display the image 1832 in a first position 1842, a second position 1852, and a third position 1862 over time. The electronic device 101 may move and display the text 1831 in a fourth 1841, a fifth position 1851, and a sixth position 1861.

Figure 19:
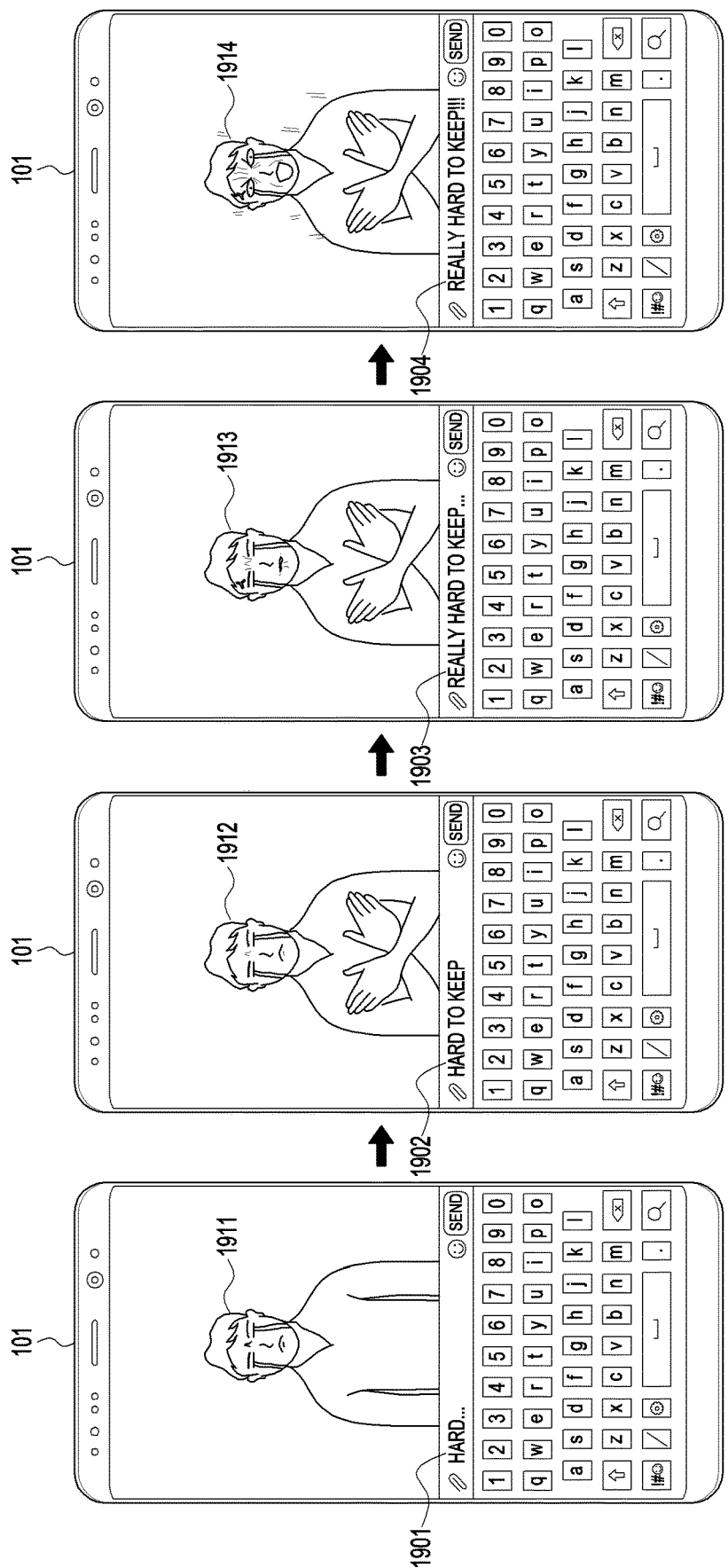
FIG. 19 is a diagram illustrating an example screen displayed on an electronic device according to an embodiment.

FIG. 19 is a diagram illustrating example screens displayed on an electronic device according to an embodiment.

As shown in FIG. 19, the electronic device 101 may display an image corresponding to the type and degree of the user's emotion and the type of action. From a first text 1901 reading "hard..". the electronic device 101 may identify that the type of the user's emotion is "disappointed" and the degree of emotion is the first level. The electronic device 101 may not identify the type of action from the first text 1901. In this case, the electronic device 101 may display a first image 1911 based on the identified type and degree of the user's emotion. From a second text 1902 reading "hard to keep . . . ". the electronic device 101 may identify that the type of the user's emotion is "disappointed" and the degree of emotion is the first level and that the type of action is crossing and placing both arms on the chest, e.g., an action to symbolize keeping something. Thus, the electronic device 101 may display a second image 1912. The second image 1912 is the same as the first image 1911 in the facial part associated with the user's emotion and differ from the first image 1911 in the body part associated with the action. From a third text 1903 reading "really hard to keep" the electronic device 101 may identify that the type of the user's emotion is "disappointed" and the degree of emotion is the second level and that the type of action is crossing and placing both arms on the chest, e.g., an action to symbolize keeping something. Thus, the electronic device 101 may display a third image 1913. The third image 1913 is the same as the second image 1912 in the body part associated with the action and differ from the second image 1912 in the facial part associated with the user's emotion. From a fourth text part 1904 reading "really hard to keep!!!" the electronic device 101 may identify that the type of the user's emotion is "disappointed" and the degree of emotion is the third level and that the type of action is crossing and placing both arms on the chest, e.g., an action to symbolize keeping something. Thus, the electronic device 101 may display a fourth image 1914. The fourth image 1914 is the same as the third image 1913 in the body part associated with the action and differ from the third image 1913 in the facial part associated with the user's emotion.

Figure 20:
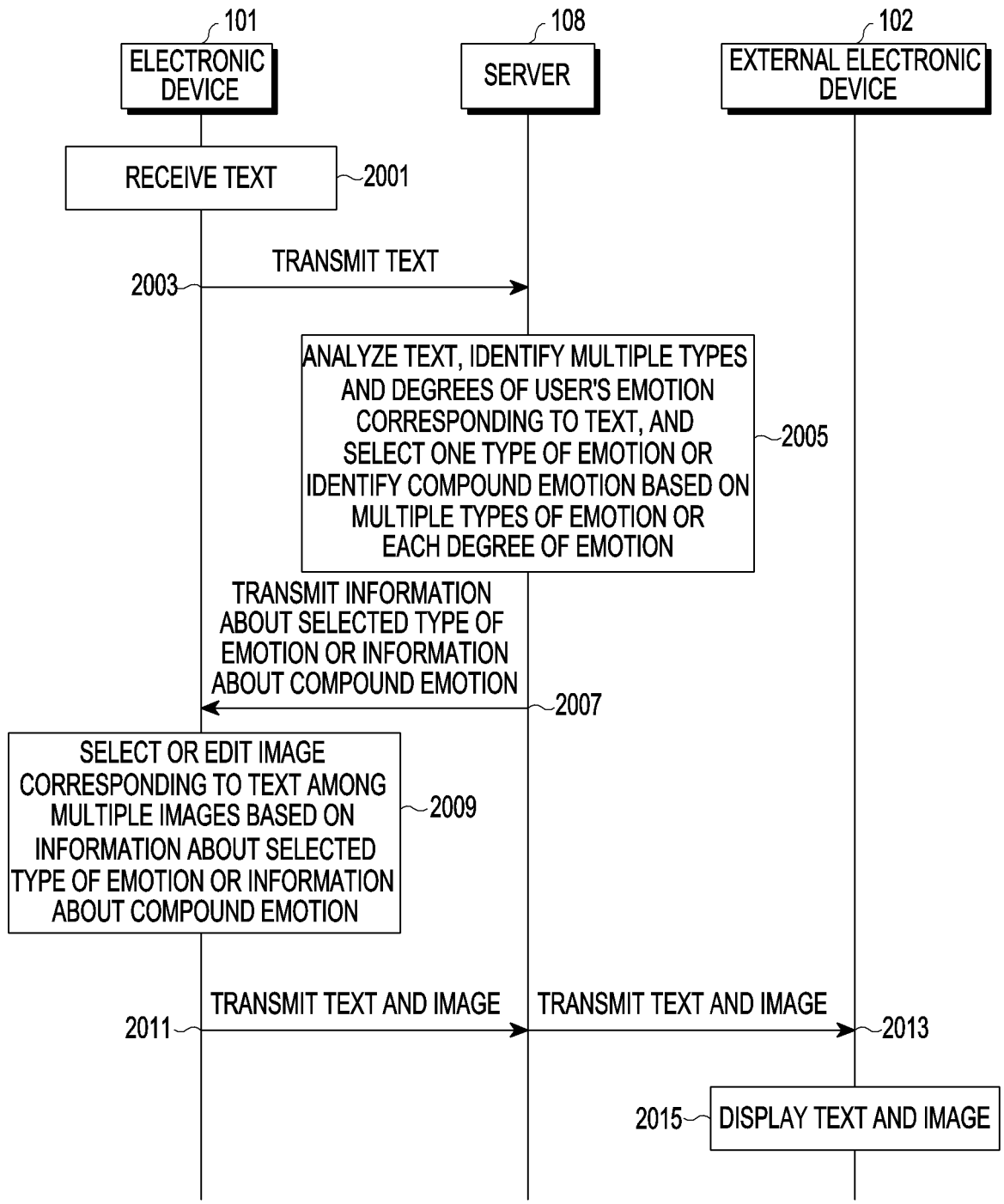
FIG. 20 is a flowchart illustrating an example method of operating an electronic device according to an embodiment.

FIG. 20 is a flowchart illustrating an example method of operating an electronic device according to an embodiment of the disclosure.

According to an embodiment, an electronic device 101 may receive a text in operation 2001. In operation 2003, the electronic device 101 may transmit the text to the server 108. In operation 2005, the server 108 may analyze the text, identify a plurality of types and degrees of the user's emotion corresponding to the text, and select one type of emotion or identify a compound emotion based on the plurality of types of emotion and the degree of each emotion. For example, the server 108 may identify a first type of emotion and a first degree of emotion, which is the degree of emotion for the first type of emotion and a second type of emotion and a second degree of emotion, which is the degree of emotion for the second type of emotion, based on the text. The server 108 may select any one of the first type of emotion and the second type of emotion. For example, the server 108 may manage the priority per type of emotion and select any one based on the identified priority. The server 108 may select any one using a result of analysis of a prior conversation. The server 108 may compare the first degree of emotion and the second degree of emotion to select the higher level of type of emotion. According to an embodiment, the server 108 may identify a compound emotion of the first type of emotion and the second type of emotion. The server 108 may also consider the first degree of emotion and the second degree of emotion upon identifying the compound emotion.

In operation 2007, the server 108 may transmit information about the selected type of emotion or information about the compound emotion to the electronic device 101. In operation 2009, the electronic device 101 may select or edit an image corresponding to the text among the plurality of images based on the information about the selected type of emotion or the information about the compound emotion. In operation 2011, the electronic device 101 may transmit the text and the image to the server 108. In operation 2013, the server 108 may transmit the text and the image to the external electronic device 102. In operation 2015, the external electronic device 102 may display the text and the image.

Figure 21:
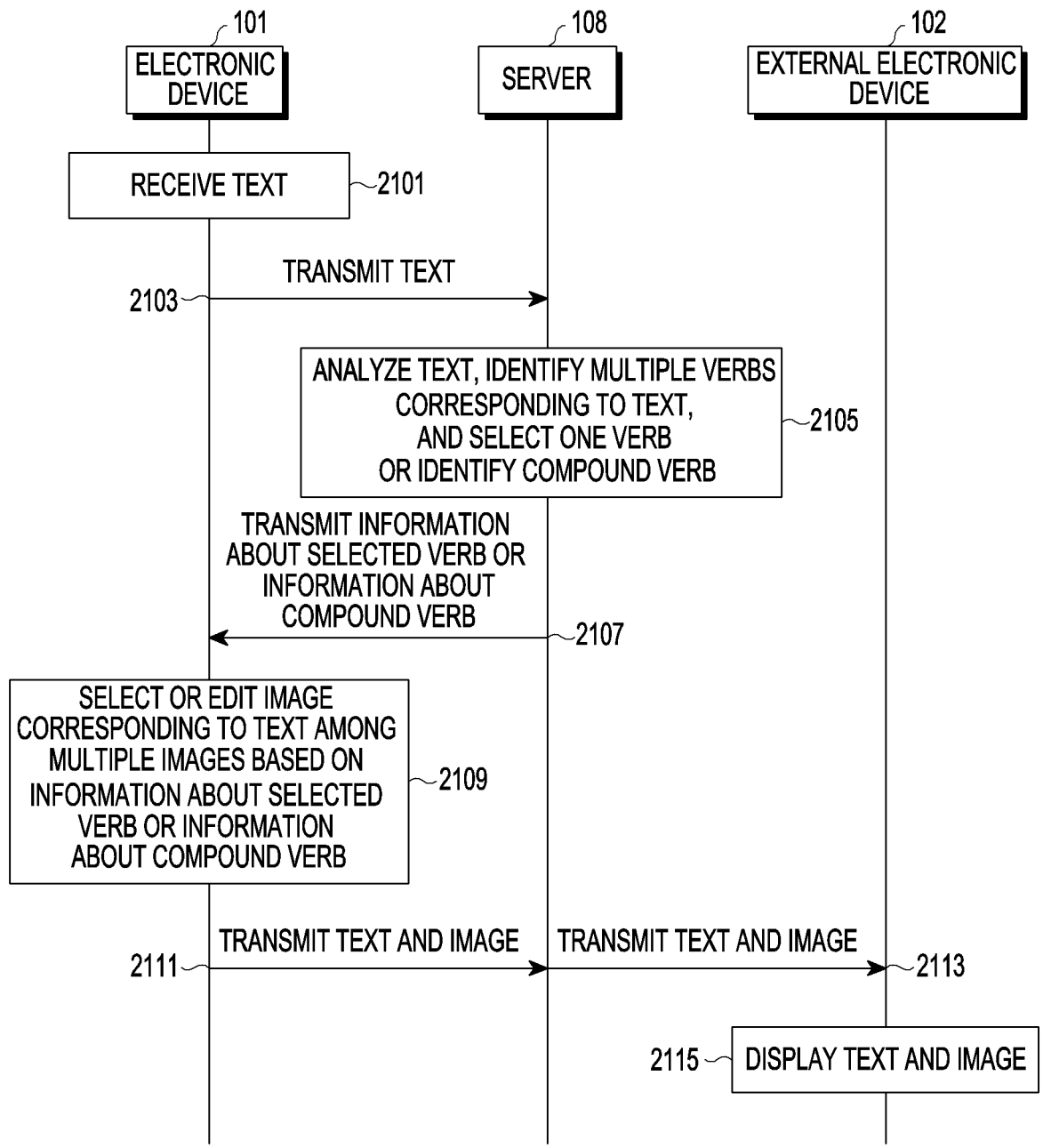
FIG. 21 is a flowchart illustrating an example method of operating an electronic device according to an embodiment.

FIG. 21 is a flowchart illustrating an example method of operating an electronic device according to an embodiment of the disclosure.

According to an embodiment, an electronic device 101 may receive a text in operation 2101. In operation 2103, the electronic device 101 may transmit the text to the server 108. In operation 2105, the server 108 may analyze the text, identify a plurality of verbs corresponding to the text, and select one verb or identify a compound verb corresponding to the text. The text may include a plurality of verbs, and the server 108 may extract the plurality of verbs from the text. The server 108 may select any one among the plurality of verbs. For example, the server 108 may analyze a prior conversation and, as a result of analysis, select a verb more appropriate for the prior conversation. The server 108 may identify a compound verb reflecting all of the plurality of verbs. In operation 2107, the server 108 may transmit information about the selected verb or information about the compound verb. In operation 2109, the electronic device 101 may select or edit an image corresponding to the text among the plurality of images based on the information about the selected verb or the information about the compound verb. In operation 2111, the server 108 may transmit the text and the image to the server 108. In operation 2113, the electronic device 101 may transmit the text and the image to the external electronic device 102. In operation 2115, the external electronic device 102 may display the text and the image.

Figure 22A:
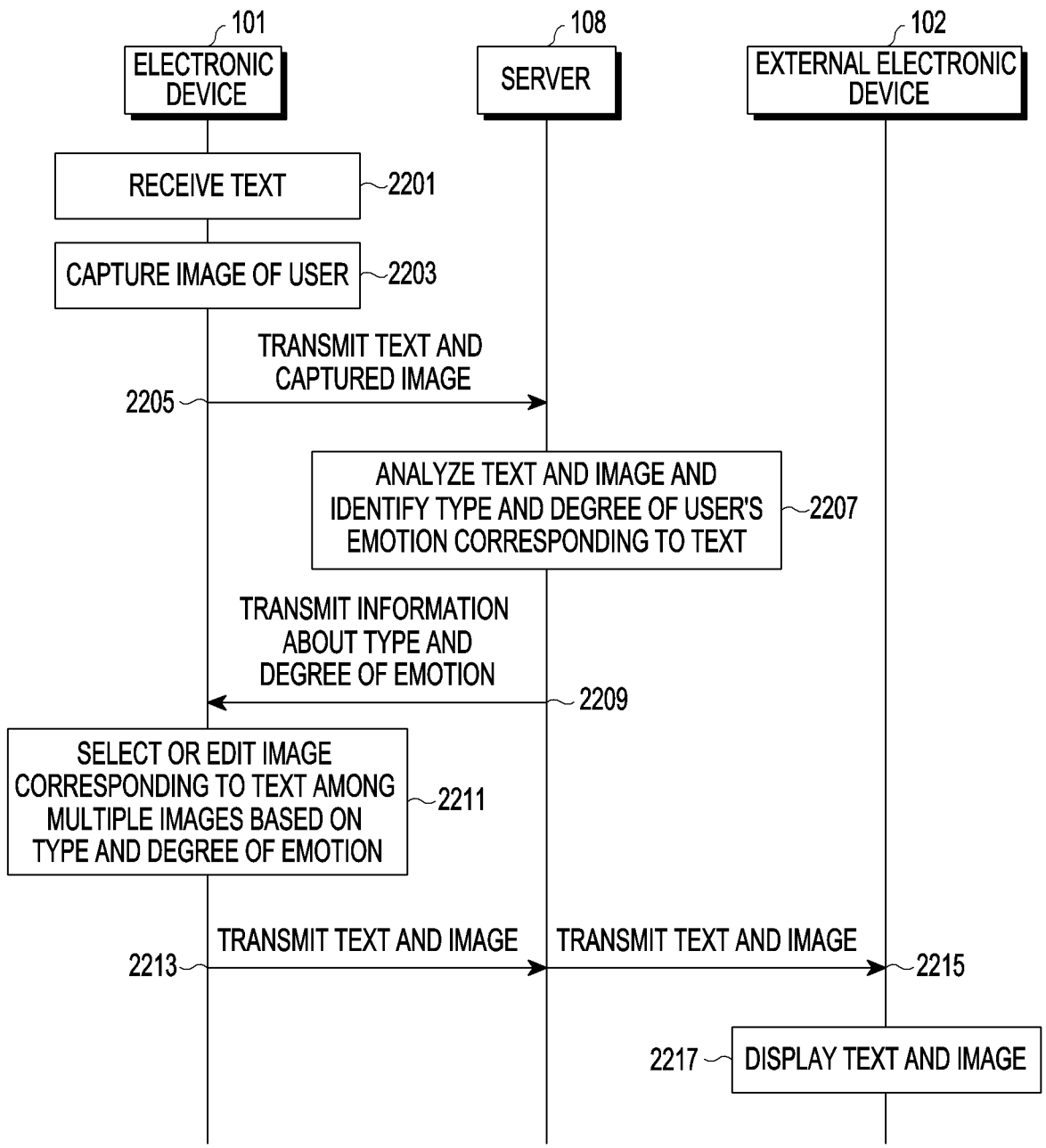
FIG. 22A is a flowchart illustrating an example method of operating an electronic device according to an embodiment.

FIG. 22A is a flowchart illustrating an example method of operating an electronic device according to an embodiment of the disclosure.

According to an embodiment, an electronic device 101 may receive a text in operation 2101. In operation 2203, the electronic device 101 may capture or obtain an image of the user. In operation 2205, the electronic device 101 may transmit the text and the captured image to the server 108. In operation 2207, the server 108 may analyze the text and image and identify the type and degree of the user's emotion corresponding to the text. For example, the server 108 may identify the user's face from the image and, as a result of analysis of face, identify the user's emotional state. The server 108 may store an algorithm capable of identifying the type and degree of the user's emotion from the image. For example, the server 108 may store a learning model learned using a database for a plurality of images and a plurality of emotion types and degrees. The server 108 may identify the type and degree of the user's emotion obtained by analyzing the text and the type and degree of the user's emotion obtained by analyzing the images. The server 108 may identify the type and degree of the user's emotion based on, e.g., the above-described process of compound emotion. According to an embodiment, the server 108 may identify the type and degree of the user's emotion only using the result of image analysis. In operation 2209, the server 108 may transmit information about the type and degree of emotion to the electronic device 101. In operation 2211, the electronic device 101 may select or edit an image corresponding to the text among a plurality of images based on the type and degree of emotion. In operation 2213, the electronic device 101 may transmit the text and the image to the server 108. In operation 2215, the server 108 may transmit the text and the image to the external electronic device 102. In operation 2217, the external electronic device 102 may display the text and the image.

Figure 22B:
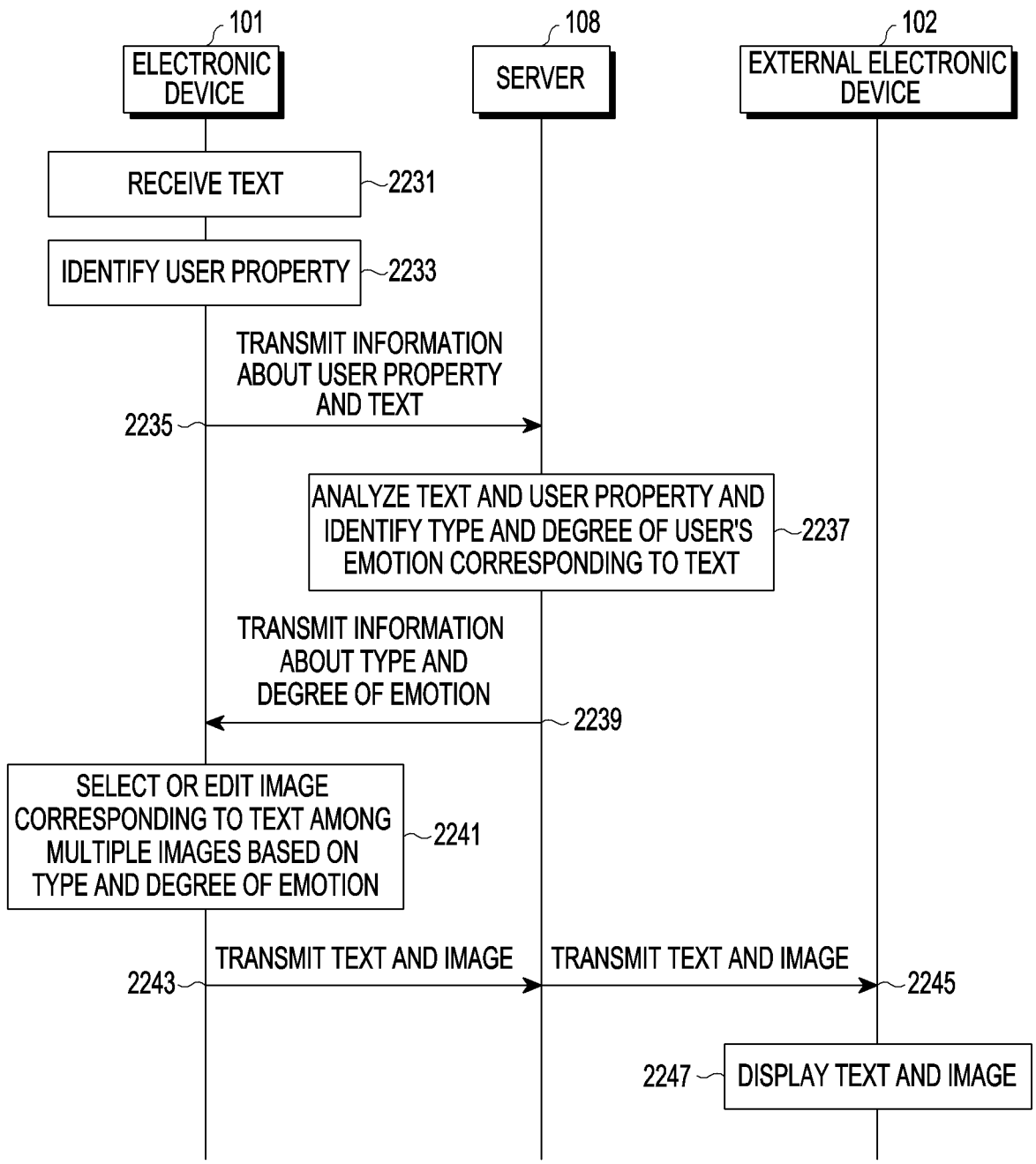
FIG. 22B is a flowchart illustrating an example method of operating an electronic device according to an embodiment.

FIG. 22B is a flowchart illustrating an example method of operating an electronic device according to an embodiment of the disclosure.

According to an embodiment, an electronic device 101 may receive a text in operation 2231. In operation 2233, the electronic device 101 may identify a user property. For example, the electronic device 101 may identify user-related information, such as the user's age, state information as per analysis of the user's biometric information, or the user's gender. In operation 2235, the electronic device 101 may transmit the text and the information about user property to the server 108. In operation 2237, the server 108 may analyze the text and the user property and identify the type and degree of the user's emotion corresponding to the text. In operation 2239, the server 108 may transmit information about the type and degree of emotion to the electronic device 101. In operation 2241, the electronic device 101 may select or edit an image corresponding to the text among a plurality of images based on the type and degree of emotion. In operation 2243, the electronic device 101 may transmit the text and the image to the server 108. In operation 2245, the server 108 may transmit the text and the image to the external electronic device 102. In operation 2247, the external electronic device 102 may display the text and the image.

Figure 23:
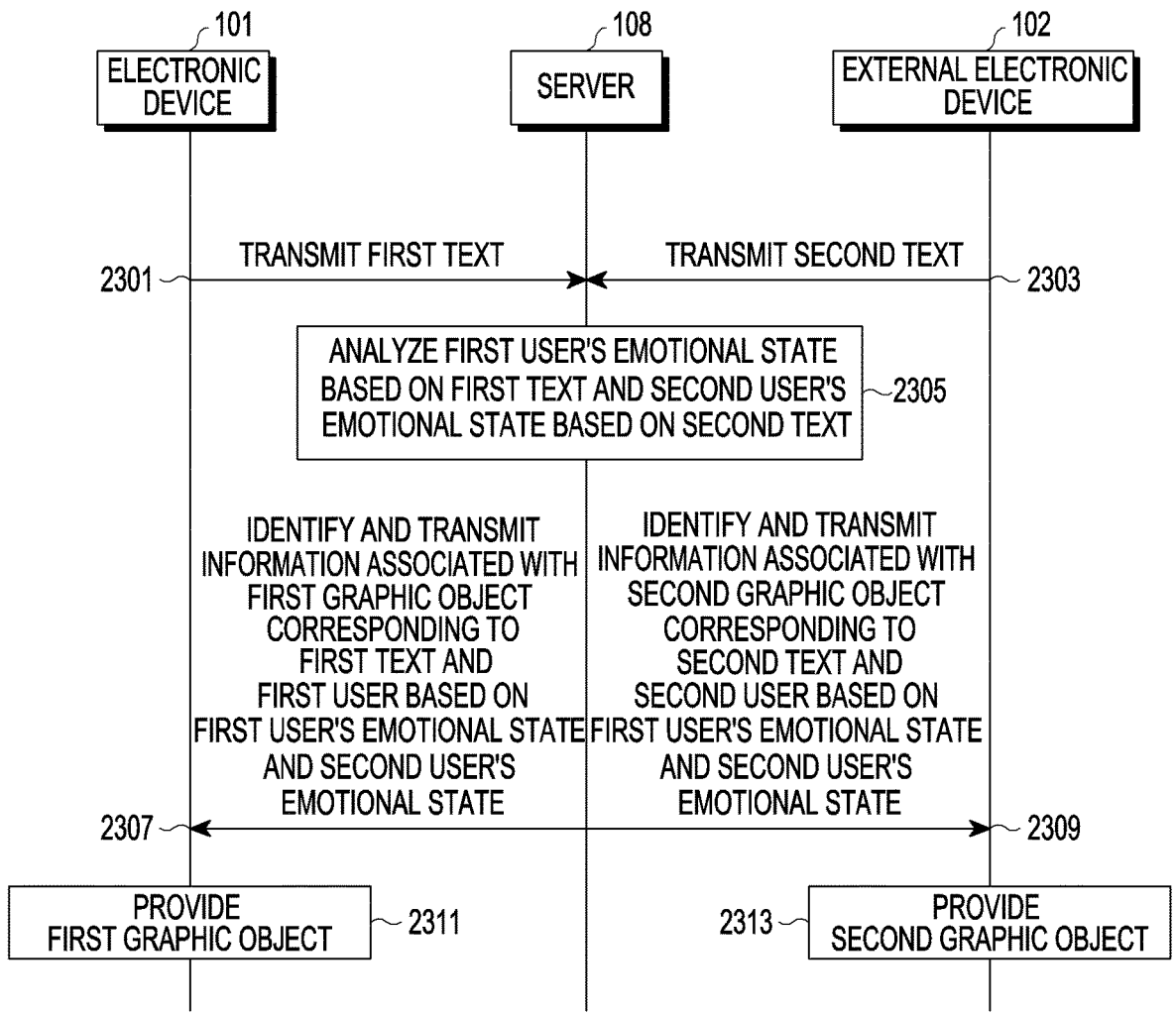
FIG. 23 is a flowchart illustrating an example method of operating an electronic device according to an embodiment.

FIG. 23 is a flowchart illustrating an example method of operating an electronic device according to an embodiment of the disclosure.

According to an embodiment, in operation 2301, the electronic device 101 may transmit the first text to the server 108. In operation 2303, the external electronic device 102 may transmit the second text to the server 108. In operation 2305, the server 108 may analyze a first user's emotional state, e.g., at least one of the type and degree of emotion, based on the first text and a second user's emotional state, e.g., at least one of the type and degree of emotion, based on the second text. In operation 2307, the server 108 may identify and transmit information associated with a first graphic object corresponding to the first text and the first user based on the first user's emotional state and the second user's emotional state. For example, the server 108 may transmit information associated with one or more graphic objects corresponding to the first user and the first text and corresponding to the emotional states of both the users to the electronic device 101. For example, the server 108 may transmit information associated with a single image to the electronic device 101 or information associated with a compound image obtained by synthesizing a plurality of images to the electronic device 101. In operation 2309, the server 108 may identify information associated with a second graphic object corresponding to the second user and the second text based on the first user's emotional state and the second user's emotional state and transmit the information to the external electronic device 102. In operation 2311, the electronic device 101 may provide a first graphic object. In operation 2313, the external electronic device 102 may provide a second graphic object.

For example, the electronic device 101 may transmit a text reading "Hoyoung. Stop it" to the server 108. The server 108 may identify that the type of emotion corresponding to the first user of the electronic device 101 is "outraged". Corresponding thereto, the external electronic device 102 may transmit the text "Sorry. I'll stop it" to the server 108. The server 108 may provide a graphic object corresponding to the text "Hoyoung. Stop it" from the electronic device 101. For example, based on the type of the first user's emotion being "outraged" and the type of emotion of the second user of the external electronic device 102 being "sorry", the electronic device 101 may provide the electronic device 101 with a graphic object corresponding to a relatively low degree of emotion and the type of emotion, "outraged", corresponding to the text "Hoyoung. Stop it". The external electronic device 102 may transmit the text "What did I do wrong?" to the server 108. Also in this case, the server 108 may provide a graphic object corresponding to the text "Hoyoung. Stop it" from the electronic device 101. For example, based on the type of the first user's emotion being "outraged" and the type of emotion of the second user of the external electronic device 102 being "outraged", the electronic device 101 may provide the electronic device 101 with a graphic object corresponding to a relatively high degree of emotion and the type of emotion, "outraged", corresponding to the text "Hoyoung. Stop it". As set forth above, the server 108 may provide a different graphic object depending on the emotion of the users attending the conversation for the same text (e.g., "Hoyoung. Stop it").

For example, the electronic device 101 may transmit a text reading "Hoyoung. Stop it" to the server 108. The server 108 may identify that the type of emotion corresponding to the first user of the electronic device 101 is "outraged". Corresponding thereto, the external electronic device 102 may transmit the text "Sorry. I'll stop it" to the server 108. The server 108 may provide a graphic object corresponding to the text "Hoyoung. Stop it" from the electronic device 101. For example, based on the type of the first user's emotion being "outraged" and the type of emotion of the second user of the external electronic device 102 being "sorry", the electronic device 101 may provide the electronic device 101 with a graphic object which is a combination of a sub graphic object corresponding to a relatively low degree of emotion and the type of emotion, "outraged", and a sub graphic object corresponding to the type of the second user's emotion, "sorry", corresponding to the text "Hoyoung. Stop it". The external electronic device 102 may transmit the text "What did I do wrong?" to the server 108. Also in this case, the server 108 may provide a graphic object corresponding to the text "Hoyoung. Stop it" from the electronic device 101. For example, based on the type of the first user's emotion being "outraged" and the type of emotion of the second user of the external electronic device 102 being "outraged", the electronic device 101 may provide the electronic device 101 with a graphic object which is a combination of a sub graphic object corresponding to a relatively high degree of emotion and the type of emotion, "outraged", and a sub graphic object corresponding to the type of the second user's emotion, "outraged", corresponding to the text "Hoyoung. Stop it". As set forth above, the server 108 may also provide a graphic object created by merging sub graphic objects each of which corresponds to a respective one of the plurality of users, corresponding to the text from one user.

Figure 24:
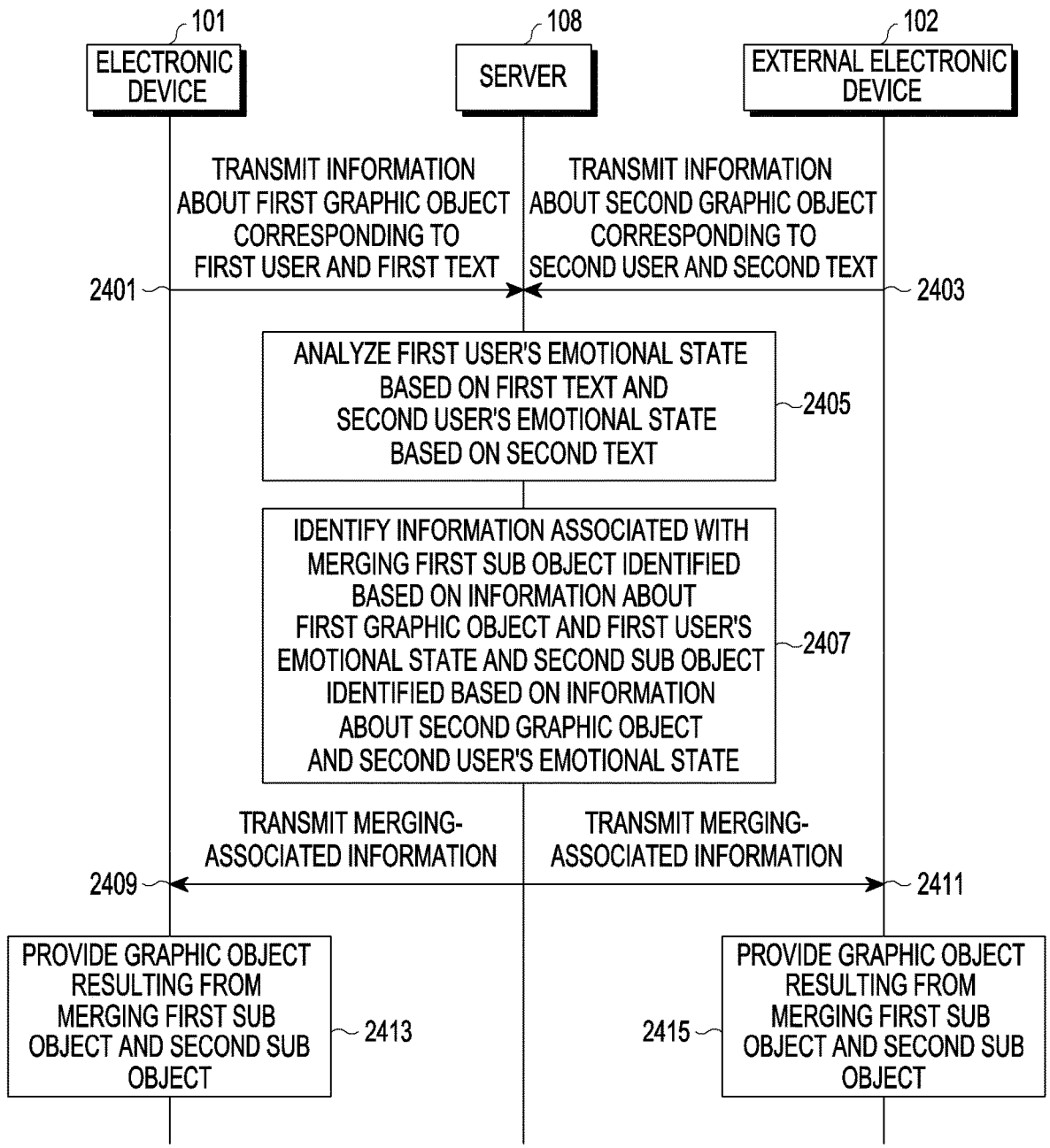
FIG. 24 is a flowchart illustrating an example method of operating an electronic device according to an embodiment.
Figure 25:
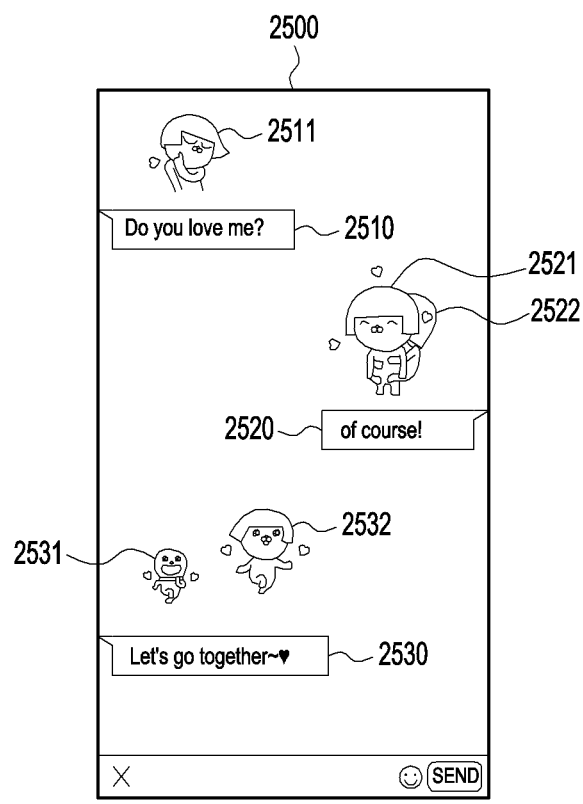
FIG. 25 is a diagram illustrating an example screen displayed on an electronic device according to an embodiment.

FIG. 24 is a flowchart illustrating an example method of operating an electronic device according to an embodiment. The embodiment related to FIG. 24 is described in greater detail with reference to FIG. 25. FIG. 25 is a diagram illustrating an example displayed on an electronic device according to an embodiment.

According to an embodiment, in operation 2401, the electronic device 101 may transmit information about a first graphic object corresponding to a first user and a first text to the server 108. For example, the electronic device 101 may transmit the first text to the server 108 and transmit information for identifying the character being currently used to the server 108. The first text and the information for identifying the character being used may be transmitted simultaneously or separately. In operation 2403, the external electronic device 102 may transmit information about a second graphic object corresponding to a second user and a second text to the server 108. The external electronic device 102 may also transmit the second text to the server 108 and transmit information for identifying the character being used by the second user of the external electronic device 102 to the server 108.

In operation 2405, the server 108 may analyze the first user's emotional state based on the first text and the second user's emotional state based on the second text. In operation 2407, the server 108 may identify the first sub object based on the first user's emotional state and information about the first graphic object, e.g., the character identification information. Further, the server 108 may identify the identified second sub object based on the second user's emotional state and information about the second graphic object, e.g., character identification information. According to an embodiment, even upon identifying the first sub object, the server 108 may additionally use the second user's emotional state, and even upon identifying the second sub object, the server 108 may additionally use the first user's emotional state. The server 108 may identify information associated with merging the first sub object and the second sub object. For example, upon merging, the server 108 may identify, for example, and without limitation, at least one of the size, position, property, or the like, of each of the first sub object and the second sub object. In operation 2409, the server 108 may transmit the merging-associated information to the electronic device 101. In operation 2411, the server 108 may transmit the merging-associated information to the external electronic device 102. In operation 2413, the electronic device 101 may provide a graphic object which results from merging the first sub object and the second sub object. For example, the electronic device 101 may merge and display the first sub object and the second sub object by configuring pre-stored sub objects based on the merging-associated information. Even where no resource for the second sub object is stored, the electronic device 101 may send a request for the resource to the server 108, receive the resource, and display a merged graphic object. In operation 2415, the external electronic device 102 may provide a graphic object which results from merging the first sub object and the second sub object.

For example, as shown in FIG. 25, the electronic device 101 may display a first text 2510 and a first graphic object 2511 corresponding thereto. The first graphic object 2511 may correspond to the character being used by the first user. The external electronic device 102 may transmit the second text 2520 to the server 108 and, corresponding thereto, the server 108 may transmit merged information of the first sub object 2521 and the second sub object 2522 or the merged graphic object to the electronic device 101 and the external electronic device 102. Accordingly, the electronic device 101 may display a merged graphic object of the second text 2520, the first sub object 2521, and the second sub object 2522. For example, the first sub object 2521 may be one selected to correspond to the first user's emotional state while corresponding to the character being used by the first user. The second sub object 2522 may be one selected to correspond to the second user's emotional state while corresponding to the character being used by the second user. The electronic device 101 may obtain a third text 2530 and transmit the third text 2530 to the server 108. In this case, unless the character is changed, the electronic device 101 may only transmit the third text 2530 to the server 108. The server 108 may analyze the third text 2530 and identify the first user's emotional state. The server 108 may identify a third sub object 2532 and a fourth sub object 2531 corresponding to the first user's emotional state and the sub object's emotional state and transmit information about the merging of both the sub objects to the electronic device 101. The electronic device 101 may merge and display the third sub object 2532 and the fourth sub object 2531 based on the merging-related information received from the server 108. According to an embodiment, the server 108 may be configured to transmit directly the merged graphic object, rather than the merging-related information, to the terminal device (e.g., the electronic device 101). In this case, the electronic device 101 may immediately display the graphic object created by merging the sub objects received from the server 108.

Figure 26:
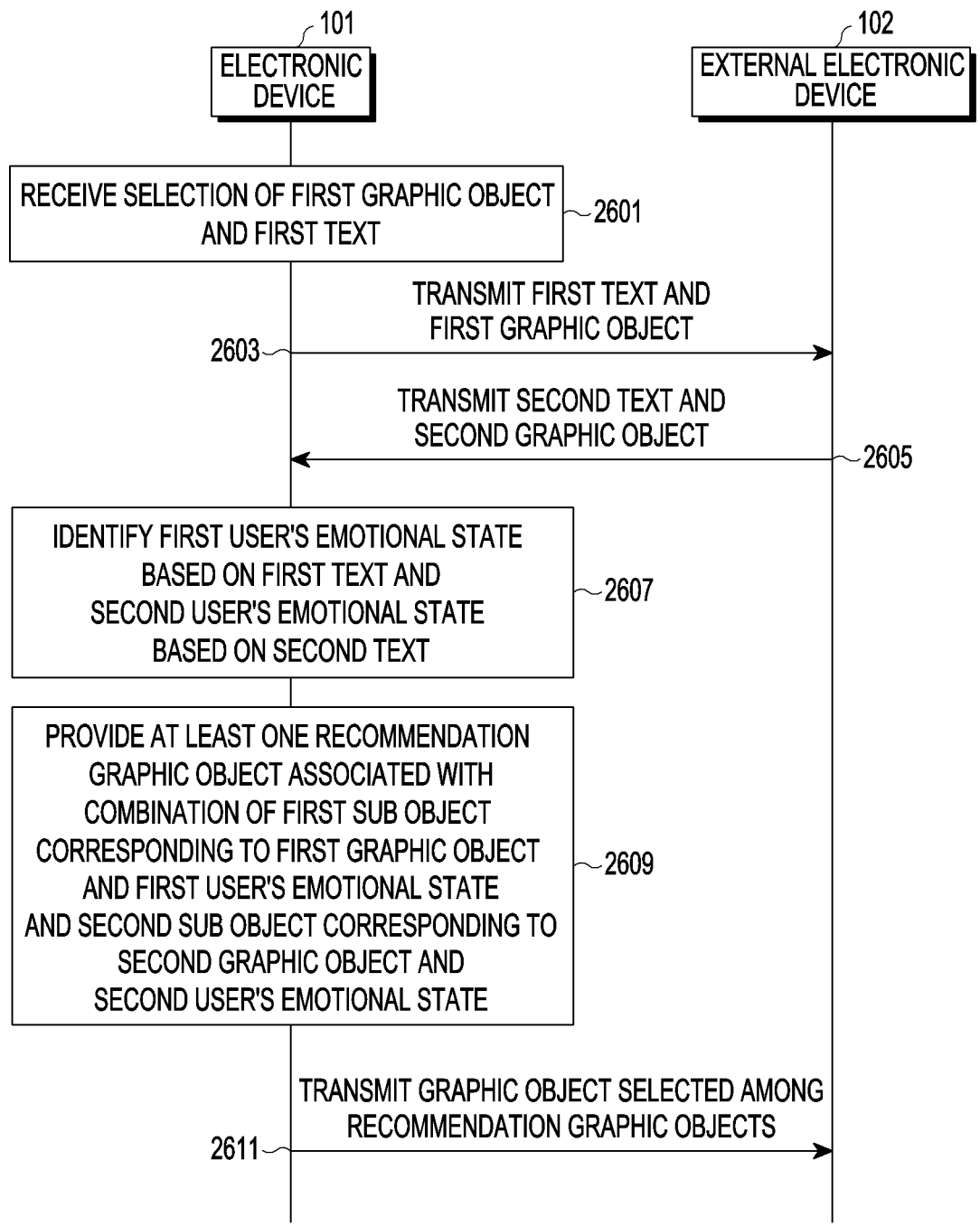
FIG. 26 is a flowchart illustrating an example method of operating an electronic device according to an embodiment.
Figure 27:
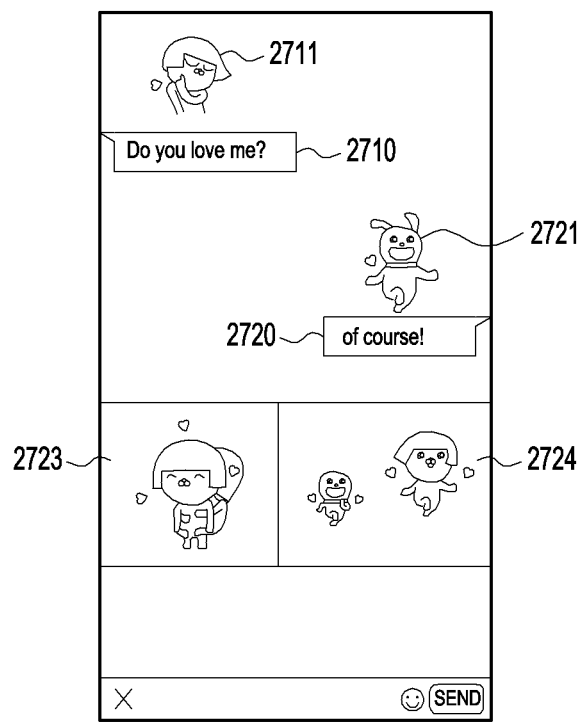
FIG. 27 is a diagram illustrating an example screen displayed on an electronic device according to an embodiment.

FIG. 26 is a flowchart illustrating an example method of operating an electronic device according to an embodiment of the disclosure. The embodiment shown in FIG. 26 is described in greater detail with reference to FIG. 27. FIG. 27 is a diagram illustrating an example screen displayed on an electronic device according to an embodiment.

In operation 2601, the electronic device 101 may receive a selection of a first text and a first graphic object. In operation 2603, the electronic device 101 may transmit the first text and the first graphic object to the server 108 that may then be delivered to the external electronic device 102. The electronic device 101 may display the transmitted text 2710 and the first graphic object 2711 on a conversation window. In operation 2605, the external electronic device 102 may transmit a second text and a second graphic object to the electronic device 101. The electronic device 101 may display the received second text 2720 and the second graphic object 2721. In operation 2607, the electronic device 101 may identify the first user's emotional state based on the first text 2710 and the second user's emotional state based on the second text 2720. In operation 2609, the electronic device 101 may provide at least one recommendation graphic object associated with a combination of a first sub object corresponding to the first user's emotional state and the first graphic object and a second sub object corresponding to the second user's emotional state and the second graphic object. For example, as shown in FIG. 27, even before any input is entered to the text window, the electronic device 101 may display at least one recommendation graphic object 2723 and 2724 by various combinations of the first sub object corresponding to the first user's emotional state and corresponding to the first graphic object 2711 and the second sub object corresponding to the second user's emotional state and corresponding to the character of the second graphic object 2721. In operation 2611, the electronic device 101 may transmit a graphic object selected from among the recommendation graphic objects. Or, the electronic device 101 may receive an additional text and transmit the selected graphic object along with the text.

Figure 28:
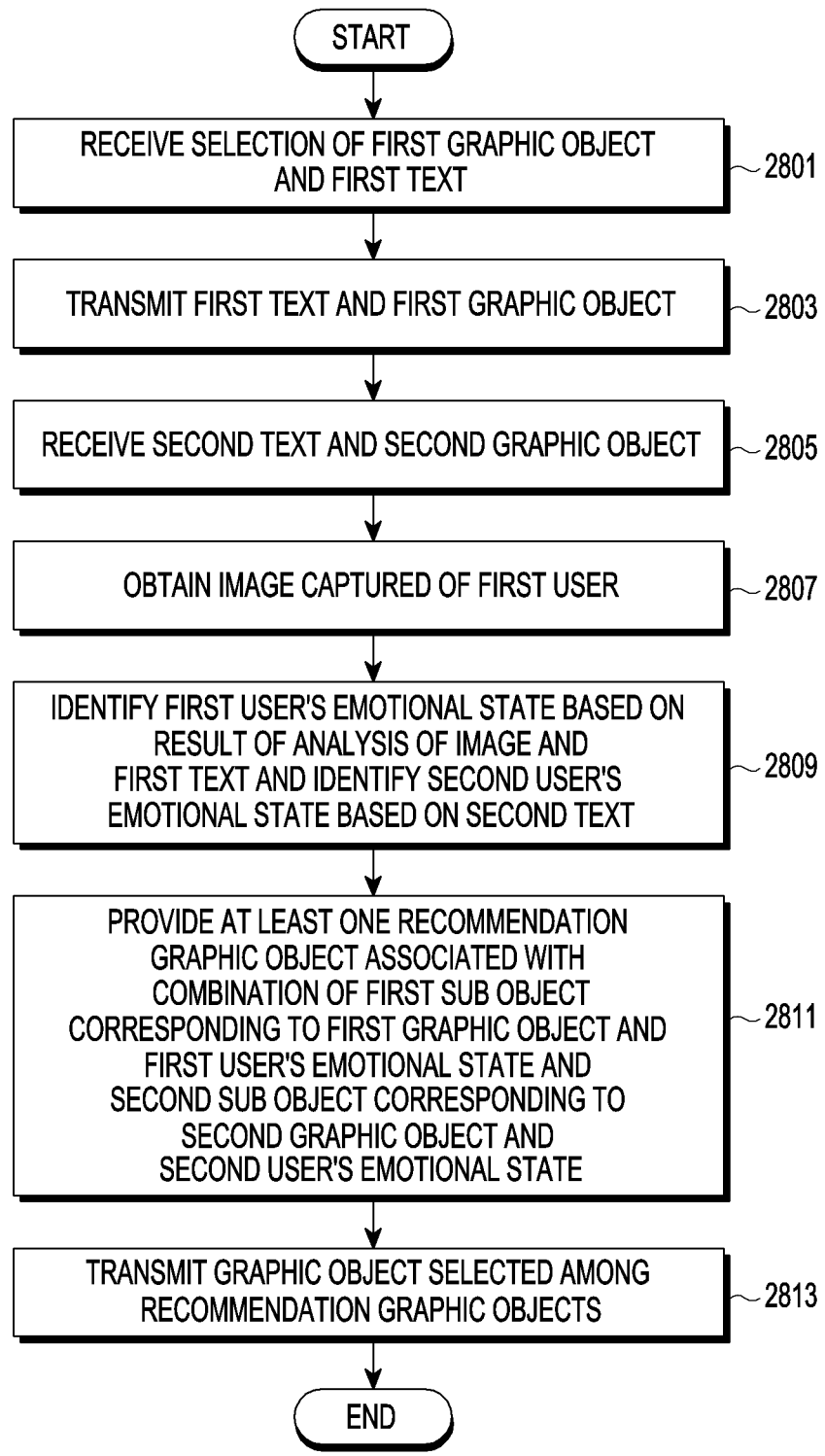
FIG. 28 is a flowchart illustrating an example method of operating an electronic device according to an embodiment.
Figure 29:
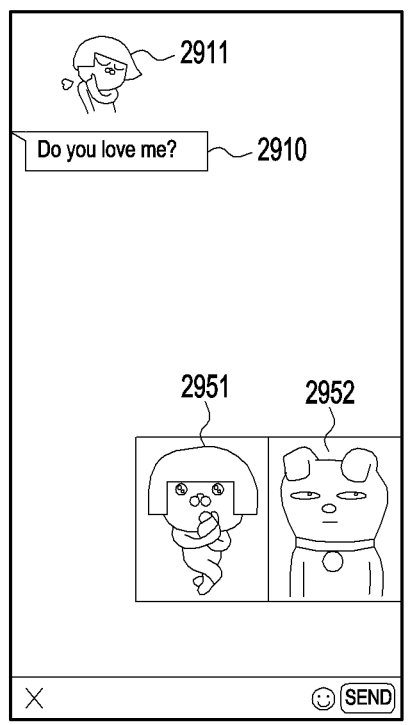
FIG. 29 is a diagram illustrating an example screen displayed on an electronic device and a captured image according to an embodiment.
Figure 29:
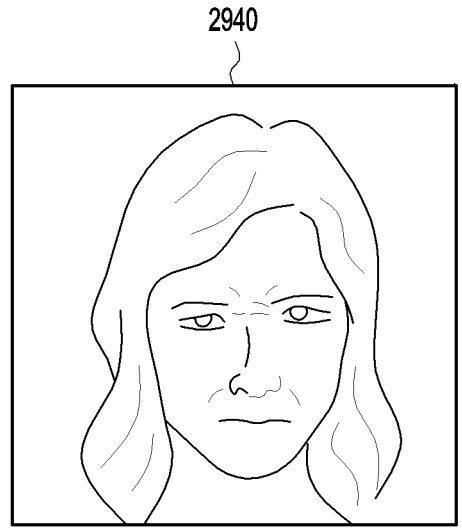

FIG. 28 is a flowchart illustrating an example method of operating an electronic device according to an embodiment of the disclosure. The embodiment related to FIG. 28 is described in greater detail with reference to FIG. 29. FIG. 29 is a diagram illustrating an example screen displayed on an electronic device and an example captured image according to an embodiment.

According to an embodiment, in operation 2801, the electronic device 101 may receive a selection of a first text and a first graphic object. In operation 2803, the electronic device 101 may transmit the first text and the first graphic object. In operation 2805, the electronic device 101 may receive a second text and a second graphic object from the external electronic device 102. The electronic device 101 may display the received second text 2910 and second graphic object 2911 as shown in, e.g., FIG. 29. In operation 2807, the electronic device 101 may obtain an image 2940 captured of the first user through, e.g., a camera. In operation 2809, the electronic device 101 may identify the first user's emotional state based on the first text and the image analysis result and identify the second user's emotional state based on the second text. In operation 2811, the electronic device 101 may provide at least one recommendation graphic object associated with a combination of a first sub object corresponding to the first user's emotional state and the first graphic object and a second sub object corresponding to the second user's emotional state and the second graphic object. For example, as shown in FIG. 29, the electronic device 101 may display the second sub object 2951 corresponding to the second user's emotional state. Further, the electronic device 101 may also display, as a recommendation graphic object, the first sub object 2952 corresponding to the first user's emotional state identified based on the image analysis result. In operation 2813, the electronic device 101 may transmit a graphic object selected from among the recommendation graphic objects.

Figure 30:
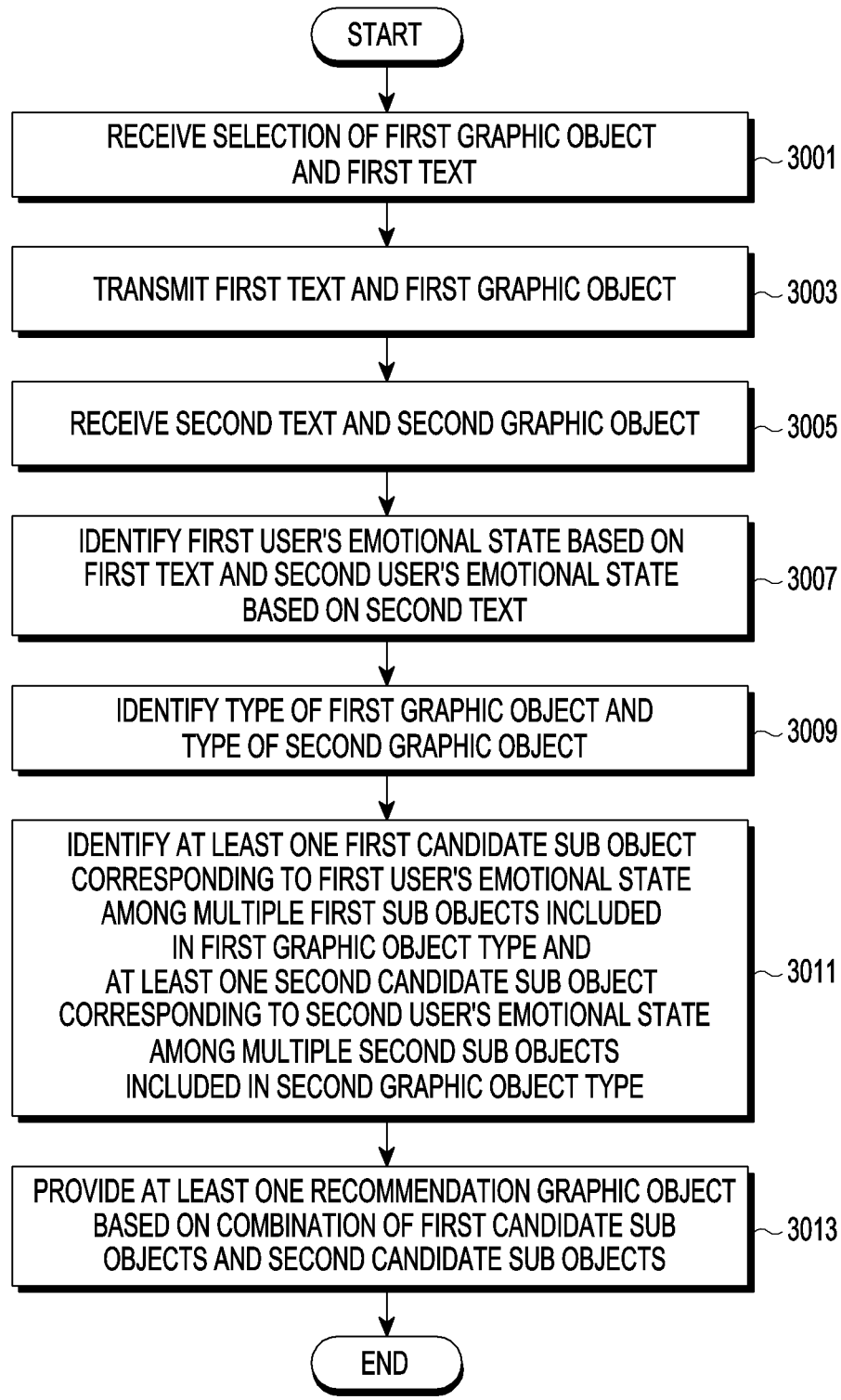
FIG. 30 is a flowchart illustrating an example method of operating an electronic device according to an embodiment.

FIG. 30 is a flowchart illustrating an example method of operating an electronic device according to an embodiment of the disclosure.

In operation 3001, the electronic device 101 may receive a selection of a first text and a first graphic object. In operation 3003, the electronic device 101 may transmit the first text and the first graphic object. In operation 3005, the electronic device 101 may receive a second text and a second graphic object. In operation 3007, the electronic device 101 may identify the first user's emotional state based on the first text and the second user's emotional state based on the second text. In operation 3009, the electronic device 101 may identify the type of the first graphic object and the type of the second graphic object. The electronic device 101 may identify identification information about the character used by the first user and identification information about the character used by the second user. In operation 3011, the electronic device 101 may identify at least one first candidate sub object corresponding to the first user's emotional state among a plurality of first sub objects included in the type of the first graphic object and at least one second candidate sub object corresponding to the second user's emotional state among a plurality of second sub objects included in the type of the second graphic object. In other words, the electronic device 101 may identify a plurality of candidate sub objects set per character. In operation 3013, the electronic device 101 may provide at least one recommendation graphic object based on a combination of the first candidate sub objects and the second candidate sub objects. The electronic device 101 may transmit one selected among the recommendation graphic objects to the external electronic device 102.

Figure 31A:
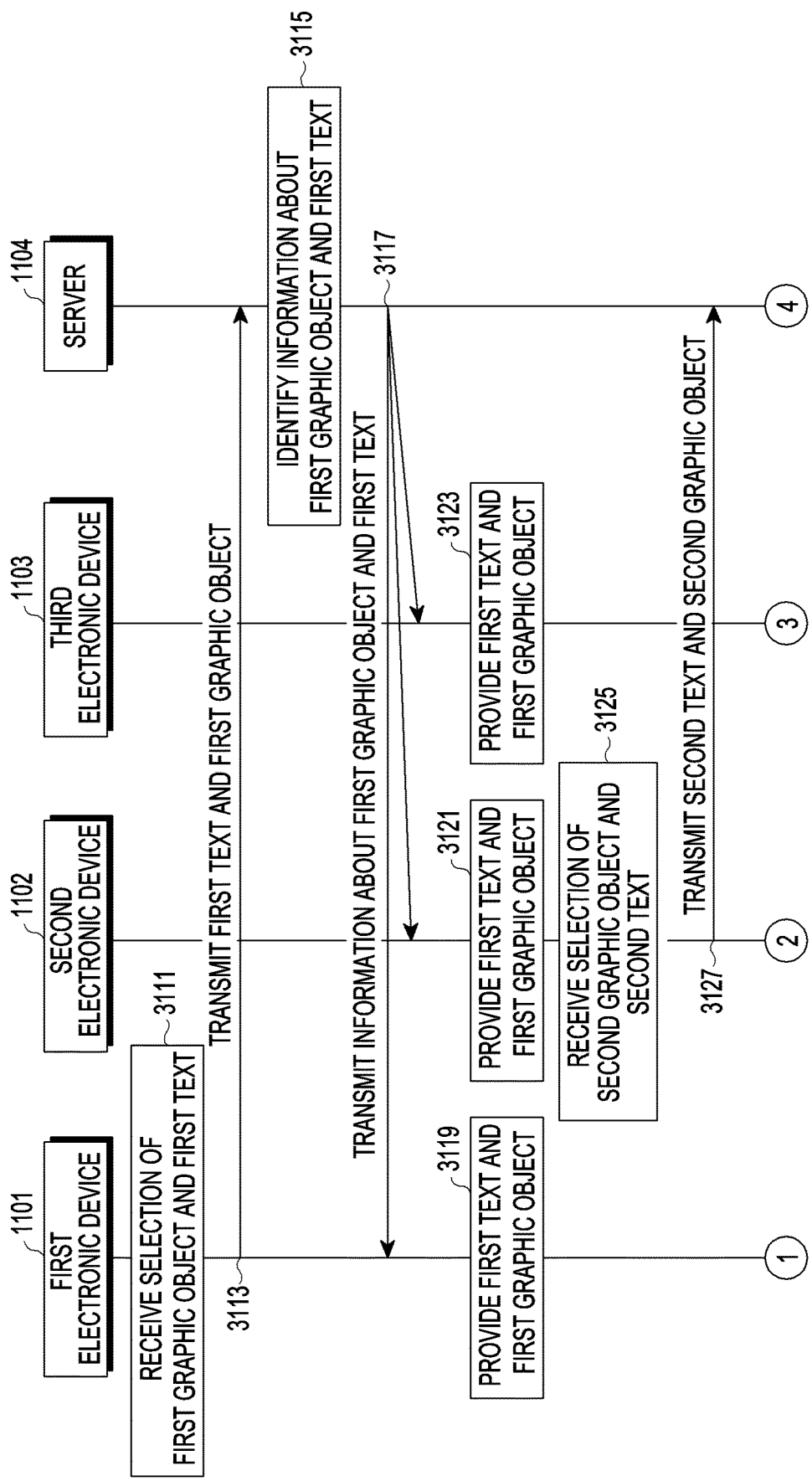
FIG. 31A is a flowchart illustrating an example method of operating an electronic device according to an embodiment.
Figure 31B:
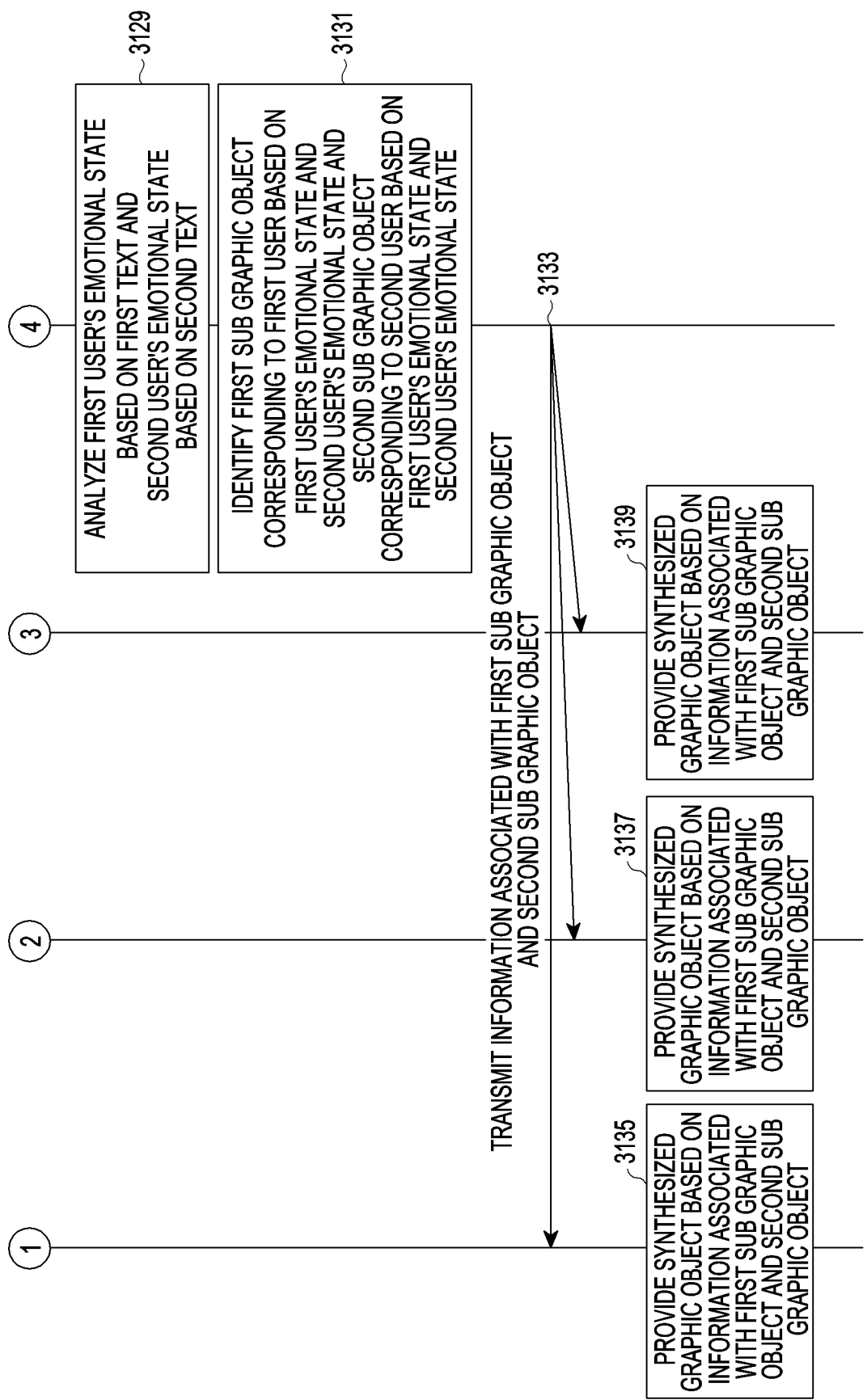
FIG. 31B is a flowchart illustrating an example method of operating an electronic device according to an embodiment.
Figure 32A:
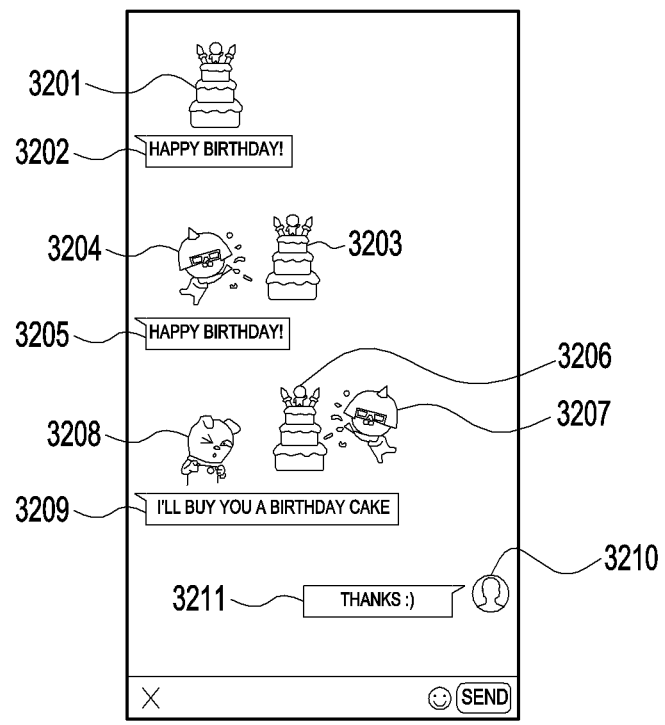
FIG. 32A is a diagram illustrating an example screen displayed on an electronic device according to an embodiment.
Figure 32B:
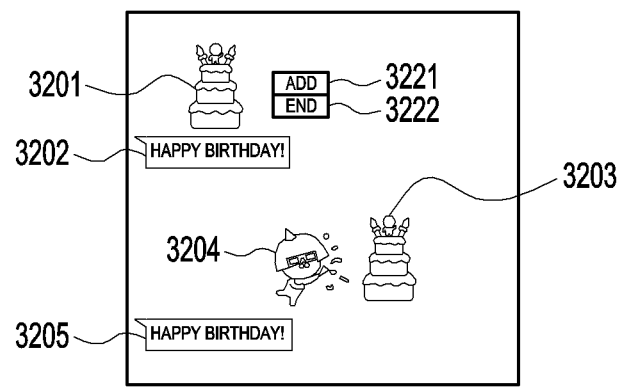
FIG. 32B is a diagram illustrating an example screen displayed on an electronic device according to an embodiment.
Figure 32C:
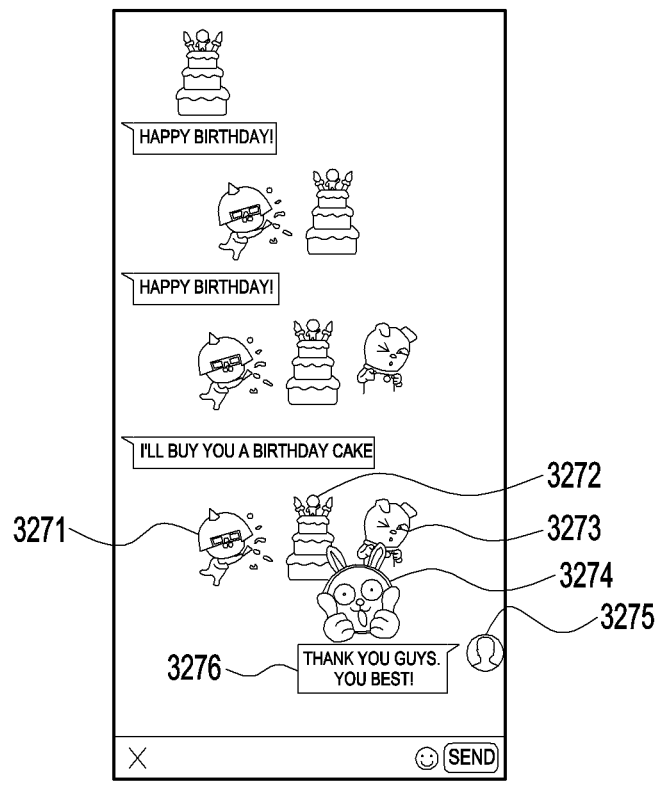
FIG. 32C is a diagram illustrating an example screen displayed on an electronic device according to an embodiment.

FIG. 31A is a flowchart illustrating an example method of operating an electronic device according to an embodiment. FIG. 31B is a flowchart illustrating an example method of operating an electronic device according to an embodiment. The embodiment of FIGS. 31A and 31B is described in greater detail with reference to FIGS. 32A, 32B and 32C. FIG. 32A is a diagram illustrating an example screen displayed on an electronic device according to an embodiment. FIG. 32B is a diagram illustrating an example screen displayed on an electronic device according to an embodiment. FIG. 32C is a diagram illustrating an example screen displayed on an electronic device according to an embodiment.

According to an embodiment, in operation 3111, a first electronic device 1101 may receive a selection of a first text and a first graphic object. In operation 3113, the first electronic device 1101 may transmit the first text and the first graphic object to the server 1104. The first electronic device 1101 is presumed to have attended a group conversation session of three or more users. In other words, the first electronic device 1101, a second electronic device 1102, and a third electronic device 1103 may attend the group conversation session.

In operation 3115, the server 1104 may identify information about the first text and the first graphic object. In operation 3117, the server 1104 may transmit the information about the first text and the first graphic object to the electronic devices 1101, 1102 and 1103 attending the group conversation session. The first electronic device 1101, the second electronic device 1102, and the third electronic device 1103 may provide the first text and the first graphic object in operations 3119, 3121, and 3123. In operation 3125, the second electronic device 1102 may receive a selection of a second text and a second graphic object. In operation 3127, the second electronic device 1102 may transmit the second text and the second graphic object to the server 1104. In operation 3129, the server 1104 may analyze the first user's emotional state based on the first text and the second user's emotional state based on the second text. In operation 3131, the server 1104 may identify the first sub graphic object corresponding to the first user based on the first user's emotional state and the second user's emotional state and identify the second sub graphic object corresponding to the second user based on the first user's emotional state and the second user's emotional state. In operation 3133, the server 1104 may transmit information associated with the first sub graphic object and the second sub graphic object to the electronic devices 1101, 1102, 1103 attending the group conversation session. In operations 3135, 3137, and 3139, the first electronic device 1101, the second electronic device 1102, and the third electronic device 1103 may provide a synthesized graphic object based on the information associated with the first sub graphic object and the second sub graphic object. For example, as shown in FIG. 32A, the third electronic device 1103 may display the first text 3202 and the first graphic object 3201 obtained from the first electronic device 1101. Further, the server 1004 may provide the second text 3205 obtained from the second electronic device 1102 and a graphic object composed of the sub object 3204 corresponding to the character identified from the second electronic device 1102 and the sub object 3203 corresponding to the character identified from the first electronic device 1101 to the third electronic device 1103, and the third electronic device 1103 may display the graphic object including the plurality of sub objects 3203 and 3204 and the second text 3205. The sub object 3204 may be determined by the server 1104 based on the emotional state of the user of the second electronic device 1102. The server 1004 may provide the third text 3209 obtained from a fourth electronic device (not shown) and a graphic object comprising the sub object 3208 corresponding to the character identified from the fourth electronic device (not shown), the sub object 3206 corresponding to the character identified from the first electronic device 1101, and the sub object 3207 corresponding to the character identified from the second electronic device 1102 to the third electronic device 1103, and the third electronic device 1103 may display the graphic object constituted of the plurality of sub objects 3206, 3207, and 3208 and the third text 3209. Even where no graphic object is designated from the second electronic device 1102 and only the text 3205 is entered to the second electronic device 1102, the server 1104 may identify the sub object 3204 based on the emotional state of the second user of the second electronic device 1102 and the character corresponding to the second electronic device 1102 and provide the same to the second electronic device 1102. As shown in FIG. 32A, the server 1104 may vary the position of the sub object 3207 in the overall graphic object to add the sub object 3208. The third electronic device 1103 may receive the text 3211 and transmit the text 3211 to the server 1104. The third electronic device 1103 may display the text 3211 and the designated character 3210. Or, as shown in FIG. 32B, the second electronic device 1102 may display objects 3221 and 3222 to select whether to add a second graphic object in association with the graphic object 3201 while displaying the first text 3202 and the graphic object 3201 identified from the first electronic device 1101. Where an object 3221 to indicate "add" is designated, the second electronic device 1102 may transfer the designation of add object to the server 1104 and, corresponding thereto, the server 1104 may add a sub object based on the user's emotional state identified from the text from the second electronic device 1102 and transfer the added sub object to the electronic devices in the session. In this case, there may be additionally provided a user interface for adding the type or position of the sub object to be added, and the second electronic device 1102 may transfer information obtained through the user interface to the server 1104. The server 1104 may determine at least one of the type or position of the sub object based on the received information. Where an object 3222 to indicate "end", the server 1104 may only transfer the text from the second electronic device 1102 to the electronic devices in the session, corresponding to the designation. According to an embodiment, where all the participants in the session are identified to have added the sub object, the server 1104 may automatically terminate the sub object add. Or, upon identifying that the number of sub objects added is a threshold or more, the server 1104 may be configured to stop adding a sub object. As shown in FIG. 32C, the third electronic device 1103 may receive a terminate add command. Where the third electronic device 1103 transfers the terminate add command to the server 1104, the server 1104 may display together a graphic object reflecting a sub object 3274 to indicate "complete" to the prior-added sub objects 3271, 3272, and 3273, the text 3276 entered from the third electronic device 1103, and a photo 3275 of the user of the third electronic device 1103.

Figure 33:
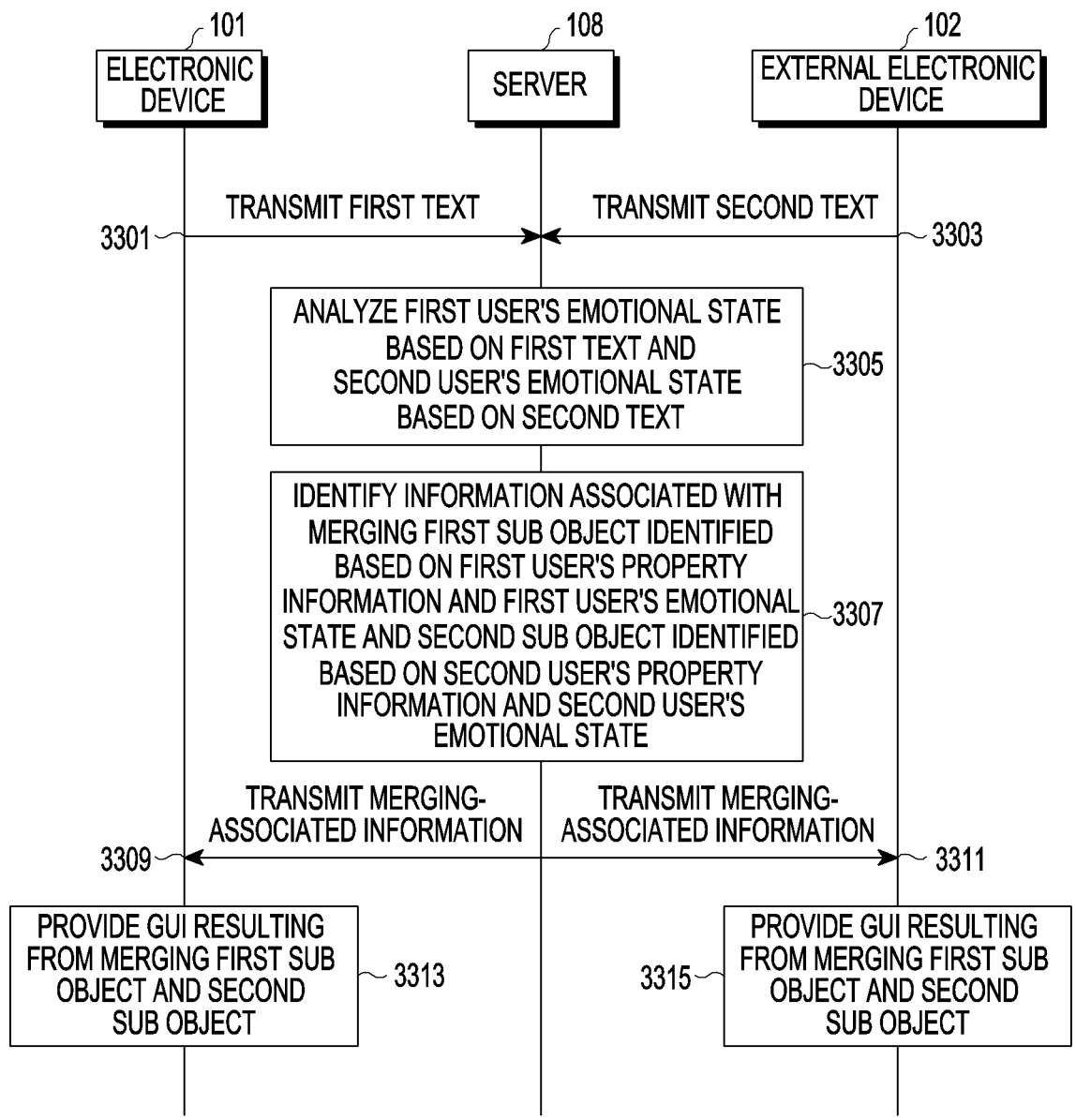
FIG. 33 is a flowchart illustrating an example method of operating an electronic device according to an embodiment.
Figure 34:
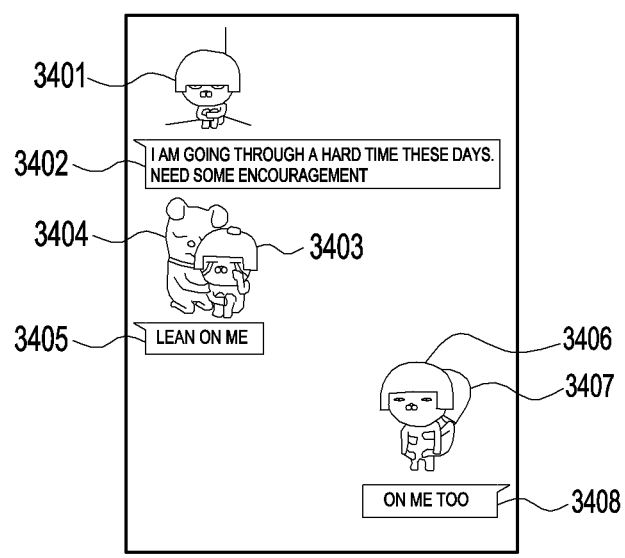
FIG. 34 is a diagram illustrating an example screen displayed on an electronic device according to an embodiment.

FIG. 33 is a flowchart illustrating an example method of operating an electronic device according to an embodiment of the disclosure. The embodiment related to FIG. 33 is described in greater detail with reference to FIG. 34. FIG. 34 is a diagram illustrating an example screen displayed on an electronic device according to an embodiment.

In operation 3301, the electronic device 101 may transmit a first text to the server 108. In operation 3303, the external electronic device 102 may transmit a second text to the server 108. In operation 3305, the server 108 may analyze the first user's emotional state based on the first text and the second user's emotional state based on the second text. In operation 3307, the server 108 may identify information associated with a merging of a first sub object identified based on the first user's emotional state and the first user's property information and a second sub object identified based on the second user's emotional state and the second user's property information. As set forth above, the user's property information may be information associated with the identified user, such as, for example, and without limitation, the user's age, gender, personality, or the like. The server 108 may identify the sub object based on the user's property along with the user's emotional state. Or, the server 108 may identify the user's emotional state based on a result of text analysis and the user's property and may identify the sub object based on the user's emotional state. In operation 3309, the server 108 may transmit the merging associated information associated with the sub objects to the electronic device 101. In operation 3311, the server 104 may transmit the merging associated information associated with the sub objects to the external electronic device 102. In operation 3313, the electronic device 101 may provide a GUI which is a merged one of the first sub object and the second sub object based on the received merging-associated information. In operation 3315, the external electronic device 102 may provide a GUI which is a merged one of the first sub object and the second sub object based on the received merging-associated information. For example, as shown in FIG. 34, the electronic device 101 may transmit the first text 3402 to the server 108 and, as a result of analysis of the first text 3402, the server 108 may identify the type of the first user's emotion as "sad" and transmit the same to the electronic device 101. The electronic device 101 may display the graphic object 3401 based on the identified type of emotion. The server 108 may receive the second text 3405 from the second user's electronic device, identify the type of the user's emotion corresponding thereto as "encouragement" and, based thereupon, transmit a graphic object including the sub object 3403 corresponding to the first user and the sub object 3404 corresponding to the second user to the second user's electronic device. Where the second user's electronic device issues a command to transmit the graphic object, the electronic device 101 may receive the graphic object and the second text 3405. The electronic device 101 may display the sub objects 3404 and 3403 of the graphic object and the second text 3405. The third user's electronic device may enter the third text 3408. The server 108 may receive the third text 3408 and identify the third user's type of emotion as "encouragement". Additionally, the server 108 may identify the gender which is the first user's property and the gender which is the second user's property and identify the sub object corresponding to the first user as the sub object 3406 corresponding to the type of emotion, "embarrassed". The server 108 may identify the sub object 3407 corresponding to the third user's type of emotion, "encouragement", and transmit the merging-related information to the third user's electronic device. Upon receiving the graphic object and the third text from the third user's electronic device, the electronic device 101 may display the sub objects 3406 and 3407 and the third text 3408.

Figure 35:
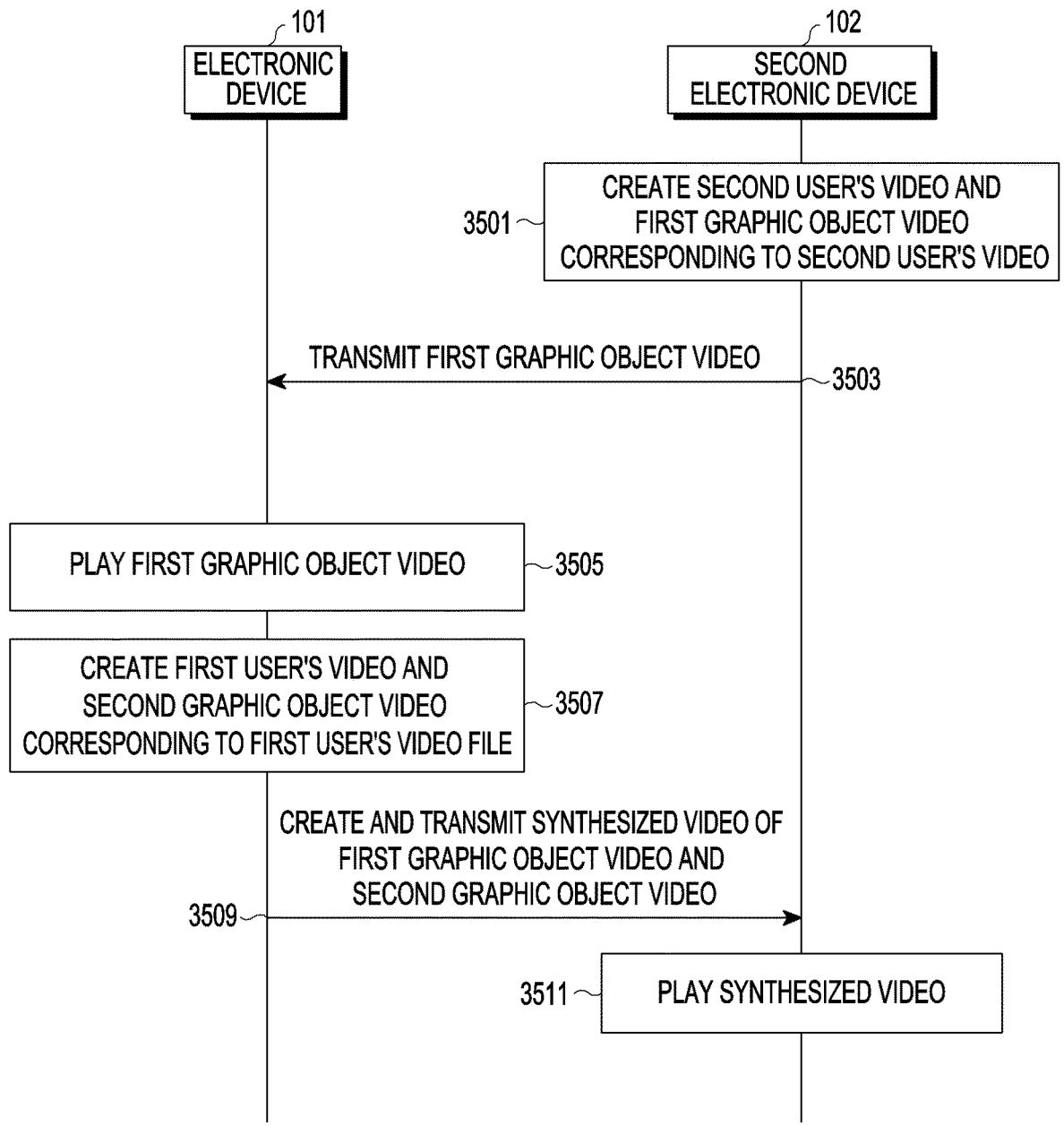
FIG. 35 is a flowchart illustrating an example method of operating an electronic device according to an embodiment.
Figure 36:
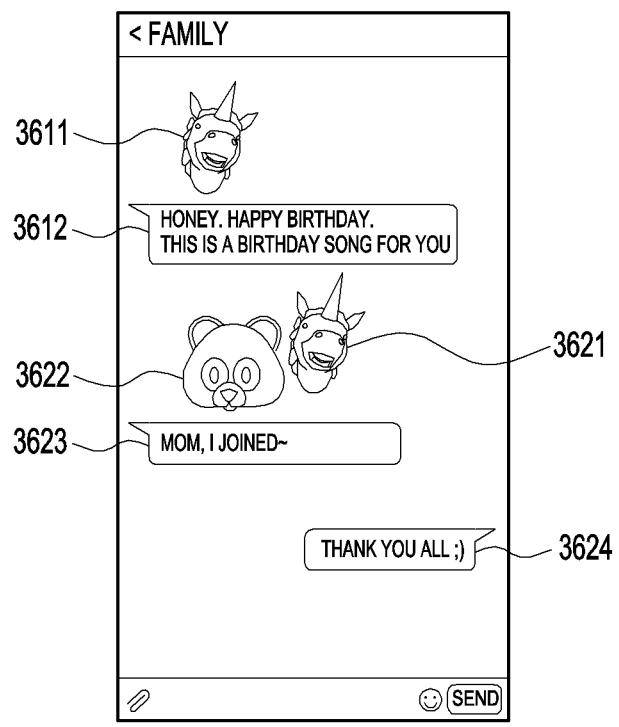
FIG. 36 is a diagram illustrating an example screen displayed on an electronic device according to an embodiment.

FIG. 35 is a flowchart illustrating an example method of operating an electronic device according to an embodiment. The embodiment of FIG. 35 is described in greater detail in connection with FIG. 36. FIG. 36 is a diagram illustrating an example screen displayed on an electronic device according to an embodiment.

According to an embodiment, in operation 3501, the external electronic device 102 may create the second user's video and a first graphic object video corresponding to the second user's video. For example, the external electronic device 102 may capture the user's face, identify feature points of the user's face, and create the first graphic object video copying the user's facial expressions based on the positions of and changes in the feature points. In operation 3503, the external electronic device 102 may transmit the first graphic object video to the electronic device 101. The electronic device 101 may play the first graphic object video in operation 3505. For example, as shown in FIG. 36, the electronic device 101 may play the received first graphic video object 3611. Further, the electronic device 101 may also display the text 3612 received from the external electronic device 102. In operation 3507, the electronic device 101 may create the first user's video and a second graphic object video corresponding to the first user's video file. For example, the electronic device 101 may create the first user's video file by capturing the user using the camera and create a second graphic video object copying the expressions. In operation 3509, the electronic device 101 may create and transmit a synthesized video of the first graphic object video and the second graphic object video. For example, the electronic device 101 may temporally synchronize the first graphic object video and the second graphic object video and arrange them spatially adjacent each other, thereby creating the synthesized video. In operation 3511, the external electronic device 102 may play the synthesized video. The electronic device 101 may play the synthesized video including the plurality of sub videos 3621 and 3622. The electronic device 101 may transmit a text received and display the received text 3623. The electronic device 101 may display a text 3624 additionally received.

Figure 37A:
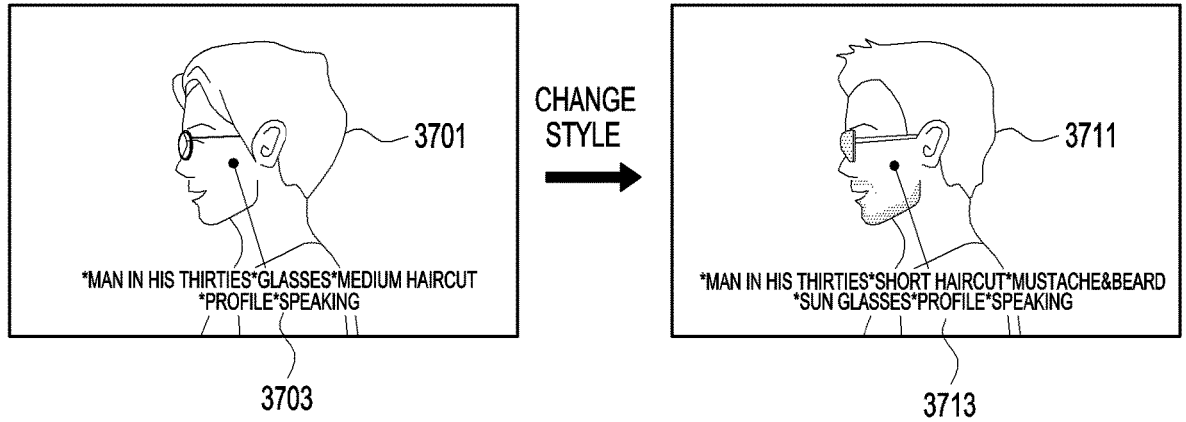
FIG. 37A is a diagram illustrating example screens displayed on an electronic device according to an embodiment.
Figure 37B:
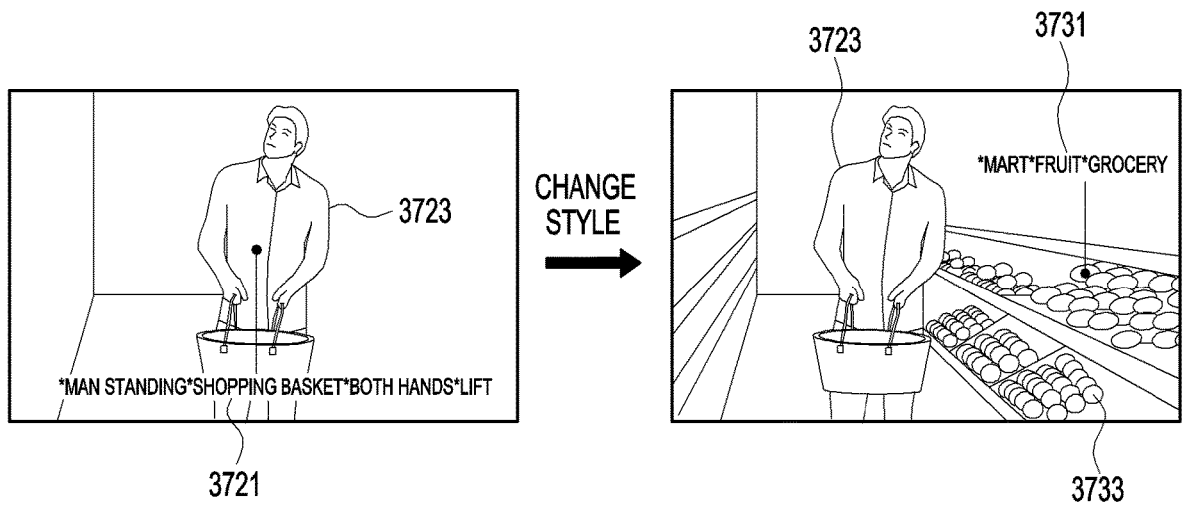
FIG. 37B is a diagram illustrating example screens displayed on an electronic device according to an embodiment.

FIG. 37A is a diagram illustrating example screens displayed on an electronic device according to an embodiment. FIG. 37B is a diagram illustrating example screens displayed on an electronic device according to an embodiment. Upon receiving a text 3703, the electronic device 101 may display a graphic object 3701 corresponding thereto. Upon receiving a text 3713 as partially modified, the electronic device 101 may display a graphic object 3711 resulting from modifying at least some of the resources. As shown in FIG. 37B, the electronic device 101 may display a graphic object 3723 corresponding to a text 3721. The electronic device 101 may receive a text 3731 in a different position on the screen and display a graphic object 3733 corresponding to the text 3731 in the position.

Figure 38:
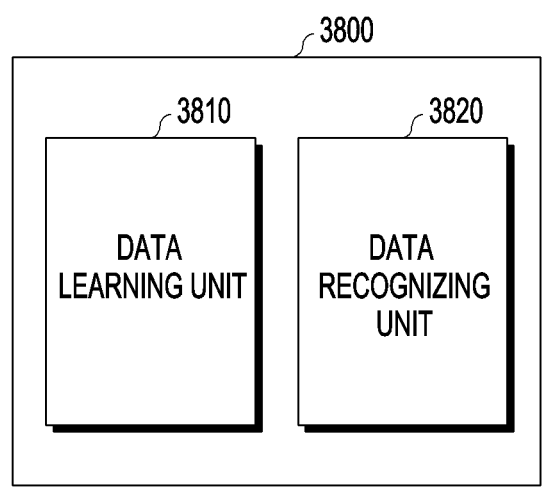
FIG. 38 is a block diagram illustrating an example processor according to an embodiment.

FIG. 38 is a block diagram illustrating an example processor according to an embodiment.

Referring to FIG. 38, according to an embodiment, a processor (e.g., including processing circuitry) 3800 may include a data learning unit (e.g., including processing circuitry and/or program elements) 3810 and a data recognizing unit (e.g., including processing circuitry and/or program elements) 3820. The processor 3800 may be included in the server 108 or the electronic device 101.

The data learning unit 3810 may include various processing circuitry and/or program elements and learn references for determining at least one of the type and degree of emotion or the type of action corresponding to an obtained text. The data learning unit 3810 may learn the references for determining at least one of the type and degree of emotion or the type of action corresponding to the text by obtaining learning data to be used for learning and applying the obtained learning data to a data recognition model to be described below.

For example, the data learning unit 3810 may use statistical data for information about at least one of the type and degree of emotion or the type of action corresponding to the text recommended by the server 108 or the electronic device 101 and the text as the learning data for learning the references.

The data learning unit 3810 may train the data recognition model based on the learning data through unsupervised learning.

The data learning unit 3810 may train or update the data recognition model using the user's feedback as per the results of the recognition. Specifically, the data learning unit 3810 may train the data recognition model such that among at least one of the type and degree of emotion or the type of action corresponding to the text recommended by the server 108 or the electronic device 101, the one selected by the user is assigned a larger weight.

The data recognizing unit 3820 may include various processing circuitry and/or program elements and determine at least one of the type and degree of emotion or the type of action corresponding to the text entered from the user based on the data. For example, the data recognizing unit 3820 may determine at least one of the type and degree of emotion or the type of action corresponding to the text using the results of learning. The data recognizing unit 3820 may obtain predetermined data as per preset references by learning and use the data recognition model using the obtained data as an input value. By using the same, the data recognizing unit 3820 may determine at least one of the type and degree of emotion or the type of action corresponding to the text to be recommended based on the predetermined data. The resultant value output by the data recognition model using the obtained data as an input value may be used to update the data recognition model.

For example, the data recognizing unit 3820 may obtain a text as recognition data. The data recognizing unit 3820 may obtain at least one of the type and degree of emotion or the type of action corresponding to the text by applying the obtained data to the data recognition model.

At least part of the data learning unit 3810 and at least part of the data recognizing unit 3820 may be produced in at least one hardware chip that may then be equipped in the electronic device 101 or the server 108. For example, at least one of the data learning unit 3810 and the data recognizing unit 3820 may be formed in a dedicated hardware chip for artificial intelligence (AI) or in part of an existing general-purpose processor (e.g., a central processing unit (CPU) or application processor) or a graphic dedicated processor (e.g., graphics processing unit (GPU)) and be equipped in various electronic devices. In this case, the dedicated hardware chip for AI may be a dedicated processor specified for probability computation, which may quickly process AI computation tasks, e.g., machine learning, with a better parallel processing performance than existing general-purpose processors.

The data learning unit 3810 and the data recognizing unit 3820 may be equipped in one electronic device 101 or the server 108 or in separate electronic devices. For example, one of the data learning unit 3810 and the data recognizing unit 3820 may be included in the electronic device 101, and the other in the server 108. The data learning unit 3810 and the data recognizing unit 3820 may wiredly or wirelessly provide model information established by the data learning unit 3810 to the data recognizing unit 3820, and data entered to the data recognizing unit 3820, as additional learning data, may be provided to the data learning unit 3810.

At least part of the data learning unit 3810 and at least part of the data recognizing unit 3820 may be implemented in at least one software module. Where at least one of the data learning unit 3810 and the data recognizing unit 3820 is implemented in a software module (or a program module including instructions), the software module may be stored in a non-transitory computer-readable recording medium. At least one software module may be provided by an operating system (OS) or by a predetermined application. Some of the at least one software module may be provided by the OS, and others may be provided by the predetermined application.

Figure 39:
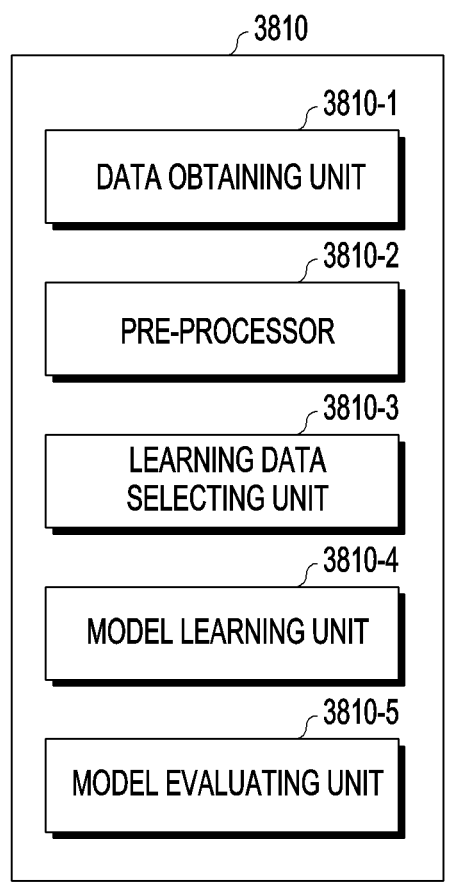
FIG. 39 is a block diagram illustrating an example data learning unit according to an embodiment.

FIG. 39 is a block diagram illustrating an example data learning unit 3810 according to an embodiment.

Referring to FIG. 39, according to an embodiment, the data learning unit 3810 may include a data obtaining unit (e.g., including processing circuitry and/or program elements) 3810-1, a pre-processor (e.g., including processing circuitry and/or program elements) 3810-2, a learning data selecting unit (e.g., including processing circuitry and/or program elements) 3810-3, a model learning unit (e.g., including processing circuitry and/or program elements) 3810-4, and a model evaluating unit (e.g., including processing circuitry and/or program elements) 3810-5. According to an embodiment, the data learning unit 3810 may include the data obtaining unit 3810-1 and the model learning unit 3810-4 and may optionally include at least one of the pre-processor 3810-2, the learning data selecting unit 3810-3, and the model evaluating unit 3810-5.

The data obtaining unit 3810-1 may include various processing circuitry and/or program elements and obtain learning data necessary to determine at least one of the type and degree of emotion or the type of action corresponding to a text.

The data obtaining unit 3810-1 may obtain, e.g., a text. Further, the data obtaining unit 3810-1 may obtain data selected by the user among at least one of the type and degree of emotion or the type of action corresponding to a text recommended by the server 108 or the electronic device 101.

The pre-processor 3810-2 may include various processing circuitry and/or program elements and may pre-process the obtained text. The pre-processor 3810-2 may process the obtained data into a preset format to allow the model learning unit 3810-4 to use the obtained data for learning at least one of the type and degree of emotion or the type of action corresponding to the text.

The learning data selecting unit 3810-3 may include various processing circuitry and/or program elements and may select learning data necessary for learning among the pre-processed data. The selected learning data may be provided to the model learning unit 3810-4. The learning data selecting unit 3810-3 may determine at least one of the type and degree of emotion or the type of action corresponding to a text to be recommended. The learning data selecting unit 3810-3 may also select learning data as per references preset by learning by the model learning unit 3810-4 described below.

The model learning unit 3810-4 may include various processing circuitry and/or program elements and may determine at least one of the type and degree of emotion or the type of action corresponding to the text based on the learning data selected by the learning data selecting unit 3810-3 or obtained through the data obtaining unit 3810-1.

The model learning unit 3810-4 may train, with learning data, the data recognition model used to determine at least one of the type and degree of emotion or the type of action corresponding to the text. In this case, the data recognition model may be a model previously built up. For example, the data recognition model may be a model previously built up by receiving basic learning data (e.g., sample data).

The data recognition model may be established given, e.g., the field of application, the purpose of learning, or the computation performance of the device. The data recognition model may be designed to mimic the human brain on the computer. The data recognition model may include a plurality of weight-assigned network nodes mimicking the neurons of the human neural network. The plurality of network nodes may form connections to mimic the synaptic activity of neurons to exchange signals through the synapses. The data recognition model may include, e.g., a neural network model or a deep learning model as an advanced version of the neural network model. In the deep learning model, a plurality of network nodes may be positioned at different depths (or layers) to exchange data as per convolution connections. For example, the deep neural network (DNN), recurrent neural network (RNN), bidirectional recurrent deep neural network (BRDNN) or such types of models may be used as the data recognition model, but not limited thereto.

According to an embodiment, where there are previously built up a plurality of data recognition models, the model learning unit 3810-4 may determine the data recognition model with the larger relevance between input learning data and basic learning data as the data recognition model for training. In this case, the basic learning data may be previously classified per data type, and the data recognition model may previously be established per data type. For example, the basic learning data may previously be classified by various references, such as the region and time that the learning data was created, the size, genre, and creator of the learning data, and the type of objects in the learning data.

The model learning unit 3810-4 may train the data recognition model using learning algorithms including, e.g., error back-propagation or gradient descent.

The model learning unit 3810-4 may train the data recognition model through, e.g., supervised learning using at least part of the learning data as references for determination.

The model learning unit 3810-4 may train the data recognition model through unsupervised learning that discovers references for determining at least one of the type and degree of emotion or the type of action corresponding to the text by self-learning at least one of the type and degree of emotion or the type of action corresponding to the text using learning data without supervision. Or, the model learning unit 3810-4 may train the data recognition model using feedback information that is at least one of the type and degree of emotion or the type of action corresponding to the text selected by the user.

The model learning unit 3810-4 may also train the data recognition model through reinforcement learning that uses, e.g., a determination of the user's intention as per learning, the provision of associated information, and feedback as to whether the result of recommending a replacement action is correct.

Where the data recognition model is trained, the model learning unit 3810-4 may store the trained data recognition model. In this case, the model learning unit 3810-4 may store the trained data recognition model in the memory of the electronic device (e.g., the server 108 or the electronic device 101) including the data recognizing unit 3820. Or, the model learning unit 3810-4 may store the trained data recognition model in the memory (e.g., the server 108 or the electronic device 101) of the electronic device including the data recognizing unit 3820 as described below. Or, the model learning unit 3810-4 may store the trained data recognition model in a memory of a server connected with the electronic device (e.g., the server 108 or the electronic device 101) via a wired or wireless network.

In this case, the memory storing the trained data recognition model may also store, e.g., commands or data related to at least one other component of the electronic device. The memory may store software and/or a program. The program may include, e.g., a kernel, middleware, an application programming interface (API), and/or an application program (or an application).

The model evaluating unit 3810-5 may include various processing circuitry and/or program elements and may enter evaluation data to the data recognition model and, where a result of recognition output from the evaluation data fails to meet a predetermined reference, enable the model learning unit 3810-4 to retrain the data recognition model. In this case, the evaluation data may be preset data to evaluate the data recognition model.

For example, where the trained data recognition model shows incorrect results of recognition that exceed a preset threshold number or proportion in relation to the evaluation data, the model evaluating unit 3810-5 may evaluate that the data recognition model fails to meet a predetermined reference. For example, where the predetermined reference is defined as a 2% proportion, and the trained data recognition model outputs wrong results of recognition for more than 20 pieces of evaluation data among a total of 1,000 pieces of evaluation data, the model evaluating unit 3810-5 may evaluate that the trained data recognition model is inappropriate.

Meanwhile, where there are a plurality of trained data recognition models, the model evaluating unit 3810-5 may evaluate whether each trained data recognition model meets a predetermined reference and determines the one meeting the predetermined reference as a final data recognition model. In this case, where there are a plurality of models meeting the predetermined reference, the model evaluating unit 3810-5 may determine any one or a predetermined number of models as final data recognition models in order of higher evaluation grade.

Meanwhile, at least one of the data obtaining unit 3810-1, the pre-processor 3810-2, the learning data selecting unit 3810-3, the model learning unit 3810-4, and the model evaluating unit 3810-5 in the data learning unit 3810 may be produced in at least one hardware chip that may then be equipped in the electronic device. For example, at least one of the data obtaining unit 3810-1, the pre-processor 3810-2, the learning data selecting unit 3810-3, the model learning unit 3810-4, and the model evaluating unit 3810-5 may be formed in a dedicated hardware chip for artificial intelligence (AI) or in part of an existing general-purpose processor (e.g., a central processing unit (CPU) or application processor) or a graphic dedicated processor (e.g., graphics processing unit (GPU)) and be equipped in various electronic devices.

Further, the data obtaining unit 3810-1, the pre-processor 3810-2, the learning data selecting unit 3810-3, the model learning unit 3810-4, and the model evaluating unit 3810-5 may be equipped in one electronic device or each may be equipped in a respective one of separate electronic devices. For example, some of the data obtaining unit 3810-1, the pre-processor 3810-2, the learning data selecting unit 3810-3, the model learning unit 3810-4, and the model evaluating unit 3810-5 may be included in the electronic device 101, and the rest in the server 108.

Further, at least one of the data obtaining unit 3810-1, the pre-processor 3810-2, the learning data selecting unit 3810-3, the model learning unit 3810-4, and the model evaluating unit 3810-5 may be implemented in a software module. Where at least one of the data obtaining unit 3810-1, the pre-processor 3810-2, the learning data selecting unit 3810-3, the model learning unit 3810-4, and the model evaluating unit 3810-5 is implemented in a software module (or a program module including instructions), the software module may be stored in a non-transitory readable recording medium. In this case, at least one software module may be provided by an operating system (OS) or by a predetermined application. Some of the at least one software module may be provided by the OS, and others may be provided by the predetermined application.

The processor 3800 (or a controller) may use various data recognition models and determine the user's intention, provide associated information, and efficiently learn references for recommending replacement actions in various manners through the data recognition models.

Figure 40:
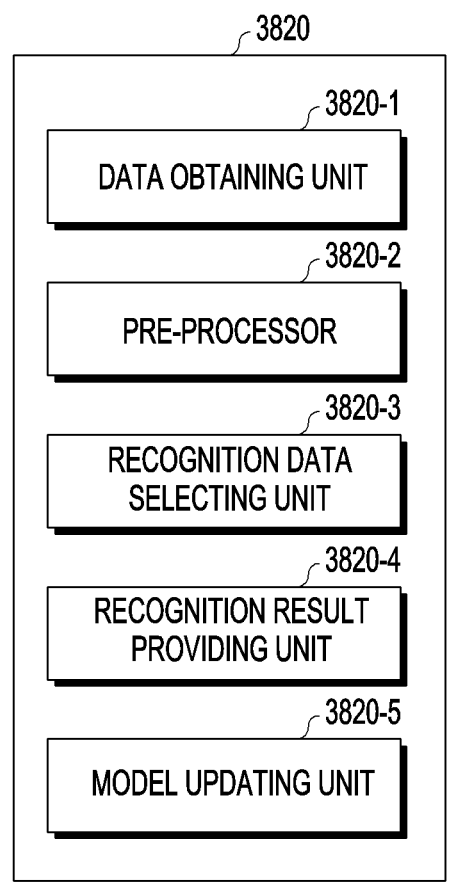
FIG. 40 is a block diagram illustrating an example data recognizing unit according to an embodiment.

FIG. 40 is a block diagram illustrating an example data recognizing unit 3820 according to an embodiment.

Referring to FIG. 40, according to an embodiment, the data recognizing unit (e.g., including processing circuitry and/or program elements) 3820 may include a data obtaining unit data obtaining unit (e.g., including processing circuitry and/or program elements) 3820-1, a pre-processor (e.g., including processing circuitry and/or program elements) 3820-2, a recognition data selecting unit (e.g., including processing circuitry and/or program elements) 3820-3, a recognition result providing unit (e.g., including processing circuitry and/or program elements) 3820-4, and a model updating unit (e.g., including processing circuitry and/or program elements) 3820-5. According to an embodiment, the data recognizing unit 3820 may necessarily include the data obtaining unit 3820-1 and the recognition result providing unit 3820-4 and may optionally include at least one of the pre-processor 3820-2, the recognition data selecting unit 3820-3, and the model updating unit 3820-5.

The data obtaining unit 3820-1 may include various processing circuitry and/or program elements and obtain data necessary to determine at least one of the type and degree of emotion or the type of action corresponding to a text.

The pre-processor 3820-2 may include various processing circuitry and/or program elements and may determine and pre-process at least one of the type and degree of emotion or the type of action corresponding to a text. The pre-processor 3820-2 may determine at least one of the type and degree of emotion or the type of action corresponding to the text to be recommended by the recognition result providing unit 3820-4 as described below and process the obtained data in a preset format. For example, the data obtaining unit 3820-1 may obtain a text entered through the electronic device 101. The data obtaining unit 3820-1 may obtain context information related to the user or the electronic device 101. For example, the context information may be information created by the electronic device 101 or information received from an external device.

The recognition data selecting unit 3820-3 may include various processing circuitry and/or program elements and may determine at least one of the type and degree of emotion or the type of action corresponding to the text among the pre-processed recognition data and select recognition data. The selected recognition data may be provided to the recognition result providing unit 3820-4. The recognition data selecting unit 3820-3 may select the whole or part of the pre-processed recognition data as per at least one of the type and degree of emotion or the type of action corresponding to the text. The recognition data selecting unit 3820-3 may also select recognition data as per references preset by learning by the model learning unit 3810-4 described below.

The recognition result providing unit 3820-4 may include various processing circuitry and/or program elements and may determine at least one of the type and degree of emotion or the type of action corresponding to the text to be recommended by applying the selected recognition data to the data recognition model. The recognition result providing unit 3820-4 may provide the results of recognition as per the purposes of recognition of data. The recognition result providing unit 3820-4 may apply the recognition data obtained through the data obtaining unit 3820-1 or the recognition data selected by the recognition data selecting unit 3820-3, as input values, to the data recognition model. The recognition result providing unit 3820-4 may obtain at least one of the type and degree of emotion or the type of action corresponding to the text as a result of applying to the data recognition model.

The model updating unit 3820-5 may include various processing circuitry and/or program elements and may allow the data recognition model to be updated based on evaluations on the results of recognition provided by the recognition result providing unit 3820-4. For example, the model updating unit 3820-5 may provide the results of recognition provided from the recognition result providing unit 3820-4 to the model learning unit 3810-4, allowing the model learning unit 3810-4 to update the data recognition model.

For example, the evaluations on the results of recognition may be the user's feedback information as per at least one of the type and degree of emotion or the type of action corresponding to the text recommended for the user by the server 108 or the electronic device 101. As an example, among at least one of the type and degree of emotion or the type of action corresponding to the text recommended by the server 108 or the electronic device 101, at least one of the type and degree of emotion or the type of action corresponding to the text selected by the user, as user information, may be used as learning data to update the data recognition model.

At least one of the data obtaining unit 3820-1, the pre-processor 3820-2, the recognition data selecting unit 3820-3, the recognition result providing unit 3820-4, and the model updating unit 3820-5 in the data recognizing unit 3820 may be produced in at least one hardware chip that may then be equipped in the electronic device. For example, at least one of the data obtaining unit 3820-1, the pre-processor 3820-2, the recognition data selecting unit 3820-3, the recognition result providing unit 3820-4, and the model updating unit 3820-5 may be formed in a dedicated hardware chip for artificial intelligence (AI) or in part of an existing general-purpose processor (e.g., a central processing unit (CPU) or application processor) or a graphic dedicated processor (e.g., graphics processing unit (GPU)) and be equipped in various electronic devices.

Further, the data obtaining unit 3820-1, the pre-processor 3820-2, the recognition data selecting unit 3820-3, the recognition result providing unit 3820-4, and the model updating unit 3820-5 may be equipped in one electronic device or each may be equipped in a respective one of separate electronic devices. For example, some of the data obtaining unit 3820-1, the pre-processor 3820-2, the recognition data selecting unit 3820-3, the recognition result providing unit 3820-4, and the model updating unit 3820-5 may be included in the electronic device 101, and the rest in the server.

Further, at least one of the data obtaining unit 3820-1, the pre-processor 3820-2, the recognition data selecting unit 3820-3, the recognition result providing unit 3820-4, and the model updating unit 3820-5 may be implemented in a software module. Where at least one of the data obtaining unit 3820-1, the pre-processor 3820-2, the recognition data selecting unit 3820-3, the recognition result providing unit 3820-4, and the model updating unit 3820-5 is implemented in a software module (or a program module including instructions), the software module may be stored in a non-transitory readable recording medium. In this case, at least one software module may be provided by an operating system (OS) or by a predetermined application. Some of the at least one software module may be provided by the OS, and others may be provided by the predetermined application.

The server 108 or the electronic device 101 may provide the user with a service suited for the user's intention using the data recognition model to which the learned results have been applied.

The electronic device according to various embodiments may be one of various types of electronic devices. The electronic devices may include at least one of, e.g., a portable communication device (e.g., a smartphone), a computer device, a portable multimedia device, a portable medical device, a camera, a wearable device, or a home appliance. According to an embodiment of the disclosure, the electronic device is not limited to the above-listed embodiments.

It should be appreciated that various example embodiments of the disclosure and the terms used therein are not intended to limit the techniques set forth herein to particular embodiments and that various changes, equivalents, and/or replacements therefor also fall within the scope of the disclosure. The same or similar reference denotations may be used to refer to the same or similar elements throughout the specification and the drawings. It is to be understood that the singular forms "a", "an", and "the" include plural references unless the context clearly dictates otherwise. As used herein, the term "A or B", "at least one of A and/or B", "A, B, or C", or "at least one of A, B, and/or C" may include all possible combinations of the enumerated items. As used herein, the terms "1st" or "first" and "2nd" or "second" may be used to identify corresponding components regardless of importance and/or order and are used to distinguish a component from another without limiting the components. It will be understood that when an element (e.g., a first element) is referred to as being (operatively or communicatively) "coupled with/to", or "connected with/to" another element (e.g., a second element), it can be coupled or connected with/to the other element directly or via a third element.

As used herein, the term "module" includes a unit configured in hardware, software, or firmware or any combination thereof, and may interchangeably be used with other terms, e.g., "logic", "logic block", "part", or "circuit". A module may be a single integral part or a minimum unit or part for performing one or more functions. For example, the module may be configured in an application-specific integrated circuit (ASIC).

Various embodiments as set forth herein may be implemented as software (e.g., the program) containing commands that are stored in a machine (e.g., computer)-readable storage medium (e.g., an internal memory) or an external memory. The machine may be a device that may invoke a command stored in the storage medium and may be operated as per the invoked command. The machine may include an electronic device (e.g., the electronic device 101) according to embodiments disclosed herein. When the command is executed by a processor (e.g., the processor 120), the processor may perform a function corresponding to the command on its own or using other components under the control of the processor. The command may contain a code that is generated or executed by a compiler or an interpreter. The machine-readable storage medium may be provided in the form of a non-transitory storage medium. The term "non-transitory" refers to a storage medium that is tangible, but this term does not differentiate between where data is semi permanently stored in the storage medium and where data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

A method according to various embodiments of the disclosure may be provided in a computer program product.

Such computer program products may include software (S/W) programs or computer-readable storage media storing the S/W programs or products traded between the seller and the buyer.

For example, the computer program products may include S/W program-type products (e.g., downloadable applications (apps)) that are electronically distributed through the electronic device 101 or the manufacturers of the electronic device or electronic markets (e.g., Google Play Store or App Store). For electronic distribution, at least part of the S/W programs may be stored in storage media or temporarily generated. In this case, the storage media may be storage media of the manufacturer's or electronic market's server or the relay server.

According to various embodiments, each component (e.g., a module or program) may be configured of a single or multiple entities, and the various embodiments may exclude some of the above-described sub components or add other sub components. Some components (e.g., modules or programs) may be integrated into a single entity that may then perform the respective (pre-integration) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added.

As is apparent from the foregoing description, according to various embodiments, there may be provided an electronic device and method for operating the electronic device that may provide an image selected or edited depending on the type or degree of the user's emotion. According to various embodiments, there may be provided an electronic device and method for operating the electronic device that may select or edit an image corresponding to the emotion among a plurality of users and provide the selected or edited image. According to various embodiments, there may be provided an electronic device and method for operating the electronic device that may merge images corresponding to a plurality of users into a single image and provided the merged image.

While the disclosure has been illustrated and described with reference to certain various example embodiments thereof, it will be understood by those skilled in the art that various changes in form and details may be made therein without departing from the spirit and scope of the disclosure as defined, for example, by the appended claims and their equivalents.

What is claimed is:

1. An electronic device, comprising:
a touch screen;
a communication circuit; and
at least one processor configured to control the electronic device to:
receive a first input of a first user for inputting a first text through the touch screen and display the first text on the touch screen,
transmit first information about the first text through the communication circuit to a server,
receive, from the server, second information associated with an image including a first object associated with the first user and a second object associated with a second user conversing with the first user, the first object related to a first type of emotion and a degree of the emotion which are identified based on an emotional state of the first user and an emotional state of the second user, the second object being related to a second type of emotion identified based on the emotional state of the second user, wherein the emotional state of the first user is identified, by the server, based on a result of analysis of the first text and the emotional state of the second user is identified, by the server, based on a result of analysis of another text associated with the second user received, after the first information about the first text, by the server from an external electronic device of the second user, display the image including the first object and the second object which are displayed in a form combined with each other, based on the second information, on the touch screen together with a second text, based on receiving a second input of the first user for transmitting the image and the second text, transmit third information associated with the image and the second text to the server, for the image and the second text to be transmitted from the server to the external device of the second user, and based on receiving a third input of the first user for transmitting only the second text, transmit fourth information to the server, for the second text to be transmitted from the server to the external device of the second user.

2. The electronic device of claim 1, wherein the at least one processor is configured to control the electronic device to:
receive fifth information associated with the first object corresponding to the emotional state of the first user and sixth information associated with the second object corresponding to the emotional state of the second user.

3. The electronic device of claim 1, wherein the second information associated with the image includes first identification information identifying the first object and second identification information identifying the second object, and
wherein the at least one processor is configured to control the electronic device to:
identify the first object corresponding to the first identification information among a plurality of images which is stored in the electronic device, and
identify the second object corresponding to the second identification information from among the plurality of images.

4. The electronic device of claim 1, wherein the second information associated with the image includes the emotional state of the first user and the emotional state of the second user, and
wherein the at least one processor is configured to control the electronic device to:
identify the first object corresponding to the emotional state of the first user from among a plurality of images which is stored in the electronic device, and
identify the second object corresponding to the emotional state of the second user from among the plurality of images.

5. The electronic device of claim 1, wherein the second information associated with the image includes seventh information about a position of the first object and eight information about a position of the second sub object, and
wherein the at least one processor is configured to control the electronic device to:

place the first object in a first position in the image based on the seventh information, and place the second object in a second position in the image based on the eight information, as at least part of displaying the image based on the second information associated with the image.

6. The electronic device of claim 1, wherein the at least one processor is configured to control the electronic device to:
receive the second information about the image including third information about the emotional state of the first user, the emotional state of the second user, and an action corresponding to the first text, as at least part of receiving the second information associated with the image, and
display the image corresponding to the second information associated with the image including the third information about the emotional state of the first user, the emotional state of the second user, and the action corresponding to the first text, as at least part of displaying the image through the touch screen based on the second information associated with the image.

7. The electronic device of claim 1, wherein the second information associated with the image includes edit information about raw information, and
wherein the at least one processor is configured to control the electronic device to:
edit a first raw image designated to be associated with the first user using the edit information, and
display the edited first raw image, as at least part of displaying the image through the touch screen based on the second information associated with the image.

8. The electronic device of claim 7, wherein the at least one processor is configured to control the electronic device to: select at least one of: a position, a shape, a color, and a changing speed of at least one object in the image, or replace the at least one object in the image with another object, as at least part of editing the first raw image using the edit information.

9. The electronic device of claim 1, further comprising a camera,
wherein the at least one processor is configured to control the electronic device to:
transmit a first image obtained using the camera to the server, as at least part of transmitting the first information about the first text to the server and,
receive the second information associated with the image identified based on the result of analysis of the first image, the emotional state of the first user, and the emotional state of the second user, as at least part of receiving the second information associated with the image identified based on the emotional state of the first user and the emotional state of the second user.

10. The electronic device of claim 1, wherein the at least one processor is configured to control the electronic device to:
receive the second information associated with the image identified based on a result of analysis of a third text previously transmitted or received between the first user and the second user, the emotional state of the first user, and the emotional state of the second user, as at least part of receiving the information associated with the image identified based on the first user's emotional state and the second user's emotional state.

11. The electronic device of claim 1, wherein the at least one processor is configured to control the electronic device to:

receive, through the touch screen, an instruction to transmit the displayed image and the first text to an external electronic device being used by the second user, and transmit the displayed image and the first text through the communication circuit to the external electronic device.

12. A method of operating an electronic device, the method comprising:

receiving a first input of a first user for inputting a first text and displaying the first text;

transmitting first information about the text to a server;

receiving, from the server, second information associated with an image including a first object associated with the first user and a second object associated with a second user conversing with the first user, the first object related to at least a first type of emotion and a degree of the emotion which are identified based on at least an emotional state of a first user and an emotional state of the second user, the second object being related to a second type of emotion identified based on the emotional state of the second user, wherein the emotional state of the first user is identified, by the server, based on a result of analysis of the first text and the emotional state of the second user is identified, by the server, based on a result of analysis of another text associated with the second user received, after the first information about the first text, by the server from an external electronic device of the second user;

displaying the image including the first object and the second object which are displayed in a form combined with each other, based on the second information, together with a second text;

based on receiving a second input of the first user for transmitting the image and the second text, transmitting third information associated with the image and the second text to the server for the image and the second text to be transmitted from the server to the external device of the second user; and based on receiving a third input of the first user for transmitting only the second text, transmitting fourth information to the server, for the second text to be transmitted from the server to the external device of the second user.

13. The method of claim 12, further comprising:

receiving fifth information associated with the first object corresponding to the emotional state of the first user and sixth information associated with the second object corresponding to the emotional state of the second user.

14. The method of claim 12, wherein the second information associated with the image includes first identification information identifying the first object and second identification information identifying the second object, and wherein the method further comprises:

identifying the first object corresponding to the first identification information from among a plurality of images which is stored in the electronic device; and identifying the second object corresponding to the second identification information from among the plurality of images.

15. The method of claim 12, wherein the second information associated with the image includes the emotional state of the first user and the emotional state of the second user, and wherein the method further comprises:

identifying the first object corresponding to the emotional state of the first user from among a plurality of images stored in the electronic device; and identifying the second object corresponding to the emotional state of the second user from among the plurality of images.

16. The method of claim 13, wherein the second information associated with the image includes seventh information about a position of the first object and eight information about a position of the second object, and wherein the method further comprises: placing the first object in a first position in the image based on the seventh information and the second object in a second position in the image based on the eight information.

* * * * *